(12) United States Patent
Shao et al.

(10) Patent No.: US 11,362,758 B2
(45) Date of Patent: Jun. 14, 2022

(54) COMMUNICATION METHOD AND COMMUNICATIONS DEVICE

(71) Applicant: Huawei Technologies Co., Ltd., Shenzhen (CN)

(72) Inventors: Jiafeng Shao, Beijing (CN); Yongxia Lyu, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 49 days.

(21) Appl. No.: 16/925,670

(22) Filed: Jul. 10, 2020

(65) Prior Publication Data

US 2020/0343995 A1 Oct. 29, 2020

Related U.S. Application Data

(63) Continuation of application No. PCT/CN2019/070510, filed on Jan. 4, 2019.

(30) Foreign Application Priority Data

Jan. 12, 2018 (CN) .......................... 201810033549.9

(51) Int. Cl.
*H04L 1/00* (2006.01)
*H04W 72/04* (2009.01)
(Continued)

(52) U.S. Cl.
CPC ......... *H04L 1/0004* (2013.01); *H04B 7/0626* (2013.01); *H04L 1/1819* (2013.01); *H04W 72/042* (2013.01)

(58) Field of Classification Search
None
See application file for complete search history.

(56) References Cited

U.S. PATENT DOCUMENTS

2015/0079975 A1* 3/2015 Hageltorn ......... H04W 72/1215
455/426.1
2015/0098532 A1* 4/2015 Ryu ..................... H03G 3/3078
375/347
(Continued)

FOREIGN PATENT DOCUMENTS

CN 101959284 A 1/2011
CN 102265695 A 11/2011
(Continued)

OTHER PUBLICATIONS

Ericsson, "MCS table for URLLC", 3GPP TSG RAN WG1 #91, R1-1720977, Reno, NV, US, Nov. 27-Dec. 1, 2017, 4 pages.
(Continued)

*Primary Examiner* — Edan Orgad
*Assistant Examiner* — Emmanuel K Maglo
(74) *Attorney, Agent, or Firm* — Slater Matsil, LLP

(57) ABSTRACT

A communication method and a communications device are provided. The communication method includes: determining a modulation and coding scheme index; determining first information based on received DCI; determining, based on the first information, modulation and coding scheme information corresponding to the modulation and coding scheme index, wherein the first information comprises a search space in which the DCI is located, and the search space in which the DCI is located is a common search space or a user-specific search space.

20 Claims, 6 Drawing Sheets

(51) Int. Cl.
*H04B 7/06* (2006.01)
*H04L 1/18* (2006.01)

(56) References Cited

U.S. PATENT DOCUMENTS

| | | | |
|---|---|---|---|
| 2015/0124895 A1* | 5/2015 | Park | H04L 27/2626 |
| | | | 375/260 |
| 2015/0312071 A1* | 10/2015 | Chen | H04L 1/0003 |
| | | | 370/329 |
| 2017/0230994 A1 | 8/2017 | You et al. | |
| 2017/0295593 A1 | 10/2017 | Kim et al. | |
| 2018/0042016 A1* | 2/2018 | Babaei | H04L 5/0082 |
| 2018/0049073 A1* | 2/2018 | Dinan | H04W 4/44 |
| 2019/0075563 A1* | 3/2019 | Babaei | H04W 72/10 |
| 2019/0097762 A1* | 3/2019 | Jeon | H04W 28/04 |

FOREIGN PATENT DOCUMENTS

| | | |
|---|---|---|
| CN | 103580788 A | 2/2014 |
| CN | 104202115 A | 12/2014 |
| CN | 104506282 A | 4/2015 |
| CN | 106233649 A | 12/2016 |
| CN | 106961318 A | 7/2017 |
| EP | 3047586 B1 | 4/2018 |
| JP | 2017514397 A | 6/2017 |
| JP | 2017188913 A | 10/2017 |
| WO | 2015034151 A1 | 3/2015 |
| WO | 2015099173 A1 | 7/2015 |
| WO | 2015100690 A1 | 7/2015 |
| WO | 2015164251 A1 | 10/2015 |
| WO | 2017171956 A1 | 10/2017 |

OTHER PUBLICATIONS

3rd Generation Partnership Project; Technical Specification Group Radio Access Network; NR; Multiplexing and channel coding (Release 15), 3GPP TS 38.212 V15.0.0 (Dec. 2017), 82 pages.
3rd Generation Partnership Project; Technical Specification Group Radio Access Network; NR; Physical layer procedures for control (Release 15), 3GPP TS 38.213 V15.0.0 (Dec. 2017), 56 pages.
3rd Generation Partnership Project; Technical Specification Group Radio Access Network; NR; Physical layer procedures for data (Release 15), 3GPP TS 38.214 V15.0.0 (Dec. 2017), 71 pages.

* cited by examiner

COMMUNICATION METHOD AND COMMUNICATIONS DEVICE

CROSS-REFERENCE TO RELATED APPLICATIONS

This application is a continuation of International Patent Application No. PCT/CN2019/070510, filed on Jan. 4, 2019, which claims priority to Chinese Patent Application No. 201810033549.9, file on Jan. 12, 2018. The disclosures of the aforementioned applications are hereby incorporated by reference in their entireties.

TECHNICAL FIELD

This application relates to the field of communications technologies, and in particular, to a communication method and a communications device.

BACKGROUND

The international telecommunication union (ITU) defines three types of application scenarios for a fifth generation mobile communications system (5G) and a future mobile communications system: enhanced mobile broadband (eMBB), ultra-reliable and low latency communication (URLLC), and massive machine type communication (mMTC).

A latency requirement of a URLLC service is very high, where a unidirectional transmission latency from a transmit end to a receive end needs to be within 0.5 milliseconds (ms), and transmission reliability needs to reach 99.999% within 1 ms.

Currently, in a 5G new radio (new radio, NR) technology, in comparison with a block error rate (BLER) 0.1 of an eMBB service, URLCC can support a modulation and coding scheme (MCS) table with a lower block error rate (BLER).

In a process of communication between a network device and a terminal device, the terminal device may complete processing such as data modulation and coding or data demodulation and decoding based on a specific type of MCS information in an MCS table. To enable the network device and the terminal device to select same MCS information, the network device and the terminal device also need to determine the MCS table. Currently, the network device notifies the terminal device of the MCS table by using higher layer signaling, and the terminal device still uses an original MCS table by default before receiving a new higher layer signaling notification. A latency requirement of a URLLC service is high, and the network device needs to flexibly and dynamically select to-be-used MCS information based on an actual situation of the terminal device within a low latency of the URLLC service. Therefore, by notifying the terminal device of the used MCS table by using higher layer signaling in a semi-static manner, the network device cannot flexibly select an MCS table or corresponding MCS information for the terminal device. It can be learned that the current manner of notifying the terminal device of the MCS information by the network device cannot adapt to the requirement of the URLLC service.

SUMMARY

Embodiments of this application provide a communication method and a communications device, so that a manner of notifying a terminal device of selected modulation and coding scheme information can better adapt to a requirement of a URLLC service.

According to a first aspect, a communication method is provided, the method may be performed by a communications device, and the communications device is, for example, a terminal device. The method includes: determining a modulation and coding scheme index; determining first information; and determining, based on the first information, modulation and coding scheme information corresponding to the modulation and coding scheme index, where the determining first information includes: determining the first information based on received DCI or determining the first information based on a quantity of times of receiving first HARQ response information and/or a quantity of times of not receiving the first HARQ response information in a first time window, where the first HARQ response information is first acknowledgement information or first negative acknowledgement information; or the determining first information includes: determining the first information based on received DCI and a quantity of times of receiving first HARQ response information and/or a quantity of times of not receiving the first HARQ response information in a first time window, where the first HARQ response information is first acknowledgement information or first negative acknowledgement information.

In this embodiment of this application, the terminal device may determine, based on the first information, the modulation and coding scheme information corresponding to the modulation and coding scheme index, so that the terminal device can perform processing such as modulation or demodulation on second information based on the determined modulation and coding scheme information. The first information may be dynamically notified to the terminal device. For example, the first information is dynamically determined based on the DCI, or the first information is dynamically determined based on the quantity of times of receiving the first HARQ response information, and the first information is notified without using semi-static higher layer signaling, so that a requirement of a URLLC service can be met, and a manner of notifying the terminal device of the modulation and coding scheme information can better adapt to the requirement of the URLLC service. In addition, when determining the first information, the terminal device may determine the first information based on only the received DCI, or determine the first information based on only the quantity of times of receiving the first HARQ response information and/or the quantity of times of not receiving the first HARQ response information in the first time window, or determine the first information based on the received DCI and the quantity of times of receiving the first HARQ response information and/or the quantity of times of not receiving the first HARQ response information in the first time window. Therefore, the manners are relatively flexible.

In a possible design, the first information is determined based on the received DCI, and the first information includes at least one of the following: a modulation and coding scheme table indicated by the DCI; a modulation and coding scheme index offset value indicated by the DCI; a feedback time interval indicated by the DCI; and A-CSI indicated by the DCI.

The terminal device may determine the first information based on the received DCI. For example, the DCI may be used to schedule the second information. In this case, the first information is determined by using the DCI, and the terminal device can determine the first information without requiring a network device to send other additional information. This helps save transmission resources and improve resource utilization.

In a possible design, the first information includes the modulation and coding scheme table indicated by the DCI, and the modulation and coding scheme table indicated by the DCI is at least one of a plurality of modulation and coding scheme tables, where the plurality of modulation and coding scheme tables include a first modulation and coding scheme table and a second modulation and coding scheme table, modulation and coding scheme information, included in the first modulation and coding scheme table, corresponding to the modulation and coding scheme index is first modulation and coding scheme information, and modulation and coding scheme information, included in the second modulation and coding scheme table, corresponding to the modulation and coding scheme index is second modulation and coding scheme information.

In this embodiment of this application, a system can support at least one modulation and coding scheme table. If the system supports a plurality of modulation and coding scheme tables, the modulation and coding scheme table indicated by the DCI is at least one of the plurality of modulation and coding scheme tables. For example, one modulation and coding scheme table corresponds to one block error rate. Each modulation and coding scheme table supported by the system includes at least one type of modulation and coding scheme information. Therefore, the first information may directly include the modulation and coding scheme table indicated by the DCI, and the terminal device may determine, based on the DCI, to use which modulation and coding scheme table, and then determine corresponding modulation and coding scheme information in the modulation and coding scheme table based on the modulation and coding scheme index. This manner is relatively simple and direct.

In a possible design, the first information includes the modulation and coding scheme index offset value indicated by the DCI, and the modulation and coding scheme index offset value indicated by the DCI is at least one of a plurality of modulation and coding scheme index offset values, where the plurality of modulation and coding scheme index offset values include a first modulation and coding scheme index offset value and a second modulation and coding scheme index offset value, modulation and coding scheme information that is corresponding to the modulation and coding scheme index and corresponding to the first modulation and coding scheme index offset value is first modulation and coding scheme information, and modulation and coding scheme information that is corresponding to the modulation and coding scheme index and corresponding to the second modulation and coding scheme index offset value is second modulation and coding scheme information.

The terminal device may determine, based on the determined modulation and coding scheme index and the modulation and coding scheme index offset value indicated by the DCI, modulation and coding scheme information in the modulation and coding scheme table indicated by the DCI. Specifically, the terminal device may add the modulation and coding scheme index offset value to (or subtract the modulation and coding scheme index offset value from) the determined modulation and coding scheme index to obtain a modulation and coding scheme index in the modulation and coding scheme table, and modulation and coding scheme information corresponding to the modulation and coding scheme index is the to-be-determined modulation and coding scheme information. This manner is also simple and direct, and is easy to implement.

In a possible design, the first information includes the feedback time interval indicated by the DCI, the feedback time interval is a time interval between sending data included in second information and sending second HARQ response information corresponding to the data by the terminal device or is a time interval between sending DCI used for scheduling the second information and sending the second information by the terminal device, and the feedback time interval indicated by the DCI belongs to at least one of a plurality of time interval sets, where the plurality of time interval sets include a first time interval set and a second time interval set, modulation and coding scheme information that is corresponding to the modulation and coding scheme index and corresponding to the feedback time interval included in the first time interval set is first modulation and coding scheme information, and modulation and coding scheme information that is corresponding to the modulation and coding scheme index and corresponding to the feedback time interval included in the second time interval set is second modulation and coding scheme information.

Generally, a shorter feedback time interval indicates that a requirement is more urgent, and such a service may be a URLLC service or another relatively urgent service. For such a service, modulation and coding scheme information with a relatively low block error rate may be used to ensure reliability. A longer feedback time interval indicates that a requirement is not very urgent, and a reliability requirement of such a service is usually not very high. For such a service, modulation and coding scheme information with a relatively high block error rate may be used.

In a possible design, the first information includes the modulation and coding scheme table indicated by the DCI and/or the modulation and coding scheme index offset value indicated by the DCI, and further includes a format of the DCI, the format of the DCI is a first DCI format, and the DCI includes a first bit information field and a second bit information field. The determining first information includes: determining, based on the first bit information field, the modulation and coding scheme table indicated by the DCI and/or the modulation and coding scheme index offset value indicated by the DCI, where a quantity of bits in the first bit information field is greater than or equal to 1, and the second bit information field includes one of the following: a quantity of bits in the second bit information field is less than or equal to 2, and the second bit information field is used to indicate a feedback time from the second information to HARQ response information; the quantity of bits in the second bit information field is less than or equal to 3, and the second bit information field is used to indicate a time domain resource occupied by the second information; the quantity of bits in the second bit information field is equal to 1, the second bit information field is used to indicate a redundancy version, and the redundancy version is 0 or 3; the quantity of bits in the second bit information field is equal to 1, the second bit information field is used to indicate a transmit power command word of the terminal device, and the transmit power command word is 0 or 3; and the quantity of bits in the second bit information field is equal to 4, and the second bit information field is used to indicate the modulation and coding scheme index.

For example, the format of the DCI may include the first DCI format and a second DCI format. DCI in the first DCI format may be referred to as compact (compact) DCI, and DCI in the second DCI format may be referred to as fallback DCI. It may be understood that the DCI in the first DCI format is DCI applicable to a URLLC service. The DCI in the second DCI format is DCI applicable to all services, for example, a DCI format 0_0 and a DCI format 1_0. The technical solution provided in this embodiment of this application may be applied to the DCI in the first DCI format. It may be understood that in this embodiment of this application, a total quantity of bits of the DCI in the first DCI format and a total quantity of bits of the DCI in the second DCI format may be set to be the same. In this way, a quantity of blind detection times can be reduced, and power of the terminal device is saved. In the DCI in the first DCI format, the second bit information field can still complete an original function of the second bit information field, and the first bit information field may be used to determine the first information. This is equivalent to determining the first information by using an existing bit information field in the DCI. In this way, no additional resource needs to be used to determine the first information, thereby saving transmission resources and improving DCI resource utilization.

In a possible design, the first information includes the A-CSI indicated by the DCI, and the A-CSI indicated by the DCI is at least one of a plurality of pieces of A-CSI, where the plurality of pieces of A-CSI include first CSI and second CSI, and modulation and coding scheme information that is corresponding to the modulation and coding scheme index and corresponding to the first CSI is first modulation and coding scheme information, and modulation and coding scheme information that is corresponding to the modulation and coding scheme index and corresponding to the second CSI is second modulation and coding scheme information; and/or CSI included in the A-CSI indicated by the DCI corresponds to a plurality of block error rates, and the plurality of block error rates include a highest block error rate and a lowest block error rate, where modulation and coding scheme information that is corresponding to the modulation and coding scheme index and corresponding to the highest block error rate is first modulation and coding scheme information, and modulation and coding scheme information that is corresponding to the modulation and coding scheme index and corresponding to the lowest block error rate is second modulation and coding scheme information, or modulation and coding scheme information that is corresponding to the modulation and coding scheme index and corresponding to the lowest block error rate is first modulation and coding scheme information, and modulation and coding scheme information that is corresponding to the modulation and coding scheme index and corresponding to the highest block error rate is second modulation and coding scheme information.

The first CSI and the second CSI may be CSI including different content. For example, if the A-CSI indicated by the DCI includes slowly changing information, such as an RI and/or RSRP, it indicates that the CSI may be a less urgent service, and a modulation and coding scheme table with a relatively high block error rate is required. If the CSI included in the A-CSI indicated by the DCI includes rapidly changing information, such as a CQI and/or a PMI, it indicates that the CSI may be a relatively urgent service, and a modulation and coding scheme table with a relatively low block error rate is required. For another example, if the A-CSI indicated by the DCI includes a CSI part 2, it indicates that the CSI may be a less urgent service, and a modulation and coding scheme table with a relatively high block error rate is required. If the CSI included in the A-CSI indicated by the DCI includes only a CSI part 1, it indicates that the CSI may be a relatively urgent service, and a modulation and coding scheme table with a relatively low block error rate is required. It should be noted that a correspondence between a modulation and coding scheme table and a block error rate is not limited herein, that is, the correspondence between a modulation and coding scheme table and a block error rate may be predefined or may be configured by using higher layer signaling. Alternatively, the first CSI and the second CSI may be CSI corresponding to different bit information quantities (or referred to as bit quantities). For example, if a bit information quantity included in the A-CSI indicated by the DCI is greater than or equal to a first bit quantity, it indicates that the CSI may be a less urgent service, and a modulation and coding scheme table with a relatively high block error rate is required. If a bit information quantity included in the A-CSI indicated by the DCI is less than a second bit quantity, it indicates that the CSI may be a relatively urgent service, and a modulation and coding scheme table with a relatively low block error rate is required.

Alternatively, it may be specified in advance that the modulation and coding scheme information that is corresponding to the modulation and coding scheme index and corresponding to the highest block error rate is the first modulation and coding scheme information, and the modulation and coding scheme information that is corresponding to the modulation and coding scheme index and corresponding to the lowest block error rate is the second modulation and coding scheme information, or the modulation and coding scheme information that is corresponding to the modulation and coding scheme index and corresponding to the lowest block error rate is the first modulation and coding scheme information, and the modulation and coding scheme information that is corresponding to the modulation and coding scheme index and corresponding to the highest block error rate is the second modulation and coding scheme information. This is not specifically limited.

In a possible design, the determining first information includes: determining the first information based on the quantity of times of receiving the first HARQ response information and/or the quantity of times of not receiving the first HARQ response information in the first time window, where the first information includes at least one of the following: a quantity of times of receiving first negative acknowledgement information and/or the quantity of times of not receiving first HARQ response information in the first time window; a quantity of times of receiving first acknowledgement information in the first time window; a ratio of the quantity of times of receiving the first negative acknowledgement information and/or the quantity of times of not receiving the first HARQ response information in the first time window to a total quantity of required times of receiving the first HARQ response information in the first time window; and a ratio of the quantity of times of receiving the first acknowledgement information in the first time window to the total quantity of required times of receiving the first HARQ response information in the first time window.

In this embodiment of this application, the first time window may be specified in a protocol, or may be configured by the network device and is notified to the terminal device by using higher layer signaling or dynamic signaling.

The first time window is, for example, a unit time that uses a moment at which the DCI carrying the MCS information is received as an end moment or a unit time that uses a moment at which the MCS information is determined as an end moment. Alternatively, the first time window uses a moment at which the first acknowledgement information is received as a start moment and a moment at which the first piece of first negative acknowledgement information is received after the first acknowledgement information is received as an end moment, or uses a moment at which the first acknowledgement information is received as a start moment and a moment at which the first HARQ response information is not received for the first time after the first acknowledgement information is received as an end moment, or uses a moment at which the first acknowledgement information is received as a start moment and an end moment of preset duration after the first acknowledgement information is received as an end moment. The first acknowledgement information herein may be any first acknowledgement information in a transmission process. Alternatively, the first time window corresponds to a start moment and an end moment at which one time unit is located.

Theoretically, each time the terminal device sends one piece of data (or one transport block), the terminal device receives the first HARQ response information from the network device. In this case, the terminal device may determine the first information based on a situation of receiving the first HARQ response information in the first time window, without using other additional information, and the network device does not need to send additional information either, thereby saving transmission resources.

In a possible design, the first information includes the quantity of times of receiving the first negative acknowledgement information and/or the quantity of times of not receiving the first HARQ response information in the first time window, and the quantity of times of receiving the first negative acknowledgement information and/or the quantity of times of not receiving the first HARQ response information in the first time window belongs to at least one of a plurality of sets of quantities of times, where the plurality of sets of quantities of times include a first set of quantities of times and a second set of quantities of times, modulation and coding scheme information that is corresponding to the modulation and coding scheme index and corresponding to the quantity of times of receiving the first negative acknowledgement information and/or the quantity of times of not receiving the first HARQ response information in the first time window included in the first set of quantities of times is first modulation and coding scheme information, and modulation and coding scheme information that is corresponding to the modulation and coding scheme index and corresponding to the quantity of times of receiving the first negative acknowledgement information and/or the quantity of times of not receiving the first HARQ response information in the first time window included in the second set of quantities of times is second modulation and coding scheme information.

If the first negative acknowledgement information is received, it indicates that receiving by the network device is incorrect, or it indicates that uplink data transmission by the terminal device is incorrect. If the first negative acknowledgement information is not received, it may also indicate that receiving by the network device is incorrect, or it may indicate that uplink data transmission by the terminal device is incorrect. If the quantity of times of receiving the first negative acknowledgement information and/or the quantity of times of not receiving the first HARQ response information is relatively large, it indicates that receiving by the network device is always incorrect, and a modulation and coding scheme table corresponding to a low block error rate is selected because a service transmission end time is closer.

In a possible design, the first information includes the quantity of times of receiving the first acknowledgement information in the first time window, and the quantity of times of receiving the first acknowledgement information in the first time window belongs to at least one of a plurality of sets of quantities of times, where the plurality of sets of quantities of times include a third set of quantities of times and a fourth set of quantities of times, modulation and coding scheme information that is corresponding to the modulation and coding scheme index and corresponding to the quantity of times of receiving the first acknowledgement information in the first time window included in the third set of quantities of times is first modulation and coding scheme information, and modulation and coding scheme information that is corresponding to the modulation and coding scheme index and corresponding to the quantity of times of receiving the first acknowledgement information in the first time window included in the fourth set of quantities of times is second modulation and coding scheme information.

If the first acknowledgement information is received, it indicates that receiving by the network device is correct, or it indicates that uplink data transmission by the terminal device is correct. If the quantity of times of receiving the first acknowledgement information is relatively small, it indicates that receiving by the network device is always incorrect, and a modulation and coding scheme table corresponding to a low block error rate is selected because a service transmission end time is closer.

In a possible design, the first information includes the ratio of the quantity of times of receiving the first negative acknowledgement information and/or the quantity of times of not receiving the first HARQ response information in the first time window to the total quantity of required times of receiving the first HARQ response information in the first time window, and the ratio of the quantity of times of receiving the first negative acknowledgement information and/or the quantity of times of not receiving the first HARQ response information in the first time window to the total quantity of required times of receiving the first HARQ response information in the first time window belongs to at least one of a plurality of ratio sets, where the plurality of ratio sets include a first ratio set and a second ratio set, modulation and coding scheme information that is corresponding to the modulation and coding scheme index and corresponding to the ratio of the quantity of times of receiving the first negative acknowledgement information and/or the quantity of times of not receiving the first HARQ response information in the first time window to the total quantity of required times of receiving the first HARQ response information in the first time window included in the first ratio set is first modulation and coding scheme information, and modulation and coding scheme information that is corresponding to the modulation and coding scheme index and corresponding to the ratio of the quantity of times of receiving the first negative acknowledgement information and/or the quantity of times of not receiving the first HARQ response information in the first time window to the total quantity of required times of receiving the first HARQ response information in the first time window included in the second ratio set is second modulation and coding scheme information.

If the first negative acknowledgement information is received, it indicates that receiving by the network device is incorrect, or it indicates that uplink data transmission by the terminal device is incorrect. If the first negative acknowledgement information is not received, it may also indicate that receiving by the network device is incorrect, or it may indicate that uplink data transmission by the terminal device is incorrect. If the ratio of the quantity of times of receiving the first negative acknowledgement information and/or the quantity of times of not receiving the first HARQ response information to the total quantity of required times of receiving the first HARQ response information in the first time window is relatively large, it indicates that receiving by the network device is always incorrect, and a modulation and coding scheme table corresponding to a low block error rate is selected because a service transmission end time is closer.

In a possible design, the first information includes the ratio of the quantity of times of receiving the first acknowledgement information in the first time window to the total quantity of required times of receiving the first HARQ response information in the first time window, and the ratio belongs to at least one of a plurality of ratio sets, where the plurality of ratio sets include a third ratio set and a fourth ratio set, modulation and coding scheme information that is corresponding to the modulation and coding scheme index and corresponding to the ratio of the quantity of times of receiving the first acknowledgement information in the first time window to the total quantity of required times of receiving the first HARQ response information in the first time window included in the third ratio set is first modulation and coding scheme information, and modulation and coding scheme information that is corresponding to the modulation and coding scheme index and corresponding to the ratio of the quantity of times of receiving the first acknowledgement information in the first time window to the total quantity of required times of receiving the first HARQ response information in the first time window included in the fourth ratio set is second modulation and coding scheme information.

If the first acknowledgement information is received, it indicates that receiving by the network device is correct, or it indicates that uplink data transmission by the terminal device is correct. If the ratio of the quantity of times of receiving the first acknowledgement information to the total quantity of required times of receiving the first HARQ response information in the first time window is relatively small, it indicates that receiving by the network device is always incorrect, and a modulation and coding scheme table corresponding to a low block error rate is selected because a service transmission end time is closer.

According to a second aspect, a communication method is provided, the method may be performed by a communications device, and the communications device is, for example, a network device such as a base station. The method includes: determining modulation and coding scheme information; determining first information and a modulation and coding scheme index, where the first information and the modulation and coding scheme index are used to indicate the modulation and coding scheme information; and sending the first information by using downlink control information DCI.

The network device may send the first information by using the DCI, so that a terminal device can determine the first information by using the DCI. Then, the terminal device may determine, based on the first information, the modulation and coding scheme information corresponding to the modulation and coding scheme index, so that the terminal device can perform processing such as modulation or demodulation on second information based on the determined modulation and coding scheme information. The first information may be dynamically notified to the terminal device. For example, the first information is determined based on the DCI, and is notified without using semi-static higher layer signaling, so that a requirement of a URLLC service can be met, and a manner of notifying the terminal device of the modulation and coding scheme information can better adapt to the requirement of the URLLC service.

In addition, if the terminal device determines the first information in another manner, for example, the terminal device determines the first information based on a situation of receiving first HARQ response information in a first time window, the network device may also determine the first information in a corresponding manner. For example, the network device determines the first information based on a situation of sending the first HARQ response information in the first time window. In this case, the network device may send the first information without using the DCI, thereby saving transmission resources.

In a possible design, the first information includes at least one of the following: a modulation and coding scheme table, a modulation and coding scheme index offset value, a feedback time interval, and A-CSI.

In a possible design, the first information includes the modulation and coding scheme table, and the modulation and coding scheme table is at least one of a plurality of modulation and coding scheme tables, where the plurality of modulation and coding scheme tables include a first modulation and coding scheme table and a second modulation and coding scheme table, modulation and coding scheme information, included in the first modulation and coding scheme table, corresponding to the modulation and coding scheme index is first modulation and coding scheme information, and modulation and coding scheme information, included in the second modulation and coding scheme table, corresponding to the modulation and coding scheme index is second modulation and coding scheme information.

In a possible design, the first information includes the modulation and coding scheme index offset value, and the modulation and coding scheme index offset value is at least one of a plurality of modulation and coding scheme index offset values, where the plurality of modulation and coding scheme index offset values include a first modulation and coding scheme index offset value and a second modulation and coding scheme index offset value, modulation and coding scheme information that is corresponding to the modulation and coding scheme index and corresponding to the first modulation and coding scheme index offset value is first modulation and coding scheme information, and modulation and coding scheme information that is corresponding to the modulation and coding scheme index and corresponding to the second modulation and coding scheme index offset value is second modulation and coding scheme information.

In a possible design, the first information includes the feedback time interval, the feedback time interval is a time interval between sending data included in second information and sending second HARQ response information corresponding to the data by the terminal device or is a time interval between sending DCI used for scheduling the second information and sending the second information by the terminal device, and the feedback time interval belongs to at least one of a plurality of time interval sets, where the plurality of time interval sets include a first time interval set and a second time interval set, modulation and coding scheme information that is corresponding to the modulation and coding scheme index and corresponding to the feedback time interval included in the first time interval set is first modulation and coding scheme information, and modulation and coding scheme information that is corresponding to the modulation and coding scheme index and corresponding to the feedback time interval included in the second time interval set is second modulation and coding scheme information.

In a possible design, the first information includes the modulation and coding scheme table and/or the modulation and coding scheme index offset value, and further includes a format of the DCI, the format of the DCI is a first DCI format, and the DCI includes a first bit information field and a second bit information field. The first bit information field is used to determine the modulation and coding scheme table and/or the modulation and coding scheme index offset value, a quantity of bits in the first bit information field is greater than or equal to 1, and the second bit information field includes one of the following: a quantity of bits in the second bit information field is less than or equal to 2, and the second bit information field is used to indicate a feedback time from the second information to HARQ response information; the quantity of bits in the second bit information field is less than or equal to 3, and the second bit information field is used to indicate a time domain resource occupied by the second information; the quantity of bits in the second bit information field is equal to 1, the second bit information field is used to indicate a redundancy version, and the redundancy version is 0 or 3; the quantity of bits in the second bit information field is equal to 1, the second bit information field is used to indicate a transmit power command word of the terminal device, and the transmit power command word is 0 or 3; and the quantity of bits in the second bit information field is equal to 4, and the second bit information field is used to indicate the modulation and coding scheme index.

In a possible design, the first information includes the A-CSI, and the A-CSI is at least one of a plurality of pieces of A-CSI, where the plurality of pieces of A-CSI include first CSI and second CSI, modulation and coding scheme information that is corresponding to the modulation and coding scheme index and corresponding to the first CSI is first modulation and coding scheme information, and modulation and coding scheme information that is corresponding to the modulation and coding scheme index and corresponding to the second CSI is second modulation and coding scheme information; and/or CSI included in the A-CSI corresponds to a plurality of block error rates, and the plurality of block error rates include a highest block error rate and a lowest block error rate, where modulation and coding scheme information that is corresponding to the modulation and coding scheme index and corresponding to the highest block error rate is first modulation and coding scheme information, and modulation and coding scheme information that is corresponding to the modulation and coding scheme index and corresponding to the lowest block error rate is second modulation and coding scheme information, or modulation and coding scheme information that is corresponding to the modulation and coding scheme index and corresponding to the lowest block error rate is first modulation and coding scheme information, and modulation and coding scheme information that is corresponding to the modulation and coding scheme index and corresponding to the highest block error rate is second modulation and coding scheme information.

In a possible design, the first information includes at least one of the following: a search space in which the DCI is located, a carrier on which the DCI is located, a detection period of the DCI, a CCE aggregation level of the DCI, and a CORSET in which the DCI is located.

In a possible design, the first information includes the search space in which the DCI is located, and the search space in which the DCI is located is at least one of a plurality of search spaces, where the plurality of search spaces include a common search space and a user-specific search space, modulation and coding scheme information that is corresponding to the modulation and coding scheme index and corresponding to the common search space is first modulation and coding scheme information, and modulation and coding scheme information that is corresponding to the modulation and coding scheme index and corresponding to the user-specific search space is second modulation and coding scheme information.

Appearance frequency of the common search space is usually relatively low, and appearance frequency of the user-specific search space is usually relatively high. Therefore, the common search space is more suitable for modulation and coding scheme information with a relatively high block error rate, and the user-specific search space is more suitable for modulation and coding scheme information with a relatively low block error rate. From this perspective, a block error rate corresponding to the second modulation and coding scheme information may be less than a block error rate corresponding to the first modulation and coding scheme information.

In a possible design, the first information includes the carrier on which the DCI is located, and the carrier on which the DCI is located is at least one of a plurality of carriers, where the plurality of carriers include a first carrier and a second carrier, modulation and coding scheme information that is corresponding to the modulation and coding scheme index and corresponding to the first carrier is first modulation and coding scheme information, and modulation and coding scheme information that is corresponding to the modulation and coding scheme index and corresponding to the second carrier is second modulation and coding scheme information.

For example, in a system, a URLLC service may be carried on a specific carrier for transmission, and another service may be carried on another carrier for transmission. If the terminal device receives the DCI by using the carrier that carries the URLLC service, it indicates that the second information scheduled by using the DCI belongs to the URLLC service, the URLLC service requires relatively high reliability, and modulation and coding scheme information with a relatively low block error rate may be selected. If the terminal device receives the DCI by using the carrier that carries the another service, it indicates that the second information scheduled by using the DCI belongs to a service other than the URLLC service, a reliability requirement of the another service is not as high as that of the URLLC service, and modulation and coding scheme information with a relatively high block error rate may be selected.

In a possible design, the first information includes the detection period of the DCI, and the detection period of the DCI belongs to at least one of a plurality of detection period sets, where the plurality of detection period sets include a first detection period set and a second detection period set, modulation and coding scheme information that is corresponding to the modulation and coding scheme index and corresponding to the first detection period set is first modulation and coding scheme information, and modulation and coding scheme information that is corresponding to the modulation and coding scheme index and corresponding to the second detection period set is second modulation and coding scheme information.

For example, a shorter detection period of the DCI indicates that a requirement is more urgent, and such a service may be a URLLC service or another relatively urgent service. For such a service, modulation and coding scheme information with a relatively low block error rate may be used to ensure reliability. A longer detection period of the DCI indicates that a requirement is not very urgent, and a reliability requirement of such a service is usually not very high. For such a service, modulation and coding scheme information with a relatively high block error rate may be used.

In a possible design, the first information includes the CCE aggregation level of the DCI, and the CCE aggregation level of the DCI belongs to at least one of a plurality of aggregation level sets, where the plurality of aggregation level sets include a first aggregation level set and a second aggregation level set, modulation and coding scheme information that is corresponding to the modulation and coding scheme index and corresponding to the first aggregation level set is first modulation and coding scheme information, and modulation and coding scheme information that is corresponding to the modulation and coding scheme index and corresponding to the second aggregation level set is second modulation and coding scheme information.

For example, if an aggregation level is high, a probability that the terminal device can receive the DCI is higher. In this case, it is likely that a reliability requirement of the terminal device is relatively high, and modulation and coding scheme information with a relatively low block error rate may be used to ensure reliability. On the contrary, if an aggregation level is low, the terminal device may probably not receive the DCI. Therefore, in this case, a reliability requirement of the terminal device is not very high, and modulation and coding scheme information with a relatively high block error rate may be used.

In a possible design, the first information includes the CORSET in which the DCI is located, and the CORSET in which the DCI is located belongs to at least one of a plurality of CORSET sets, where the plurality of CORSET sets include a first CORSET set and a second CORSET set, modulation and coding scheme information that is corresponding to the modulation and coding scheme index and corresponding to the first CORSET set is first modulation and coding scheme information, and modulation and coding scheme information that is corresponding to the modulation and coding scheme index and corresponding to the second CORSET set is second modulation and coding scheme information.

In a possible design, a REG bundle size corresponding to the first CORSET set belongs to a first REG bundle size set, and/or a REG bundle size corresponding to the second CORSET set belongs to a second REG bundle size set.

If a REG bundle size is large, a probability that the terminal device can receive the DCI is higher. In this case, it is likely that a reliability requirement of the terminal device is relatively high, and modulation and coding scheme information with a relatively low block error rate may be used to ensure reliability. On the contrary, if a REG bundle size is small, the terminal device may probably not receive the DCI. Therefore, in this case, a reliability requirement of the terminal device is not very high, and modulation and coding scheme information with a relatively high block error rate may be used.

In a possible design, the DCI is used to indicate a time domain resource and/or a frequency domain resource of the second information, and the determining first information includes: determining the first information based on a resource corresponding to the second information, where the first information includes at least one of the following: a carrier on which the resource corresponding to the second information is located, a cell in which the resource corresponding to the second information is located, a BWP in which the resource corresponding to the second information is located, a TAG in which the resource corresponding to the second information is located, a PUCCH group in which the resource corresponding to the second information is located, a PUCCH format corresponding to the resource corresponding to the second information, a subcarrier spacing of the resource corresponding to the second information, a waveform of the resource corresponding to the second information, and a time domain length of the resource corresponding to the second information.

In a possible design, the first information includes the carrier on which the resource corresponding to the second information is located, and the carrier on which the resource corresponding to the second information is located is at least one of a plurality of carriers, where the plurality of carriers include a first carrier and a second carrier, modulation and coding scheme information that is corresponding to the modulation and coding scheme index and corresponding to the first carrier is first modulation and coding scheme information, and modulation and coding scheme information that is corresponding to the modulation and coding scheme index and corresponding to the second carrier is second modulation and coding scheme information.

For example, in a system, a URLLC service may be carried on a specific carrier for transmission, and another service may be carried on another carrier for transmission. If the second information is transmitted by using the carrier that carries the URLLC service, it indicates that the second information belongs to the URLLC service, the URLLC service requires relatively high reliability, and modulation and coding scheme information with a relatively low block error rate may be selected. If the second information is transmitted by using the carrier that carries the another service, it indicates that the second information belongs to a service other than the URLLC service, a reliability requirement of the another service is not as high as that of the URLLC service, and modulation and coding scheme information with a relatively high block error rate may be selected.

When the first information includes at least one of the cell in which the resource corresponding to the second information is located, the BWP in which the resource corresponding to the second information is located, the TAG in which the resource corresponding to the second information is located, the PUCCH group in which the resource corresponding to the second information is located, the PUCCH format corresponding to the resource corresponding to the second information, the subcarrier spacing of the resource corresponding to the second information, and the waveform of the resource corresponding to the second information, this is similar to the case in which the first information includes the carrier on which the resource corresponding to the second information is located, and details are not described again.

In a possible design, the first information includes the time domain length of the resource corresponding to the second information, and the time domain length of the resource corresponding to the second information belongs to at least one of a plurality of time domain length sets, where the plurality of time domain length sets include a first time domain length set and a second time domain length set, modulation and coding scheme information corresponding to the time domain length, included in the first time domain length set, of the resource corresponding to the second information is first modulation and coding scheme information, and modulation and coding scheme information corresponding to the time domain length, included in the second time domain length set, of the resource corresponding to the second information is second modulation and coding scheme information.

If the time domain length of the resource corresponding to the second information is relatively short, it indicates that the second information may be a relatively urgent service, or a transmission time left for the second information is relatively short, and modulation and coding scheme information with a relatively low block error rate is required, to ensure that the second information can be successfully transmitted in a relatively short time. If the time domain length of the resource corresponding to the second information is relatively long, it indicates that the second information may be a less urgent service, or a transmission time left for the second information is relatively long, and modulation and coding scheme information with a relatively high block error rate may be used.

In a possible design, a block error rate corresponding to the second modulation and coding scheme information is less than a block error rate corresponding to the first modulation and coding scheme information; or a priority of a block error rate corresponding to the second modulation and coding scheme information is higher than a priority of a block error rate corresponding to the first modulation and coding scheme information.

Alternatively, in a possible design, a block error rate corresponding to the second modulation and coding scheme information is greater than a block error rate corresponding to the first modulation and coding scheme information; or a priority of a block error rate corresponding to the second modulation and coding scheme information is lower than a priority of a block error rate corresponding to the first modulation and coding scheme information.

Specifically, a relationship between the block error rate corresponding to the first modulation and coding scheme information and the block error rate corresponding to the second modulation and coding scheme information is not limited in this embodiment of this application.

In a possible design, the second modulation and coding scheme information is the same as the first modulation and coding scheme information, or the second modulation and coding scheme information is different from the first modulation and coding scheme information.

According to a third aspect, a communication method is provided, the method may be performed by a communications device, and the communications device is, for example, a terminal device. The method includes: determining a modulation and coding scheme index, where the modulation and coding scheme index is one of N modulation and coding scheme indexes, the N modulation and coding scheme indexes are 0 to N−1, and the N modulation and coding scheme indexes meet at least one of the following: a modulation and coding scheme index X to a modulation and coding scheme index Y correspond to a first block error rate, and a modulation and coding scheme index Y+1 to a modulation and coding scheme index Z correspond to a second block error rate, where $0 \leq X \leq Y < Z \leq N-1$, and N is an integer greater than 1; and a modulation and coding scheme index A to a modulation and coding scheme index B correspond to the first block error rate, and a modulation and coding scheme index C corresponds to the second block error rate, where $0 \leq A < C < B \leq N-1$, and N is an integer greater than 2; and determining modulation and coding scheme information corresponding to the modulation and coding scheme index, where the modulation and coding scheme information includes a modulation scheme, a coding rate, and a block error rate, the block error rate is one of at least two block error rates, and the at least two block error rates include the first block error rate and the second block error rate. In a possible design, A, B, and C are integers, and X, Y, and Z are integers.

Correspondingly, according to a fourth aspect, a communication method is provided, the method may be performed by a communications device, and the communications device is, for example, a network device such as a base station. The method includes: determining modulation and coding scheme information, where the modulation and coding scheme information includes a modulation scheme, a coding rate, and a block error rate, the block error rate is one of at least two block error rates, and the at least two block error rates include a first block error rate and a second block error rate; and determining a modulation and coding scheme index corresponding to the modulation and coding scheme information, where the modulation and coding scheme index is one of N modulation and coding scheme indexes, the N modulation and coding scheme indexes are 0 to N−1, and the N modulation and coding scheme indexes meet at least one of the following: a modulation and coding scheme index X to a modulation and coding scheme index Y correspond to the first block error rate, and a modulation and coding scheme index Y+1 to a modulation and coding scheme index Z correspond to the second block error rate, where $0 \leq X \leq Y < Z \leq N-1$, and N is an integer greater than 1; and a modulation and coding scheme index A to a modulation and coding scheme index B correspond to the first block error rate, and a modulation and coding scheme index C corresponds to the second block error rate, where $0 \leq A < C < B \leq N-1$, and N is an integer greater than 2. In a possible design, A, B, and C are integers, and X, Y, and Z are integers.

In this embodiment of this application, an MCS table may be re-provided, and the terminal device can directly determine MCS information in the MCS table by determining an MCS index. This manner is relatively simple and easy to implement.

According to a fifth aspect, a communications device is provided, and the communications device is, for example, a terminal device. The terminal device has functions of implementing the terminal device in the foregoing method design. These functions may be implemented by hardware, or may be implemented by hardware by executing corresponding software. The hardware or the software includes one or more units corresponding to the functions.

In a possible design, a specific structure of the terminal device may include a processor and a transceiver. The processor and the transceiver may perform corresponding functions in the method provided in any one of the first aspect or the possible designs of the first aspect.

According to a sixth aspect, a communications device is provided, and the communications device is, for example, a network device. The network device has functions of implementing the network device in the foregoing method design. These functions may be implemented by hardware, or may be implemented by hardware by executing corresponding software. The hardware or the software includes one or more units corresponding to the functions.

In a possible design, a specific structure of the network device may include a processor and a transceiver. The processor and the transceiver may perform corresponding functions in the method provided in any one of the second aspect or the possible designs of the second aspect.

According to a seventh aspect, a communications device is provided, and the communications device is, for example, a terminal device. The terminal device has functions of implementing the terminal device in the foregoing method design. These functions may be implemented by hardware, or may be implemented by hardware by executing corresponding software. The hardware or the software includes one or more units corresponding to the functions.

In a possible design, a specific structure of the terminal device may include a processor and a transceiver. The processor and the transceiver may perform corresponding functions in the method provided in any one of the third aspect or the possible designs of the third aspect.

According to an eighth aspect, a communications device is provided, and the communications device is, for example, a network device. The network device has functions of implementing the network device in the foregoing method design. These functions may be implemented by hardware, or may be implemented by hardware by executing corresponding software. The hardware or the software includes one or more units corresponding to the functions.

In a possible design, a specific structure of the network device may include a processor and a transceiver. The processor and the transceiver may perform corresponding functions in the method provided in any one of the fourth aspect or the possible designs of the fourth aspect.

According to a ninth aspect, a communications device is provided, and the communications device is, for example, a terminal device. The terminal device has functions of implementing the terminal device in the foregoing method design. These functions may be implemented by hardware, or may be implemented by hardware by executing corresponding software. The hardware or the software includes one or more units corresponding to the functions.

In a possible design, a specific structure of the terminal device may include a processing module and a transceiver module. The processing module and the transceiver module may perform corresponding functions in the method provided in any one of the first aspect or the possible designs of the first aspect.

According to a tenth aspect, a communications device is provided, and the communications device is, for example, a network device. The network device has functions of implementing the network device in the foregoing method design. These functions may be implemented by hardware, or may be implemented by hardware by executing corresponding software. The hardware or the software includes one or more units corresponding to the functions.

In a possible design, a specific structure of the network device may include a processing module and a transceiver module. The processing module and the transceiver module may perform corresponding functions in the method provided in any one of the second aspect or the possible designs of the second aspect.

According to an eleventh aspect, a communications device is provided, and the communications device is, for example, a terminal device. The terminal device has functions of implementing the terminal device in the foregoing method design. These functions may be implemented by hardware, or may be implemented by hardware by executing corresponding software. The hardware or the software includes one or more units corresponding to the functions.

In a possible design, a specific structure of the terminal device may include a processing module and a transceiver module. The processing module and the transceiver module may perform corresponding functions in the method provided in any one of the third aspect or the possible designs of the third aspect.

According to a twelfth aspect, a communications device is provided, and the communications device is, for example, a network device. The network device has functions of implementing the network device in the foregoing method design. These functions may be implemented by hardware, or may be implemented by hardware by executing corresponding software. The hardware or the software includes one or more units corresponding to the functions.

In a possible design, a specific structure of the network device may include a processing module and a transceiver module. The processing module and the transceiver module may perform corresponding functions in the method provided in any one of the fourth aspect or the possible designs of the fourth aspect.

According to a thirteenth aspect, a communications apparatus is provided. The communications apparatus may be the terminal device in the foregoing method design, or may be a chip disposed in the terminal device. The communications apparatus includes: a memory, configured to store computer executable program code; and a processor, where the processor is coupled to the memory. The program code stored in the memory includes an instruction, and when the processor executes the instruction, the communications apparatus performs the method performed by the terminal device in any one of the first aspect or the possible designs of the first aspect.

According to a fourteenth aspect, a communications apparatus is provided. The communications apparatus may be the network device in the foregoing method design, or may be a chip disposed in the network device. The communications apparatus includes: a memory, configured to store computer executable program code; and a processor, where the processor is coupled to the memory. The program code stored in the memory includes an instruction, and when the processor executes the instruction, the communications apparatus performs the method performed by the network device in any one of the second aspect or the possible designs of the second aspect.

According to a fifteenth aspect, a communications apparatus is provided. The communications apparatus may be the terminal device in the foregoing method design, or may be a chip disposed in the terminal device. The communications apparatus includes: a memory, configured to store computer executable program code; and a processor, where the processor is coupled to the memory. The program code stored in the memory includes an instruction, and when the processor executes the instruction, the communications apparatus performs the method performed by the terminal device in any one of the third aspect or the possible designs of the third aspect.

According to a sixteenth aspect, a communications apparatus is provided. The communications apparatus may be the network device in the foregoing method design, or may be a chip disposed in the network device. The communications apparatus includes: a memory, configured to store computer executable program code; and a processor, where the processor is coupled to the memory. The program code stored in the memory includes an instruction, and when the processor executes the instruction, the communications apparatus performs the method performed by the network device in any one of the fourth aspect or the possible designs of the fourth aspect.

According to a seventeenth aspect, a communications system is provided, and the communications system includes a network device and a terminal device. The terminal device is configured to: determine a modulation and coding scheme index; determine first information; and determine, based on the first information, modulation and coding scheme information corresponding to the modulation and coding scheme index, where the determining first information includes: determining the first information based on received DCI or a quantity of times of receiving first HARQ response information and/or a quantity of times of not receiving the first HARQ response information in a first time window, where the first HARQ response information is first acknowledgement information or first negative acknowledgement information. The network device is configured to: determine modulation and coding scheme information; determine first information and a modulation and coding scheme index, where the first information and the modulation and coding scheme index are used to indicate the modulation and coding scheme information; and send the first information by using downlink control information DCI.

According to an eighteenth aspect, a communications system is provided, and the communications system includes a network device and a terminal device. The terminal device is configured to: determine a modulation and coding scheme index, where the modulation and coding scheme index is one of N modulation and coding scheme indexes, the N modulation and coding scheme indexes are 0 to N−1, and the N modulation and coding scheme indexes meet at least one of the following: a modulation and coding scheme index X to a modulation and coding scheme index Y correspond to a first block error rate, and a modulation and coding scheme index Y+1 to a modulation and coding scheme index Z correspond to a second block error rate, where $0 \leq X \leq Y < Z \leq N-1$, and N is an integer greater than 1; and a modulation and coding scheme index A to a modulation and coding scheme index B correspond to the first block error rate, and a modulation and coding scheme index C corresponds to the second block error rate, where $0 \leq A < C < B \leq N-1$, and N is an integer greater than 2; and determine modulation and coding scheme information corresponding to the modulation and coding scheme index, where the modulation and coding scheme information includes a modulation scheme, a coding rate, and a block error rate, the block error rate is one of at least two block error rates, and the at least two block error rates include the first block error rate and the second block error rate. The network device is configured to: determine modulation and coding scheme information, where the modulation and coding scheme information includes a modulation scheme, a coding rate, and a block error rate, the block error rate is one of at least two block error rates, and the at least two block error rates include a first block error rate and a second block error rate; and determine a modulation and coding scheme index corresponding to the modulation and coding scheme information, where the modulation and coding scheme index is one of N modulation and coding scheme indexes, the N modulation and coding scheme indexes are 0 to N−1, and the N modulation and coding scheme indexes meet at least one of the following: a modulation and coding scheme index X to a modulation and coding scheme index Y correspond to the first block error rate, and a modulation and coding scheme index Y+1 to a modulation and coding scheme index Z correspond to the second block error rate, where $0 \leq X \leq Y < Z \leq N-1$, and N is an integer greater than 1; and a modulation and coding scheme index A to a modulation and coding scheme index B correspond to the first block error rate, and a modulation and coding scheme index C corresponds to the second block error rate, where $0 \leq A < C < B \leq N-1$, and N is an integer greater than 2. In a possible design, A, B, and C are integers, and X, Y, and Z are integers.

According to a nineteenth aspect, a computer readable storage medium is provided. The computer readable storage medium stores an instruction, and when the instruction runs on a computer, the computer is enabled to perform the method in any one of the first aspect or the possible designs of the first aspect.

According to a twentieth aspect, a computer readable storage medium is provided. The computer readable storage medium stores an instruction, and when the instruction runs on a computer, the computer is enabled to perform the method in any one of the second aspect or the possible designs of the second aspect.

According to a twenty-first aspect, a computer readable storage medium is provided. The computer readable storage medium stores an instruction, and when the instruction runs on a computer, the computer is enabled to perform the method in any one of the third aspect or the possible designs of the third aspect.

According to a twenty-second aspect, a computer readable storage medium is provided. The computer readable storage medium stores an instruction, and when the instruction runs on a computer, the computer is enabled to perform the method in any one of the fourth aspect or the possible designs of the fourth aspect.

According to a twenty-third aspect, a computer program product including an instruction is provided. The computer program product stores the instruction, and when the instruction runs on a computer, the computer is enabled to perform the method in any one of the first aspect or the possible designs of the first aspect.

According to a twenty-fourth aspect, a computer program product including an instruction is provided. The computer program product stores the instruction, and when the instruction runs on a computer, the computer is enabled to perform the method in any one of the second aspect or the possible designs of the second aspect.

According to a twenty-fifth aspect, a computer program product including an instruction is provided. The computer program product stores the instruction, and when the instruction runs on a computer, the computer is enabled to perform the method in any one of the third aspect or the possible designs of the third aspect.

According to a twenty-sixth aspect, a computer program product including an instruction is provided. The computer program product stores the instruction, and when the instruction runs on a computer, the computer is enabled to perform the method in any one of the fourth aspect or the possible designs of the fourth aspect.

In the embodiments of this application, the first information may be dynamically notified to the terminal device. For example, the first information is dynamically determined based on the DCI, or the first information is dynamically determined based on the quantity of times of receiving the first HARQ response information, and the first information is notified without using semi-static higher layer signaling, so that a requirement of a URLLC service can be met, and a manner of notifying the terminal device of the modulation and coding scheme information can better adapt to the requirement of the URLLC service.

DETAILED DESCRIPTION OF ILLUSTRATIVE EMBODIMENTS

Figure 1:
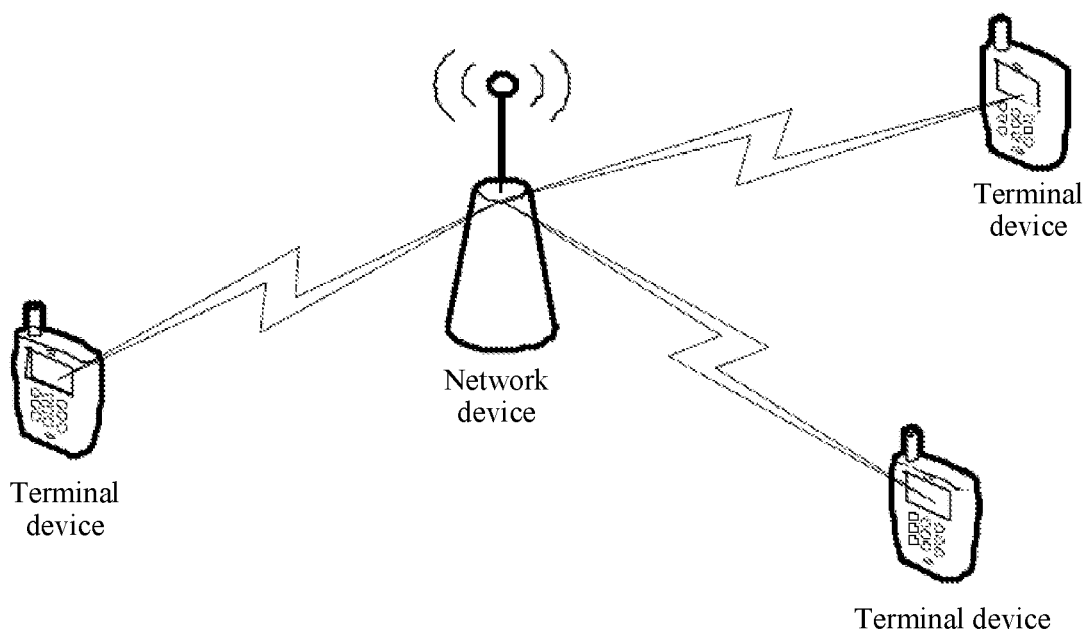
FIG. 1 is a schematic diagram of an application scenario according to an embodiment of this application.

To make the objectives, technical solutions, and advantages of embodiments of this application clearer, the following further describes the embodiments of this application in detail with reference to the accompanying drawings.

The following describes some terms in the embodiments of this application to facilitate understanding of a person skilled in the art.

(1) A terminal device includes a device that provides a user with voice and/or data connectivity, for example, may include a handheld device with a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a subscriber unit, a subscriber station, a mobile station, a mobile console, a remote station, an access point (AP), a remote terminal device, an access terminal device, a user terminal device, a user agent, a user device, or the like. For example, the terminal device may include a mobile phone (or referred to as a "cellular" phone), a computer with a mobile terminal device, a portable, pocket-sized, handheld, computer built-in, or vehicle-mounted mobile apparatus, or an intelligent wearable device. For example, the terminal device is a device such as a personal communications service (PCS) phone, a cordless telephone set, a session initiation protocol (SIP) phone, a wireless local loop (WLL) station, or a personal digital assistant (PDA). The terminal device further includes a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in the embodiments of this application, the terminal device may be alternatively a wearable device. The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, for example, various smart bands, smart helmets, or smart jewelry for monitoring physical signs.

(2) A network device includes, for example, a base station (for example, an access point), and may be a device that communicates with a wireless terminal device by using one or more cells over an air interface and that is in an access network. The network device may be configured to mutually convert a received over-the-air frame and an internet protocol (IP) packet and serve as a router between the terminal device and a rest portion of the access network, where the rest portion of the access network may include an IP network. The network device may further coordinate attribute management of the air interface. For example, the network device may include an evolved NodeB (NodeB, eNB, e-NodeB, or evolutional NodeB) in a long term evolution (LTE) system or an LTE-advanced (LTE-A) system, or may include a next generation NodeB (gNB) in a 5G NR system. This is not limited in the embodiments of this application.

In addition, in the embodiments of this application, the network device provides a service for a cell, and the terminal device communicates with the network device by using a transmission resource (for example, a frequency domain resource, or a spectrum resource) used in the cell. The cell may be a cell corresponding to the network device (for example, a base station). The cell may belong to a macro base station or may belong to a base station corresponding to a small cell. The small cell herein may include a metro cell, a micro cell, a pico cell, a femto cell, and the like. These cells are characterized by a small coverage area and low transmit power, and are suitable for providing a high-rate data transmission service.

In addition, in the LTE system or the NR system, a plurality of intra-frequency cells may simultaneously work on a carrier. In some special scenarios, it may also be considered that concepts of the carrier and the cell are equivalent. For example, in a carrier aggregation (CA) scenario, when a secondary carrier is configured for UE, a carrier index of the secondary carrier and a cell identity (Cell ID) of a secondary cell working on the secondary carrier are both carried. In this case, it may be considered that the concepts of the carrier and the cell are equivalent. For example, for the UE, accessing a carrier is equivalent to accessing a cell.

(3) A subcarrier spacing is a value of a spacing between center locations or peak locations of two adjacent subcarriers in frequency domain in an orthogonal frequency division multiplexing (OFDM) system. For example, a subcarrier spacing in the long term evolution (LTE) system is 15 (kHz), and a subcarrier spacing in the 5G NR system may be 15 kHz, 30 kHz, 60 kHz, or 120 kHz.

Refer to the following Table 1:

TABLE 1

| $\mu$ | $\Delta f = 2^{\mu} \cdot 15$ [kHz] | Cyclic prefix |
| --- | --- | --- |
| 0 | 15 | Normal |
| 1 | 30 | Normal |

TABLE 1-continued

| μ | $\Delta f = 2^\mu \cdot 15$ [kHz] | Cyclic prefix |
|---|---|---|
| 2 | 60 | Normal, Extended |
| 3 | 120 | Normal |
| 4 | 240 | Normal |

μ is used to indicate the subcarrier spacing. For example, when P=0, the subcarrier spacing is 15 kHz; or when P=1, the subcarrier spacing is 30 kHz.

(4) URLLC service: A latency requirement of the URLLC service is very high, where a unidirectional transmission latency from a transmit end to a receive end needs to be within 0.5 ms, and transmission reliability needs to reach 99.99% within 1 ms.

To meet the transmission latency requirement of the URLLC service, a shorter time scheduling unit may be used for data transmission over a wireless air interface, for example, a mini-slot or a slot with a larger subcarrier spacing is used as a minimum time scheduling unit. One mini-slot includes one or more time domain symbols. The time domain symbol herein may be an orthogonal frequency division multiplexing OFDM symbol. For one slot whose subcarrier spacing is 15 kHz, six or seven time domain symbols are included, and a corresponding time length is 0.5 ms. For one slot whose subcarrier spacing is 60 kHz, a corresponding time length is shortened to 0.125 ms.

A data packet of the URLLC service is generated unexpectedly and randomly. No data packet may be generated in a very long time, or a plurality of data packets may be generated in a very short time. In most cases, the data packet of the URLLC service is a small packet, for example, 50 bytes. A characteristic of the data packet of the URLLC service affects a resource allocation manner of a communications system. Resources herein include but are not limited to a time domain symbol, a frequency domain resource, a time-frequency resource, a codeword resource, a beam resource, and the like. Usually, system resource allocation is completed by an access network device. The following uses the access network device as an example for description. If the access network device allocates a resource to the URLLC service in a resource reservation manner, a system resource is wasted when there is no URLLC service. In addition, a short latency characteristic of the URLLC service requires that transmission of the data packet be completed in a very short time. Therefore, the access network device needs to reserve sufficiently high bandwidth for the URLLC service, resulting in a sharp decrease in system resource utilization.

A relatively short time scheduling unit is usually used for URLLC service data to meet an ultra-short latency requirement. For example, two time domain symbols whose subcarrier spacing is 15 kHz are used, or one slot whose subcarrier spacing is 60 kHz is used, and is corresponding to seven time domain symbols and a time length of 0.125 ms.

(5) Modulation and coding scheme table: A modulation and coding scheme may be abbreviated as an MCS in this specification, and therefore the modulation and coding scheme table may be abbreviated as an MCS table in this specification. However, the modulation and coding scheme is not limited in this specification, and there may be another translation method. The MCS table includes at least one of the following content: a modulation scheme, a coding rate, a BLER, and the like. One MCS table may include at least one type of modulation and coding scheme information, and each type of modulation and coding scheme information has a corresponding index (that is, a modulation and coding scheme index), and corresponds to at least one of the following content: a modulation scheme, a coding rate, and a BLER. Likewise, because the modulation and coding scheme is abbreviated as an MCS in this specification, the modulation and coding scheme information may also be abbreviated as MCS information, and the modulation and coding scheme index may be abbreviated as an MCS index.

A URLLC service may support a plurality of MCS tables, and each MCS table may correspond to one or more BLERs. In the description process of this specification, two MCS tables are mainly used as an example. In actual application, a quantity of MCS tables is not limited thereto.

(6) Channel state information (CSI): Generally, the CSI is classified into periodic CSI (P-CSI), aperiodic CSI (A-CSI), and semi-persistent CSI (SPS-CSI). The periodic CSI means that a terminal device periodically sends CSI to a network device. Sending of the aperiodic CSI is triggered by the network device by using downlink control information (DCI), and for sending of the semi-persistent CSI, the network device triggers, by using downlink control information, the terminal device to continuously send CSI for a period of time. It can be learned from a sending mechanism that the aperiodic CSI may enable the network device to instruct, according to a requirement of the network device, the terminal device to send current CSI, and this is more flexible. However, each trigger depends on sending of DCI. To control a quantity of DCI and reduce a control channel resource occupied by DCI, the semi-persistent CSI is introduced, and the periodic CSI is configured by using higher layer signaling. Therefore, sending of the DCI is reduced as much as possible, and the three mechanisms are all retained. It should be noted that only the periodic CSI and the aperiodic CSI are supported in a fourth generation mobile communications (4G) system, the aperiodic CSI is certainly sent on a physical uplink shared channel (PUSCH), and the periodic CSI is certainly sent on a physical uplink control channel (PUCCH). In a current discussion of the 5G NR system, the semi-persistent CSI is introduced, and it is also agreed that the aperiodic CSI may be sent on the PUCCH. The CSI includes one or more of information such as a channel quality indicator (CQI), a precoding matrix indicator (PMI), a rank indicator (RI), reference signal received power (RSRP), a channel state information-reference signal resource indicator (CRI), or an indicator of the number of non-zero wideband amplitude coefficients.

(7) A bandwidth part (BWP) is a part of channel bandwidth, may also be referred to as "operating bandwidth" or transmission bandwidth, a mini BWP, a BWP unit, a BP sub-band, or the like, and may be abbreviated as a BWP or a BP. A name and an abbreviation of the bandwidth part are not specifically limited in the embodiments of this application. The BWP may be a segment of consecutive resources in frequency domain. For example, one bandwidth part includes K (K>0) consecutive subcarriers, or one bandwidth part is a frequency domain resource on which N (N>0) non-overlapping consecutive resource blocks (RB) are located, or one bandwidth part is a frequency domain resource on which M (M>0) non-overlapping consecutive resource block groups (RBG) are located, where one RBG includes P (P>0) consecutive RBs. One bandwidth part is related to one specific numerology, and the numerology includes at least one of a subcarrier spacing and a cyclic prefix (CP).

(8) A block error rate is abbreviated as a BLER in this specification, but another translation method or name is not excluded. The BLER is a percentage of erroneous blocks in all sent blocks. For example, the BLER may be equal to one of {x*10e-1, x*10e-2, x*10e-3, x*10e-4, x*10e-5, x*10e-6, x*10e-7, x*10e-8, x*10e-9}, or may be equal to another value. $10e-1=10^{-1}=0.1$, and other values of the BLER are also similar. x is a positive number, for example, x is 1 or 5, or may be equal to another value. That is, it may be understood that the BLER may be alternatively replaced with a correctness percentage, and may be equal to one of {1-x*1e-1, 1-x*1e-2, 1-x*1e-3, 1-x*1e-4, 1-x*1e-5, 1-x*1e-6, 1-x*1e-7, 1-x*1e-8, or 1-x*1e-9}.

(9) Higher layer signaling may be signaling sent by a higher layer protocol layer. The higher layer protocol layer is at least one protocol layer above a physical layer. The higher layer protocol layer may specifically include at least one of the following protocol layers: a medium access control (MAC) layer, a radio link control (RLC) layer, a packet data convergence protocol (PDCP) layer, a radio resource control (RRC) layer, and a non-access stratum (NAS).

Dynamic signaling may be signaling sent by the physical layer, for example, signaling or information sent by using DCI.

(10) Waveform: A waveform of DCI, a waveform of a resource corresponding to second information, or the like is described in this specification. Currently, the 5G NR system supports two types of waveforms in uplink: OFDM and single carrier frequency division multiple access (SC-FDMA). The 5G NR system supports OFDM in downlink.

(11) Timing advance group (TAG): One TAG may include one or more carriers, or include one or more BWPs.

(12) PUCCH group: One PUCCH group may include one or more TAGs, or may include one or more carriers.

(13) The terms "system" and "network" may be used interchangeably in the embodiments of this application. The term "a plurality of" means at least two. In view of this, "a plurality of" may be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects, unless otherwise stated.

In addition, unless otherwise stated, in the embodiments of this application, ordinal numbers such as "first" and "second" are intended to distinguish between a plurality of objects, but not intended to limit an order, a time sequence, priorities, or importance of the plurality of objects.

The embodiments of this application may be applied to the LTE system or the 5G NR system, or may be applied to a next-generation mobile communications system or another similar communications system.

In addition, in the following description process, an example in which the technical solutions provided in the embodiments of this application are applied to a URLLC service is mainly used. This is not limited in actual application. For example, the technical solutions provided in the embodiments of this application may also be applied to another service that has a requirement similar to that of the URLLC service.

FIG. 1 shows an application scenario according to an embodiment of this application. In FIG. 1, a network device and at least one terminal device are included. The network device and the terminal device work in a 5G NR system, and the network device is, for example, a base station. The terminal device may communicate with the network device by using the 5G NR system.

The following describes two concepts: first MCS information and second MCS information. The first MCS information and the second MCS information may meet the following: a BLER corresponding to the second MCS information is less than a BLER corresponding to the first MCS information, for example, the BLER corresponding to the second MCS information is 10e-5, and the BLER corresponding to the first MCS information is 10e-3; or a priority of a BLER corresponding to the second MCS information is higher than a priority of a BLER corresponding to the first MCS information.

Alternatively, the first MCS information and the second MCS information may meet the following: a BLER corresponding to the second MCS information is greater than a BLER corresponding to the first MCS information, for example, the BLER corresponding to the first MCS information is 10e-5, and the BLER corresponding to the second MCS information is 10e-3; or a priority of a BLER corresponding to the second MCS information is lower than a priority of a BLER corresponding to the first MCS information.

In the following description, an example in which the BLER corresponding to the second MCS information is less than the BLER corresponding to the first MCS information or the priority of the BLER corresponding to the second MCS information is higher than the priority of the BLER corresponding to the first MCS information is mainly used. However, in the embodiments of this application, a magnitude relationship between the BLER corresponding to the first MCS information and the BLER corresponding to the second MCS information is not limited, and a relationship between the priority of the BLER corresponding to the first MCS information and the priority of the BLER corresponding to the second MCS information is not limited either.

In addition, a relationship between a value of a BLER and a priority of the BLER is not limited either in this specification. For example, in a possible case, if a smaller value of a BLER indicates a higher priority, a priority of a BLER whose value is 10e-5 is higher than a priority of a BLER whose value is 10e-3; or in another possible case, if a larger value of a BLER indicates a higher priority, a priority of a BLER whose value is 10e-3 is higher than a priority of a BLER whose value is 10e-5. Alternatively, in a possible case, a priority of a BLER is notified by the network device by using higher layer signaling or physical layer signaling.

Figure 2:
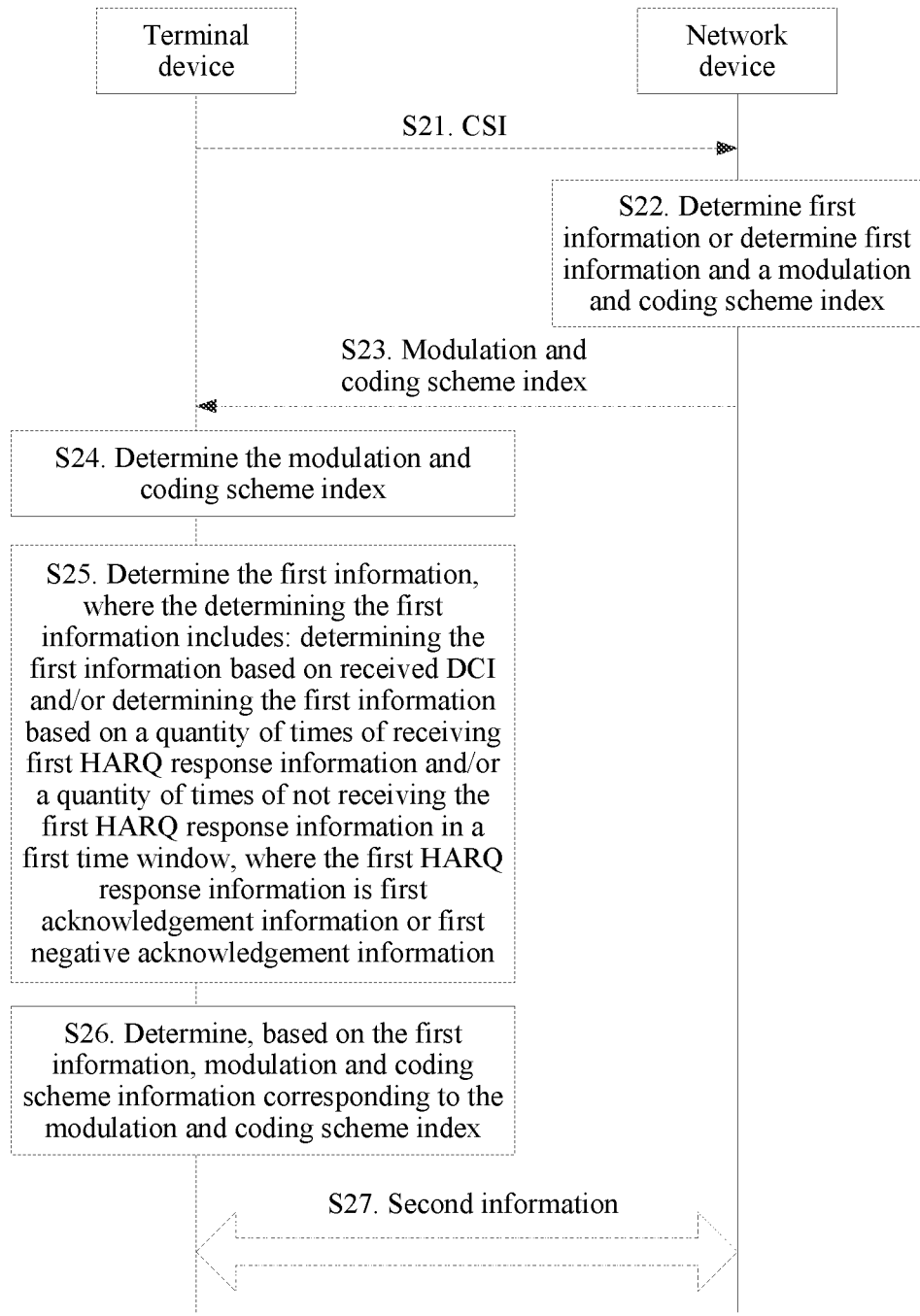
FIG. 2 is a flowchart of a first communication method according to an embodiment of this application.

Referring to FIG. 2, an embodiment of this application provides a first communication method. In the following description process, for example, the method is applied to the application scenario shown in FIG. 1. A procedure of the method is described as follows.

S21. A terminal device sends CSI to a network device, and the network device receives the CSI from the terminal device.

S22. The network device determines first information or determines first information and a modulation and coding scheme index.

S23. The network device sends the modulation and coding scheme index to the terminal device, and the terminal device receives the modulation and coding scheme index.

S24. The terminal device determines the modulation and coding scheme index.

S25. The terminal device determines the first information, where the determining the first information includes: determining the first information based on received DCI and/or determining the first information based on a quantity of times of receiving first HARQ response information and/or a quantity of times of not receiving the first HARQ response information in a first time window, where the first HARQ response information is first acknowledgement information or first negative acknowledgement information.

S26. The terminal device determines, based on the first information, modulation and coding scheme information corresponding to the modulation and coding scheme index.

S27. The terminal device transmits second information based on the determined modulation and coding scheme information.

In this embodiment of this application, serial numbers of the steps are merely an example and constitute no limitation on an actual execution sequence of the steps. In an application process, the execution sequence of the steps may change depending on different scenarios or requirements.

The terminal device obtains a CSI report by performing channel measurement on a CSI reference resource. The terminal device sends CSI obtained by encoding the CSI report to the network device, and the network device may receive the CSI from the terminal device.

S21 is an optional step, because the network device may alternatively send the modulation and coding scheme index to the terminal device or schedule the second information when the network device does not receive the CSI from the terminal device.

In addition, in this embodiment of this application, the network device may send the MCS index to the terminal device, and the network device may determine the first information and the MCS index in S22. For example, the network device may indicate the MCS index to the terminal device by using the DCI, and the terminal device may determine the MCS index based on the received DCI. In this case, S22 may be alternatively understood as follows: The network device sends the DCI to the terminal device, and the terminal device receives the DCI, where the DCI may indicate the MCS index. Specifically, the DCI includes an MCS field, and the MCS field may indicate the MCS index. Alternatively, the MCS index may be preconfigured in a protocol, and may be directly determined by the terminal device and the network device. In this case, S23 does not need to be performed, that is, the network device does not need to send the MCS index to the terminal device. In addition, in this case, the network device may choose to determine the MCS index in S22, or may determine the MCS index in any other step. Alternatively, the MCS index may be configured by the network device by using other signaling such as higher layer signaling. In this case, S23 may be understood as follows: The network device sends the other signaling such as the higher layer signaling to the terminal device, and the terminal device receives the other signaling such as the higher layer signaling. The other signaling such as the higher layer signaling may indicate the MCS index. In addition, in this case, S23 is not necessarily performed in a current sequence, and may be performed in any step before S26.

In view of this, S22 is also an optional step, because the terminal device may also determine the MCS index and the first information even if the network device does not send the MCS index.

In addition, S26 is also an optional step, because the terminal device does not necessarily transmit the second information. In FIG. 2, an arrow indicating an optional step is drawn as a dashed line to distinguish the optional step from other steps. In addition, the second information may be uplink information or downlink information. Therefore, in FIG. 2, a double-headed arrow is used to indicate the second information, that is, the double-headed arrow does not indicate that both the terminal device and the network device send the second information, but only indicates that the second information may be sent by the terminal device or may be sent by the network device. That the terminal device transmits the second information herein may be specifically as follows: The terminal device sends the second information, or the terminal device receives the second information.

If the network device does not receive the CSI from the terminal device, the network device may directly schedule the second information for the terminal device, or the terminal directly sends the second information. If the network device receives the CSI from the terminal device, the network device may schedule the second information for the terminal device based on the received CSI. It can be learned that, if the terminal device sends the CSI to the network device in a timelier manner, the network device may perform resource allocation and MCS selection for the terminal device more accurately, thereby improving system resource utilization and improving accuracy of transmitting the second information by the terminal device.

In this embodiment of this application, the DCI may be used to schedule the second information. For example, the DCI may indicate a time domain resource and/or a frequency domain resource used to transmit the second information. The second information includes data and/or control information, and the control information includes, for example, CSI, and may further include other information. The second information may be carried on a PUSCH, a physical downlink shared channel (PDSCH), or a PUCCH. For example, the second information may be uplink data and/or uplink control information carried on the PUSCH, or the second information may be downlink data and/or downlink control information carried on the PDSCH, or the second information may be uplink control information carried on the PUCCH. Alternatively, the DCI may not be used for scheduling. For example, the DCI may be specially used to indicate the first information.

The terminal device may determine the first information in different manners. For example, a manner of determining the first information by the terminal device includes but is not limited to at least one of the following manners.

A. Determine the first information based on the received DCI.

B. Determine the first information based on the quantity of times of receiving the first hybrid automatic repeat request (HARQ) response information and/or the quantity of times of not receiving the first HARQ response information in the first time window, where the first HARQ response information is the first acknowledgement information or the first negative acknowledgement information.

The following separately describes the foregoing two manners of determining the first information.

A. The terminal device determines the first information based on the received DCI.

In the manner A, the first information determined by the terminal device may include a plurality of different types of information. In a first example in the manner A, the first information determined by the terminal device includes at least one of the following: a modulation and coding scheme table indicated by the DCI, where the modulation and coding scheme table is at least one of a plurality of modulation and coding scheme tables; a modulation and coding scheme index offset value indicated by the DCI; a search space in which the DCI is located; a carrier on which the DCI is located; a cell in which the DCI is located; a bandwidth part (BWP) in which the DCI is located; a TAG in which the DCI is located; a PUCCH group in which the DCI is located; a subcarrier spacing of the DCI; a waveform of the DCI; a detection period of the DCI; a feedback time interval indicated by the DCI, where the feedback time interval is a time interval between sending data included in the second information and sending second HARQ response information corresponding to the data by the terminal device or is a time interval between sending DCI used for scheduling the second information and sending the second information by the terminal device; A-CSI indicated by the DCI; a control channel element (CCE) aggregation level of the DCI; and a control resource group (CORSET) in which the DCI is located.

Correspondingly, if the terminal device determines the first information based on the received DCI, because the network device determines the first information before sending the DCI, the network device directly determines the first information or determines the first information based on the to-be-sent DCI. For example, the first information determined by the network device correspondingly includes at least one of the following: a modulation and coding scheme table, where the modulation and coding scheme table is at least one of a plurality of modulation and coding scheme tables; a modulation and coding scheme index offset value; a search space in which the DCI is located; a carrier on which the DCI is located; a cell in which the DCI is located; a bandwidth part in which the DCI is located; a TAG in which the DCI is located; a PUCCH group in which the DCI is located; a subcarrier spacing of the DCI; a waveform of the DCI; a detection period of the DCI; a feedback time interval, where the feedback time interval is a time interval between sending data included in the second information and sending second HARQ response information corresponding to the data by the terminal device or is a time interval between sending DCI used for scheduling the second information and sending the second information by the terminal device; A-CSI; a CCE aggregation level of the DCI; and a CORSET in which the DCI is located.

The first information determined by the terminal device and the first information determined by the network device should be the same. For example, both the terminal device and the network device determine that the first information includes the carrier on which the DCI is located.

In the following description process, the first information, the determining, based on the first information, the MCS information corresponding to the MCS index, and the like are mainly described from the perspective of the terminal device. For the network device, a process of determining the first information, or content of the determined first information is also similar.

Then, the foregoing first information is separately described.

A1. The first information includes the modulation and coding scheme table indicated by the DCI.

It may be understood that in this embodiment of this application, the method may be alternatively described as follows: The terminal device determines the MCS index, and determines, based on the modulation and coding scheme table indicated by the DCI, the MCS information corresponding to the MCS index.

Alternatively, the method may be described as follows: The terminal device determines the MCS index, and determines, based on the received DCI, the MCS table indicated by the DCI, to determine, based on the MCS table indicated by the DCI, the MCS information corresponding to the MCS index.

A URLLC service may support one or more MCS tables, and one MCS table may correspond to one or more BLERs. Each of a plurality of MCS tables includes at least one type of MCS information, and each type of MCS information has a corresponding MCS index.

The terminal device may determine the MCS index based on the MCS field in the received DCI, or determine the MCS index by using a protocol, higher layer signaling, or the like. Generally, the MCS field in the DCI includes a fixed quantity of bits, and the bits represent a MCS index (0 to Y). Therefore, MCS indexes in the plurality of MCS tables are separately numbered. In this case, MCS indexes in different MCS tables may be the same. For example, an MCS index 1 exists in an MCS table 1, and the MCS index 1 also exists in an MCS table 2. Therefore, in addition to obtaining the MCS index, the terminal device needs to determine to use which MCS table, so that the MCS information corresponding to the MCS index can be uniquely determined.

Specifically, if the MCS table indicated by the DCI is a first MCS table, MCS information, in the first MCS table, corresponding to the MCS index is first MCS information; or if the MCS table indicated by the DCI is a second MCS table, MCS information, in the second MCS table, corresponding to the MCS index is second MCS information. Alternatively, if the MCS table indicated by the DCI is a first MCS table, the terminal device determines that MCS information, in the first MCS table, corresponding to the MCS index is first MCS information; or if the MCS table indicated by the DCI is a second MCS table, the terminal device determines that MCS information, in the second MCS table, corresponding to the MCS index is second MCS information.

Alternatively, the MCS table indicated by the DCI is at least one of a plurality of MCS tables, and the plurality of MCS tables include a first MCS table and a second MCS table. In this case, from the perspective of describing an MCS table, the solution in the implementation A1 may be alternatively described as follows: MCS information, included in the first MCS table, corresponding to the MCS index is first MCS information, and MCS information, included in the second MCS table, corresponding to the MCS index is second MCS information, where the first MCS information is different from the second MCS information.

In the implementation A1, the DCI may indicate the MCS table, and the terminal device may determine the MCS table based on the DCI, to determine the MCS information. If the DCI further indicates the MCS index, the terminal device can determine the MCS information without receiving more information, so that transmission resource occupation is reduced, and an indication manner is relatively simple.

A2. The first information includes the modulation and coding scheme index offset value indicated by the DCI.

It may be understood that in this embodiment of this application, the method may be alternatively described as follows: The terminal device determines the MCS index, and determines, based on the modulation and coding scheme index offset value indicated by the DCI, the MCS information corresponding to the MCS index.

Alternatively, the method may be described as follows: The terminal device determines the MCS index, and determines, based on the received DCI, the MCS index offset value indicated by the DCI, to determine, based on the MCS index offset value indicated by the DCI, the MCS information corresponding to the MCS index.

As described above, a modulation and coding scheme may be abbreviated as an MCS in this specification, and therefore the modulation and coding scheme index offset value may be abbreviated as an MCS index offset value. For example, the MCS index offset value indicated by the DCI is at least one of a plurality of MCS index offset values, and the plurality of MCS index offset values include a first MCS index offset value and a second MCS index offset value.

As described above, a system may support one or more MCS tables, and one MCS table may correspond to one or more BLERs. Each of a plurality of MCS tables includes at least one type of MCS information, and each type of MCS information has a corresponding MCS index.

In an example, the system supports one MCS table, and the MCS table corresponds to one or more BLERs. In the MCS table, MCS indexes may be sequentially numbered. The DCI may indicate the MCS index offset value, and the terminal device may determine, based on the MCS index offset value indicated by the DCI and the determined MCS index, MCS information in the MCS table indicated by the DCI. Specifically, the terminal device may add the MCS index offset value to (or subtract the MCS index offset value from) the determined MCS index to obtain an MCS index in the MCS table, and MCS information corresponding to the MCS index is the to-be-determined MCS information.

For example, MCS index numbers in the MCS table are 0 to 31. If the MCS index determined by the terminal device based on a higher layer signaling configuration or the MCS field in the DCI is 2, and the MCS index offset value indicated by the DCI is 16, the terminal device may determine an MCS index 18 in the MCS table, and MCS information indicated by the MCS index 18 is the MCS information to be determined by the terminal device. For example, all MCS index numbers in the MCS table are 0 to 31. If the MCS index determined by the terminal device based on a higher layer signaling configuration or the MCS field in the DCI is 2, and the MCS index offset value indicated by the DCI is −16, the terminal device may determine that an MCS index in the MCS table is equal to (MCS index+MCS index offset value) MOD a total quantity N of MCS index numbers, that is, (2−16)mod 32=14, and MCS information indicated by the MCS index 14 is the MCS information to be determined by the terminal device.

In another example, the system supports a plurality of MCS tables, and each MCS table may correspond to one or more BLERs. MCS indexes in the plurality of MCS tables may be numbered in a uniform sequence. For example, a first MCS table includes 16 pieces of MCS information, and corresponding MCS indexes are an MCS index 0 to an MCS index 15; a second MCS table includes 16 pieces of MCS information, and corresponding MCS indexes are an MCS index 16 to an MCS index 31, and so on. The DCI may indicate the MCS index offset value, and the terminal device may determine, based on the MCS index offset value indicated by the DCI and the determined MCS index, MCS information in an MCS table indicated by the DCI. Specifically, the terminal device may add the MCS index offset value to the determined MCS index to obtain an MCS index in one MCS table, and MCS information corresponding to the MCS index is the to-be-determined MCS information.

For example, if the MCS index offset value indicated by the DCI is a first index offset value, the MCS information corresponding to the MCS index is first MCS information; or if the MCS index offset value indicated by the DCI is a second index offset value, the MCS information corresponding to the MCS index is second MCS information. Alternatively, if the MCS index offset value indicated by the DCI is a first index offset value, the terminal device determines that the MCS information corresponding to the MCS index is first MCS information; or if the MCS index offset value indicated by the DCI is a second index offset value, the terminal device determines that the MCS information corresponding to the MCS index is second MCS information. Specifically, it may be understood that MCS information corresponding to the MCS index and the first index offset value is the first MCS information, and MCS information corresponding to the MCS index and the second index offset value is the second MCS information.

For example, there are two MCS tables, MCS indexes corresponding to 16 pieces of MCS information included in a first MCS table are an MCS index 0 to an MCS index 15, and MCS indexes corresponding to 16 pieces of MCS information included in a second MCS table are an MCS index 16 to an MCS index 31. For example, if the MCS index determined by the terminal device according to the indication of the DCI is 2, and the MCS index offset value indicated by the DCI is 16, the terminal device may obtain an MCS index 18, and MCS information indicated by the MCS index 18 is the MCS information to be determined by the terminal device. Alternatively, for example, if the MCS index determined by the terminal device according to the indication of the DCI is 2, and the MCS index offset value indicated by the DCI is 0, the terminal device may obtain an MCS index 0, and MCS information indicated by the MCS index 0 is the MCS information to be determined by the terminal device. The MCS index 18 is in the second MCS table, and the MCS index 0 is in the first MCS table. Therefore, it may be considered that the MCS index offset value can be used to indicate a specific MCS table.

Alternatively, the MCS index offset value indicated by the DCI is at least one of a plurality of MCS index offset values, and the plurality of MCS index offset values include a first MCS index offset value and a second MCS index offset value. From the perspective of describing an MCS index offset value, the solution in the implementation A2 may be alternatively described as follows: MCS information that is corresponding to the MCS index and corresponding to the first MCS index offset value is first MCS information, and MCS information that is corresponding to the MCS index and corresponding to the second MCS index offset value is second MCS information, where the first MCS information is different from the second MCS information.

That the MCS information that is corresponding to the MCS index and corresponding to the first MCS index offset value is the first MCS information described herein should be understood as that when the MCS index offset value indicated by the DCI is the first MCS index offset value, the MCS information corresponding to the MCS index is the first MCS information. Regardless of whether the MCS index offset value indicated by the DCI is the first MCS index offset value or the second MCS index offset value, the MCS index keeps unchanged. Therefore, a correspondence between an MCS index offset value and MCS information should be emphasized herein, instead of a correspondence between an MCS index offset value and the MCS index. Understanding of the case in which the MCS information that is corresponding to the MCS index and corresponding to the second MCS index offset value is the second MCS information is the same.

Regardless of whether the first information in the implementation A1 includes the MCS table indicated by the DCI or the first information in the implementation A2 includes the MCS index offset value indicated by the DCI, indication manners are relatively simple and direct and are easy to implement.

A3. The first information includes the search space in which the DCI is located.

It may be understood that in this embodiment of this application, the method may be alternatively described as follows: The terminal device determines the MCS index, and determines, based on the search space in which the DCI is located, the MCS information corresponding to the MCS index.

Alternatively, the method may be described as follows: The terminal device determines the MCS index, and determines, based on the received DCI, the search space in which the DCI is located, to determine, based on the search space in which the DCI is located, the MCS information corresponding to the MCS index.

Generally, a search space configured by the network device for the terminal device includes a common search space (CSS) and a user-specific search space. The user-specific search space is, for example, a user equipment-specific search space (USS). For example, the search space indicated by the DCI is at least one of a plurality of search spaces, and the plurality of search spaces include a common search space and a user-specific search space.

Specifically, if the search space in which the DCI is located is the common search space (or the terminal device receives the DCI in the common search space), the terminal device may determine that the MCS information corresponding to the MCS index is first MCS information; or if the search space in which the DCI is located is the user-specific search space (or the terminal device receives the DCI in the user-specific search space), the terminal device may determine that the MCS information corresponding to the MCS index is second MCS information. Alternatively, if the search space in which the DCI is located is the common search space, the MCS information corresponding to the MCS index is first MCS information; or if the search space in which the DCI is located is the user-specific search space, the MCS information corresponding to the MCS index is second MCS information.

Alternatively, the search space indicated by the DCI is at least one of a plurality of search spaces, and the plurality of search spaces include a common search space and a user-specific search space. In this case, from the perspective of describing a search space, the solution in the implementation A3 may be alternatively described as follows: MCS information that is corresponding to the MCS index and corresponding to the common search space is first MCS information, and MCS information that is corresponding to the MCS index and corresponding to the user-specific search space is second MCS information, where the first MCS information is different from the second MCS information.

That the MCS information that is corresponding to the MCS index and corresponding to the common search space is the first MCS information described herein should be understood as that when the search space indicated by the DCI is the common search space, the MCS information corresponding to the MCS index is the first MCS information. Regardless of whether the search space indicated by the DCI is the common search space or the user-specific search space, the MCS index keeps unchanged. Therefore, a correspondence between a search space and MCS information should be emphasized herein, instead of a correspondence between a search space and the MCS index. Understanding of the case in which the MCS information that is corresponding to the MCS index and corresponding to the user-specific search space is the second MCS information is the same.

Appearance frequency of the common search space is usually relatively low, and appearance frequency of the user-specific search space is usually relatively high. Therefore, the common search space is more suitable for MCS information with a relatively high BLER, and the user-specific search space is more suitable for MCS information with a relatively low BLER. From this perspective, a BLER corresponding to the second MCS information may be less than a BLER corresponding to the first MCS information.

It may be understood that, in this application, the DCI may be DCI used for scheduling the second information, DCI used for indicating the MCS index, or other DCI. This is not limited in this application.

A4. The first information includes the carrier on which the DCI is located.

It may be understood that in this embodiment of this application, the method may be alternatively described as follows: The terminal device determines the MCS index, and determines, based on the carrier on which the DCI is located, the MCS information corresponding to the MCS index.

Alternatively, the method may be described as follows: The terminal device determines the MCS index, and determines, based on the received DCI, the carrier on which the DCI is located, to determine, based on the carrier on which the DCI is located, the MCS information corresponding to the MCS index.

For example, the carrier on which the DCI is located is at least one of a plurality of carriers, and the plurality of carriers include a first carrier and a second carrier.

Specifically, if the carrier on which the DCI is located is the first carrier, the terminal device determines that the MCS information corresponding to the MCS index is first MCS information; or if the carrier on which the DCI is located is the second carrier, the terminal device determines that the MCS information corresponding to the MCS index is second MCS information. Alternatively, if the carrier on which the DCI is located is the first carrier, the MCS information corresponding to the MCS index is first MCS information; or if the carrier on which the DCI is located is the second carrier, the MCS information corresponding to the MCS index is second MCS information.

For example, in a system, a URLLC service may be carried on a specific carrier for transmission, and another service may be carried on another carrier for transmission. If the terminal device receives the DCI by using the carrier that carries the URLLC service, it indicates that the second information scheduled by using the DCI belongs to the URLLC service, the URLLC service requires relatively high reliability, and MCS information with a relatively low BLER may be selected. If the terminal device receives the DCI by using the carrier that carries the another service, it indicates that the second information scheduled by using the DCI belongs to a service other than the URLLC service, a reliability requirement of the another service is not as high as that of the URLLC service, and MCS information with a relatively high BLER may be selected.

Specifically, if the carrier on which the DCI is located is a primary component carrier, the MCS information corresponding to the MCS index is the first MCS information. If the carrier on which the DCI is located is a secondary component carrier, the MCS information corresponding to the MCS index is the second MCS information.

For example, the first carrier is a carrier that carries a service other than the URLLC service. As described above, the system supports a plurality of MCS tables, for example, supports two MCS tables. The terminal device may determine, based on the first carrier, to select an MCS table with a high BLER, for example, select a first MCS table, and then the terminal device may determine, based on the MCS index, to select which piece of MCS information in the first MCS table, for example, select the first MCS information. Likewise, for example, the second carrier is a carrier that carries the URLLC service, and the example in which the system supports two MCS tables is still used. The terminal device may determine, based on the second carrier, to select an MCS table with a low BLER, for example, select a second MCS table, and then the terminal device may determine, based on the MCS index, to select which piece of MCS information in the second MCS table, for example, select the second MCS information. Specifically, an MCS table corresponding to the primary component carrier is the first MCS table, and therefore the first MCS information is determined. An MCS table corresponding to the secondary component carrier is the second MCS table, and therefore the second MCS information is determined.

It should be noted that a correspondence between a carrier and MCS information may be predefined in the system or notified by using higher layer signaling or physical layer signaling.

Alternatively, the carrier on which the DCI is located is at least one of a plurality of carriers, and the plurality of carriers include a first carrier and a second carrier. In this case, from the perspective of describing a carrier, the solution in the implementation A4 may be alternatively described as follows: MCS information that is corresponding to the MCS index and corresponding to the first carrier is first MCS information, and MCS information that is corresponding to the MCS index and corresponding to the second carrier is second MCS information, where the first MCS information is different from the second MCS information.

That the MCS information that is corresponding to the MCS index and corresponding to the first carrier is the first MCS information described herein should be understood as that when the carrier on which the DCI is located is the first carrier, the MCS information corresponding to the MCS index is the first MCS information. Regardless of whether the carrier on which the DCI is located is the first carrier or the second carrier, the MCS index keeps unchanged. Therefore, a correspondence between a carrier and MCS information should be emphasized herein, instead of a correspondence between a carrier and the MCS index. Understanding of the case in which the MCS information that is corresponding to the MCS index and corresponding to the second carrier is the second MCS information is the same.

In addition, the first information may further include at least one of the cell in which the DCI is located, the BWP in which the DCI is located, the TAG in which the DCI is located, the PUCCH group in which the DCI is located, the subcarrier spacing of the DCI, and the waveform of the DCI. These cases are similar to the case in which the first information includes the carrier on which the DCI is located, and therefore are described together in the implementation A4.

For example, the first information includes the cell in which the DCI is located.

For example, a system or a protocol may specify in advance that or higher layer signaling or physical layer signaling is used to notify that, if the cell in which the DCI is located is a first cell, for example, a macro cell, the MCS information corresponding to the MCS index is first MCS information; or if the cell in which the DCI is located is a second cell, for example, a micro cell, the MCS information corresponding to the MCS index is second MCS information.

Specifically, the system or the protocol may specify in advance that or the higher layer signaling or the physical layer signaling is used to notify that some cells correspond to an MCS table with a high block error rate, and some cells correspond to an MCS table with a low block error rate. For example, it is specified that the first cell corresponds to an MCS table with a high block error rate, and the second cell corresponds to an MCS table with a low block error rate. If the cell in which the DCI is located is the first cell, the terminal device determines that the MCS information corresponding to the MCS index is the first MCS information; or if the cell in which the DCI is located is the second cell, the terminal device determines that the MCS information corresponding to the MCS index is the second MCS information. Alternatively, if the cell in which the DCI is located is the first cell, the MCS information corresponding to the MCS index is the first MCS information; or if the cell in which the DCI is located is the second cell, the MCS information corresponding to the MCS index is the second MCS information.

Alternatively, the cell in which the DCI is located is at least one of a plurality of cells, and the plurality of cells include a first cell and a second cell. In this case, from the perspective of describing a cell, this solution may be alternatively described as follows: MCS information that is corresponding to the MCS index and corresponding to the first cell is first MCS information, and MCS information that is corresponding to the MCS index and corresponding to the second cell is second MCS information, where the first MCS information is different from the second MCS information.

That the MCS information that is corresponding to the MCS index and corresponding to the first cell is the first MCS information described herein should be understood as that when the cell in which the DCI is located is the first cell, the MCS information corresponding to the MCS index is the first MCS information. Regardless of whether the cell in which the DCI is located is the first cell or the second cell, the MCS index keeps unchanged. Therefore, a correspondence between a cell and MCS information should be emphasized herein, instead of a correspondence between a cell and the MCS index. Understanding of the case in which the MCS information that is corresponding to the MCS index and corresponding to the second cell is the second MCS information is the same.

For example, the first information includes the BWP in which the DCI is located.

For example, a system or a protocol may specify in advance that or higher layer signaling or physical layer signaling is used to notify that, if the BWP in which the DCI is located is a first BWP, for example, an initial BWP or a default BWP, the MCS information corresponding to the MCS index is first MCS information; or if the BWP in which the DCI is located is a second BWP, for example, an active BWP, the MCS information corresponding to the MCS index is second MCS information.

Alternatively, the BWP in which the DCI is located is at least one of a plurality of BWPs, and the plurality of BWPs include a first BWP and a second BWP. In this case, from the perspective of describing a BWP, this solution may be alternatively described as follows: MCS information that is corresponding to the MCS index and corresponding to the first BWP is first MCS information, and MCS information that is corresponding to the MCS index and corresponding to the second BWP is second MCS information, where the first MCS information is different from the second MCS information.

That the MCS information that is corresponding to the MCS index and corresponding to the first BWP is the first MCS information described herein should be understood as that when the BWP in which the DCI is located is the first BWP, the MCS information corresponding to the MCS index is the first MCS information. Regardless of whether the BWP in which the DCI is located is the first BWP or the second BWP, the MCS index keeps unchanged. Therefore, a correspondence between a BWP and MCS information should be emphasized herein, instead of a correspondence between a BWP and the MCS index. Understanding of the case in which the MCS information that is corresponding to the MCS index and corresponding to the second BWP is the second MCS information is the same.

For example, the first information includes the TAG in which the DCI is located.

For example, a system or a protocol may specify in advance that or higher layer signaling or physical layer signaling is used to notify that, if the TAG in which the DCI is located is a first TAG, for example, a primary TAG, the MCS information corresponding to the MCS index is first MCS information; or if the TAG in which the DCI is located is a second TAG, for example, a secondary TAG, the MCS information corresponding to the MCS index is second MCS information.

Alternatively, the TAG in which the DCI is located is at least one of a plurality of TAGs, and the plurality of TAGs include a first TAG and a second TAG. In this case, from the perspective of describing a TAG, this solution may be alternatively described as follows: MCS information that is corresponding to the MCS index and corresponding to the first TAG is first MCS information, and MCS information that is corresponding to the MCS index and corresponding to the second TAG is second MCS information, where the first MCS information is different from the second MCS information.

That the MCS information that is corresponding to the MCS index and corresponding to the first TAG is the first MCS information described herein should be understood as that when the TAG in which the DCI is located is the first TAG, the MCS information corresponding to the MCS index is the first MCS information. Regardless of whether the TAG in which the DCI is located is the first TAG or the second TAG, the MCS index keeps unchanged. Therefore, a correspondence between a TAG and MCS information should be emphasized herein, instead of a correspondence between a TAG and the MCS index. Understanding of the case in which the MCS information that is corresponding to the MCS index and corresponding to the second TAG is the second MCS information is the same.

For example, the first information includes the PUCCH group (group) in which the DCI is located.

For example, a system or a protocol may specify in advance that or higher layer signaling or physical layer signaling is used to notify that, if the PUCCH group in which the DCI is located is a first PUCCH group, for example, a primary PUCCH group, the MCS information corresponding to the MCS index is first MCS information; or if the PUCCH group in which the DCI is located is a second PUCCH group, for example, a secondary PUCCH group, the MCS information corresponding to the MCS index is second MCS information.

Alternatively, the PUCCH group in which the DCI is located is at least one of a plurality of PUCCH groups, and the plurality of PUCCH groups includes a first PUCCH group and a second PUCCH group. In this case, from the perspective of describing a PUCCH group, this solution may be alternatively described as follows: MCS information that is corresponding to the MCS index and corresponding to the first PUCCH group is first MCS information, and MCS information that is corresponding to the MCS index and corresponding to the second PUCCH group is second MCS information, where the first MCS information is different from the second MCS information.

That the MCS information that is corresponding to the MCS index and corresponding to the first PUCCH group is the first MCS information described herein should be understood as that when the PUCCH group in which the DCI is located is the first PUCCH group, the MCS information corresponding to the MCS index is the first MCS information. Regardless of whether the PUCCH group in which the DCI is located is the first PUCCH group or the second PUCCH group, the MCS index keeps unchanged. Therefore, a correspondence between a PUCCH group and MCS information should be emphasized herein, instead of a correspondence between a PUCCH group and the MCS index. Understanding of the case in which the MCS information that is corresponding to the MCS index and corresponding to the second PUCCH group is the second MCS information is the same.

For example, the first information includes the subcarrier spacing of the DCI.

For example, a system or a protocol may specify in advance that or higher layer signaling or physical layer signaling is used to notify that, if the subcarrier spacing of the DCI is a first subcarrier spacing, for example, 60 kHz, the MCS information corresponding to the MCS index is first MCS information; or if the subcarrier spacing of the DCI is a second subcarrier spacing, for example, 15 kHz, the MCS information corresponding to the MCS index is second MCS information. A subcarrier spacing corresponding to the first MCS information is different from a subcarrier spacing corresponding to the second MCS information. Optionally, the subcarrier spacing corresponding to the first MCS information is greater than the subcarrier spacing corresponding to the second MCS information.

Alternatively, the subcarrier spacing of the DCI is at least one of a plurality of subcarrier spacings, and the plurality of subcarrier spacings include a first subcarrier spacing and a second subcarrier spacing. In this case, from the perspective of describing a subcarrier spacing, this solution may be alternatively described as follows: MCS information that is corresponding to the MCS index and corresponding to the first subcarrier spacing is first MCS information, and MCS information that is corresponding to the MCS index and corresponding to the second subcarrier spacing is second MCS information, where the first MCS information is different from the second MCS information.

That the MCS information that is corresponding to the MCS index and corresponding to the first subcarrier spacing is the first MCS information described herein should be understood as that when the subcarrier spacing of the DCI is the first subcarrier spacing, the MCS information corresponding to the MCS index is the first MCS information. Regardless of whether the subcarrier spacing of the DCI is the first subcarrier spacing or the second subcarrier spacing, the MCS index keeps unchanged. Therefore, a correspondence between a subcarrier spacing and MCS information should be emphasized herein, instead of a correspondence between a subcarrier spacing and the MCS index. Understanding of the case in which the MCS information that is corresponding to the MCS index and corresponding to the second subcarrier spacing is the second MCS information is the same.

For example, the first information includes the waveform of the DCI.

For example, a system or a protocol may specify in advance that or higher layer signaling or physical layer signaling is used to notify that, if the waveform of the DCI is a first waveform, for example, SC-FDMA, the MCS information corresponding to the MCS index is first MCS information; or if the waveform of the DCI is a second waveform, for example, OFDM, the MCS information corresponding to the MCS index is second MCS information. A waveform corresponding to the first MCS information is different from a waveform corresponding to the second MCS information.

Alternatively, the waveform of the DCI is at least one of a plurality of waveforms, and the plurality of waveforms include a first waveform and a second waveform. In this case, from the perspective of describing a waveform, this solution may be alternatively described as follows: MCS information that is corresponding to the MCS index and corresponding to the first waveform is first MCS information, and MCS information that is corresponding to the MCS index and corresponding to the second waveform is second MCS information, where the first MCS information is different from the second MCS information.

That the MCS information that is corresponding to the MCS index and corresponding to the first waveform is the first MCS information described herein should be understood as that when the waveform of the DCI is the first waveform, the MCS information corresponding to the MCS index is the first MCS information. Regardless of whether the waveform of the DCI is the first waveform or the second waveform, the MCS index keeps unchanged. Therefore, a correspondence between a waveform and MCS information should be emphasized herein, instead of a correspondence between a waveform and the MCS index. Understanding of the case in which the MCS information that is corresponding to the MCS index and corresponding to the second waveform is the second MCS information is the same.

Specific examples are similar to the case in which the first information includes the cell in which the DCI is located or the carrier on which the DCI is located, and details are not described again.

A5. The first information includes the detection period of the DCI.

It may be understood that in this embodiment of this application, the method may be alternatively described as follows: The terminal device determines the MCS index, and determines, based on the detection period of the received DCI, the MCS information corresponding to the MCS index.

Alternatively, the method may be described as follows: The terminal device determines the MCS index, and determines the detection period of the DCI based on the received DCI, to determine, based on the detection period of the DCI, the MCS information corresponding to the MCS index.

For example, the detection period of the DCI belongs to at least one of a plurality of detection period sets, and the plurality of detection period sets include a first detection period set and a second detection period set.

Specifically, if the detection period of the DCI belongs to the first detection period set, the terminal device determines that the MCS information corresponding to the MCS index is first MCS information; or if the detection period of the DCI belongs to the second detection period set, the terminal device determines that the MCS information corresponding to the MCS index is second MCS information. Alternatively, if the detection period of the DCI belongs to the first detection period set, the MCS information corresponding to the MCS index is first MCS information; or if the detection period of the DCI belongs to the second detection period set, the MCS information corresponding to the MCS index is second MCS information.

That the detection period of the DCI belongs to the first detection period set may be understood as that the detection period of the DCI is greater than or equal to a first detection period, and that the detection period of the DCI belongs to the second detection period set may be understood as that the detection period of the DCI is less than a second detection period. The first detection period and the second detection period are used as two thresholds, and may be specified in a protocol, or may be preset by the network device and notified to the terminal device by using higher layer signaling or dynamic signaling. The first detection period may be equal to or may not be equal to the second detection period. For example, the first detection period is greater than the second detection period.

For example, there are two MCS tables: a first MCS table and a second MCS table. If the detection period of the DCI is greater than or equal to the first detection period, the terminal device determines to select the first MCS table, and then may determine, based on the MCS index, to specifically select first MCS information in the first MCS table; or if the detection period of the DCI is less than the second detection period, the terminal device determines to select the second MCS table, and then may determine, based on the MCS index, to specifically select second MCS information in the second MCS table.

It may be understood that a shorter detection period of the DCI indicates that a requirement is more urgent, and such a service may be a URLLC service or another relatively urgent service. For such a service, an MCS table with a relatively low BLER may be used to ensure reliability. A longer detection period of the DCI indicates that a requirement is not very urgent, and a reliability requirement of such a service is usually not very high. For such a service, an MCS table with a relatively high BLER may be used.

Alternatively, the detection period of the DCI is at least one of a plurality of detection periods, and the plurality of detection periods include a first detection period and a second detection period. In this case, from the perspective of describing a detection period, the solution in the implementation A5 may be alternatively described as follows: MCS information that is corresponding to the MCS index and corresponding to the first detection period is first MCS information, and MCS information that is corresponding to the MCS index and corresponding to the second detection period is second MCS information, where the first MCS information is different from the second MCS information.

That the MCS information that is corresponding to the MCS index and corresponding to the first detection period is the first MCS information described herein should be understood as that when the detection period of the DCI is the first detection period, the MCS information corresponding to the MCS index is the first MCS information. Regardless of whether the detection period of the DCI is the first detection period or the second detection period, the MCS index keeps unchanged. Therefore, a correspondence between a detection period and MCS information or a correspondence between a detection period set and MCS information should be emphasized herein, instead of a correspondence between a detection period (or a detection period set) and the MCS index. Understanding of the case in which the MCS information that is corresponding to the MCS index and corresponding to the second detection period is the second MCS information is the same.

In this specification, an example in which the detection period of the DCI is greater than or equal to the first detection period and the MCS information corresponding to the MCS index is the first MCS information is used. Actually, when the detection period of the DCI is equal to the first detection period, the MCS information corresponding to the MCS index may not be the first MCS information. For example, if the first detection period is equal to the second detection period, when the detection period of the DCI is greater than or equal to the first detection period, the modulation and coding scheme information corresponding to the MCS index is the first MCS information, and when the detection period of the DCI is less than the first detection period, the MCS information corresponding to the MCS index is the second MCS information; or when the detection period of the DCI is greater than the first detection period, the MCS information corresponding to the MCS index is the first MCS information, and when the detection period of the DCI is less than or equal to the first detection period, the MCS information corresponding to the MCS index is the second MCS information.

That is, this specification sets no limitation on how to perform division in a case of "being equal to". When range division is performed below, any case involving "being equal to" is similar to this, and details are not described again below.

A6. The first information includes the feedback time interval indicated by the DCI.

It may be understood that in this embodiment of this application, the method may be alternatively described as follows: The terminal device determines the MCS index, and determines, based on the feedback time interval indicated by the DCI, the MCS information corresponding to the MCS index.

Alternatively, the method may be described as follows: The terminal device determines the MCS index, and determines, based on the received DCI, the feedback time interval indicated by the DCI, to determine, based on the feedback time interval indicated by the DCI, the MCS information corresponding to the MCS index.

For example, the feedback time interval indicated by the DCI belongs to at least one of a plurality of time interval sets, and the plurality of time interval sets include a first time interval set and a second time interval set.

Specifically, if the feedback time interval indicated by the DCI belongs to the first time interval set, the terminal device determines that the MCS information corresponding to the MCS index is first MCS information; or if the feedback time interval indicated by the DCI belongs to the second time interval set, the terminal device determines that the MCS information corresponding to the MCS index is second MCS information. Alternatively, if the feedback time interval indicated by the DCI belongs to the first time interval set, the MCS information corresponding to the MCS index is first MCS information; or if the feedback time interval indicated by the DCI belongs to the second time interval set, the MCS information corresponding to the MCS index is second MCS information.

That the feedback time interval belongs to the first time interval set may be understood as that the feedback time interval is greater than or equal to a first time interval, and that the feedback time interval belongs to the second time interval set may be understood as that the feedback time interval is less than a second time interval. The first time interval and the second time interval are used as two thresholds, and may be specified in a protocol, or may be preset by the network device and notified to the terminal device by using higher layer signaling or dynamic signaling. The first time interval may be equal to or may not be equal to the second time interval. For example, the first time interval is greater than the second time interval.

In an example, the feedback time interval is a time interval between sending data included in the second information and sending second HARQ response information corresponding to the data by the terminal device or is a time interval between sending DCI used for scheduling the second information and sending the second information by the terminal device.

In this specification, HARQ response information received by the terminal device is referred to as first HARQ response information, and the received HARQ response information includes acknowledgement information (ACK)/negative acknowledgement information (NACK). Therefore, acknowledgement information received by the terminal device is referred to as first acknowledgement information, and negative acknowledgement information received by the terminal device is referred to as first negative acknowledgement information. HARQ response information sent by the terminal device is referred to as the second HARQ response information, and the sent HARQ response information also includes acknowledgement information/negative acknowledgement information. Therefore, acknowledgement information sent by the terminal device is referred to as second acknowledgement information, and negative acknowledgement information sent by the terminal device is referred to as second negative acknowledgement information.

If the DCI is used to schedule downlink data, the feedback time interval may be a time interval between sending downlink data included in the second information and sending second HARQ response information corresponding to the downlink data by the terminal device; or if the DCI is used to schedule uplink data or uplink control information, the feedback time interval may be a time interval between DCI used for scheduling uplink data or uplink control information included in the second information and sending the uplink data or the uplink control information included in the second information by the terminal device.

For example, there are two MCS tables: a first MCS table and a second MCS table. If the feedback time interval indicated by the DCI is greater than or equal to the first time interval, the terminal device determines to select the first MCS table, and then may determine, based on the MCS index, to specifically select first MCS information in the first MCS table; or if the feedback time interval indicated by the DCI is less than the second time interval, the terminal device determines to select the second MCS table, and then may determine, based on the MCS index, to specifically select second MCS information in the second MCS table. For example, the first time interval and/or the second time interval are/is M1 slots (slot) or M2 symbols (symbol), where M1 is an integer greater than or equal to 0, and M2 is an integer greater than or equal to 1. For example, M1=0, and M2=14.

It may be understood that a shorter feedback time interval indicates that a requirement is more urgent, and such a service may be a URLLC service or another relatively urgent service. For such a service, an MCS table with a relatively low BLER may be used to ensure reliability. A longer feedback time interval indicates that a requirement is not very urgent, and a reliability requirement of such a service is usually not very high. For such a service, an MCS table with a relatively high BLER may be used.

In another example, the feedback time interval may be alternatively a time interval between a moment at which the network device sends the DCI or the terminal device receives the DCI and a moment corresponding to maximum duration for completing current service transmission.

Figure 3:
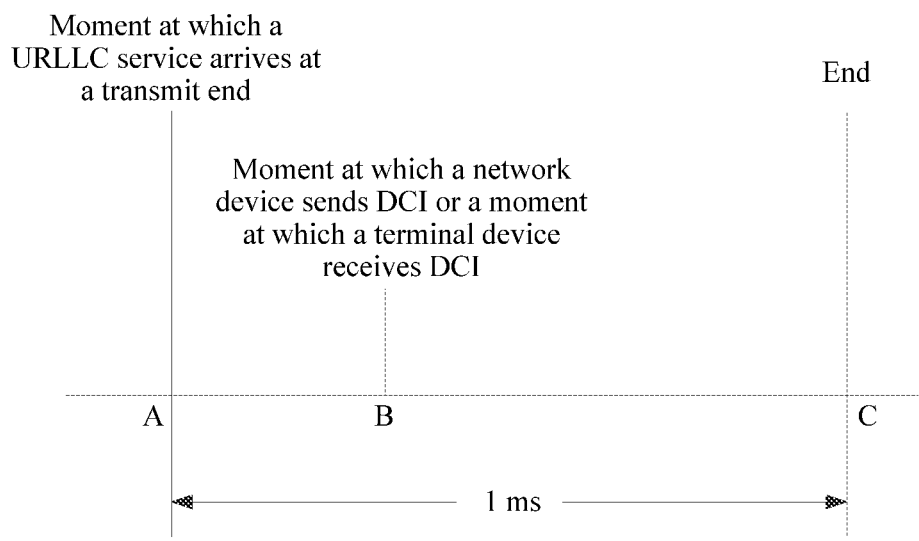
FIG. 3 is a schematic diagram of a time requirement of a URLLC service transmission process according to an embodiment of this application.

A URLLC service specifies maximum duration for completing service transmission, for example, current maximum duration is 1 ms. In other words, duration from a moment at which the URLLC service arrives at a transmit end to a moment at which current transmission of the URLLC service ends needs to be within 1 ms. Theoretically, the URLLC service starts to be transmitted only after the network device sends the DCI. However, the current transmission process already starts before the URLLC service is transmitted. For example, referring to FIG. 3, a point A in FIG. 3 indicates a moment at which the URLLC service arrives at the transmit end, a point B indicates the moment at which the network device sends the DCI or the moment at which the terminal device receives the DCI, and a point C indicates a moment at which the current transmission process ends. It can be learned that, the moment at which the network device sends the DCI or the moment at which the terminal device receives the DCI is after the moment at which the URLLC service arrives at the transmit end, and therefore duration of transmitting the URLLC service is duration from the point B to the point C, and the duration may also be the feedback time interval in this example. If the duration from the point B to the point C is very short, it indicates that a remaining time is not long, and an MCS table with a relatively low BLER is selected to improve transmission reliability and ensure that the service can be successfully transmitted at one time. If the duration from the point B to the point C is relatively long, it indicates that a remaining time is still sufficient, and an MCS table with a relatively high BLER may be selected.

Alternatively, the feedback time interval belongs to at least one of a plurality of time interval sets, and the plurality of time interval sets include a first time interval set and a second time interval set. In this case, from the perspective of describing a time interval set, the solution in the implementation A6 may be alternatively described as follows: MCS information that is corresponding to the MCS index and corresponding to the feedback time interval included in the first time interval set is first MCS information, and MCS information that is corresponding to the MCS index and corresponding to the feedback time interval included in the second time interval set is second MCS information, where the first MCS information is different from the second MCS information.

That the MCS information that is corresponding to the MCS index and corresponding to the feedback time interval included in the first time interval set is the first MCS information described herein should be understood as that when the feedback time interval belongs to the first time interval set, the MCS information corresponding to the MCS index is the first MCS information. Regardless of whether the feedback time interval belongs to the first time interval set or the second time interval set, the MCS index keeps unchanged. Therefore, a correspondence between a feedback time interval and MCS information or a correspondence between a time interval set and MCS information should be emphasized herein, instead of a correspondence between a feedback time interval (or a time interval set) and the MCS index. Understanding of the case in which the MCS information that is corresponding to the MCS index and corresponding to the feedback time interval included in the second time interval set is the second MCS information is the same.

In this embodiment, there is also a division case of "being equal to". Similar to the implementation A5, in this embodiment, for example, a case in which the feedback time interval is equal to the first time interval is consistent with a case in which the feedback time interval is greater than the first time interval. This is not limited thereto in practice. For specific description of the case of "being equal to", refer to the implementation A5. Details are not described again.

A moment at which the downlink data included in the second information is sent may be a moment at which the network device sends the downlink data included in the second information or a moment at which the terminal device receives the downlink data included in the second information. This is not limited in this embodiment of this application. The following uses the moment at which the network device sends the downlink data included in the second information as an example.

Further, the time interval between sending the downlink data included in the second information and sending the second HARQ response information corresponding to the downlink data by the terminal device includes but is not limited to at least one of the following implementations:

a time interval between a start moment of a symbol on which the downlink data included in the second information is sent and a start moment of a symbol on which the terminal device sends the second HARQ response information corresponding to the downlink data; a time interval between an end moment of the symbol on which the downlink data included in the second information is sent and a start moment of the symbol on which the terminal device sends the second HARQ response information corresponding to the downlink data; a time interval between an index of the symbol on which the downlink data included in the second information is sent and an index of the symbol on which the terminal device sends the second HARQ response information corresponding to the downlink data, where the time interval is, for example, a difference between the two indexes; a time interval between a start moment of a slot (slot) in which the downlink data included in the second information is sent and a start moment of a slot in which the terminal device sends the second HARQ response information corresponding to the downlink data; a time interval between an end moment of the slot in which the downlink data included in the second information is sent and a start moment of the slot in which the terminal device sends the second HARQ response information corresponding to the downlink data; and a time interval between an index of the slot in which the downlink data included in the second information is sent and an index of the slot in which the terminal device sends the second HARQ response information corresponding to the downlink data, where the time interval is, for example, a difference between the two indexes.

A7. The first information includes the modulation and coding scheme table indicated by the DCI and/or the modulation and coding scheme index offset value indicated by the DCI, and further includes a format of the DCI.

It may be understood that in this embodiment of this application, the method may be alternatively described as follows: The terminal device determines the MCS index, and determines, based on the modulation and coding scheme table indicated by the DCI and/or the modulation and coding scheme index offset value indicated by the DCI, and the format of the DCI, the MCS information corresponding to the MCS index.

Alternatively, the method may be described as follows: The terminal device determines the MCS index, and determines, based on the received DCI, the modulation and coding scheme table indicated by the DCI and/or the modulation and coding scheme index offset value indicated by the DCI, and the format of the DCI, to determine, based on the modulation and coding scheme table indicated by the DCI and/or the modulation and coding scheme index offset value indicated by the DCI, and the format of the DCI, the MCS information corresponding to the MCS index.

For example, the format of the DCI may include a first DCI format and a second DCI format. DCI in the first DCI format may be referred to as compact (compact) DCI, and DCI in the second DCI format may be referred to as fallback (fallback) DCI. It may be understood that the DCI in the first DCI format is DCI applicable to a URLLC service. The DCI in the second DCI format is DCI applicable to all services, for example, a DCI format 0_0 and a DCI format 1_0. In addition to the first DCI format and the second DCI format, there is DCI in a third DCI format, which may be referred to as common DCI. The DCI in the third DCI format may be DCI in an NR system or an LTE system, that is, DCI that does not distinguish between services, for example, a DCI format 0_1 and a DCI format 1_1.

The technical solution provided in this embodiment of this application is mainly applied to the DCI in the first DCI format, that is, the DCI received by the terminal device is the DCI in the first DCI format. The DCI includes a first bit information field and a second bit information field, and the first bit information field may be used to carry the first information. Therefore, the terminal device may determine, based on the first information bit field, the modulation and coding scheme table indicated by the DCI and/or the modulation and coding scheme index offset value indicated by the DCI. A quantity of bits included in the second information bit field is greater than or equal to 1. In addition, a sum of a size of the first bit information field and a size of the second bit information field in the DCI in the first DCI format is equal to a size of a second bit information field in the DCI in the second DCI format. The second information bit field includes but is not limited to at least one of the following implementations:

Implementation 1: The quantity of bits in the second bit information field is less than or equal to 2, and the second bit information field is used to indicate a feedback time from the second information to HARQ response information.

Implementation 2: The quantity of bits in the second bit information field is less than or equal to 3, and the second bit information field is used to indicate a time domain resource occupied by the second information.

Implementation 3: The quantity of bits in the second bit information field is equal to 1, the second bit information field is used to indicate a redundancy version (redundancy version, RV), and the redundancy version is 0 or 3.

Implementation 4: The quantity of bits in the second bit information field is equal to 1, the second bit information field is used to indicate a transmit power command word of the terminal device, and the transmit power command word is 0 or 3.

Implementation 5: The quantity of bits in the second bit information field is equal to 4, and the second bit information field is used to indicate the modulation and coding scheme index.

The following separately describes the foregoing several implementations.

In the implementation 1, the second bit information field is used to indicate a feedback time from the second information to the HARQ response information, that is, indicate the feedback time interval in the implementation A6, and the second bit information field may comprise a downlink data to HARQ feedback time indicator (PDSCH-to-HARQ_feedback timing indicator) in the DCI.

For example, in the DCI in the second DCI format, a size (size) of the PDSCH-to-HARQ_feedback timing indicator is equal to X1 bits, where X1=3. In the DCI in the first DCI format, the second bit information field in the PDSCH-to-HARQ_feedback timing indicator in the DCI may be still used to implement a function of PDSCH-to-HARQ_feedback timing, that is, indicate the feedback time interval, and the first bit information field in the DCI is used to carry the first information. The size of the PDSCH-to-HARQ_feedback timing indicator field in the second format may be greater than or equal to the sum of the size of the first bit information field and the size of the second bit information field in the DCI in the first DCI format. For example, the size of the PDSCH-to-HARQ_feedback timing indicator field in the second format is equal to the sum of the size of the first bit information field and the size of the second bit information field in the DCI in the first DCI format. In the DCI in the first DCI format, the size of the second bit information field is less than or equal to X1−1 bits, and the size of the first bit information field is greater than or equal to 1 bit. It may be considered that the DCI in the second DCI format does not include the first bit information field, but includes the second bit information field.

In the implementation 1, it may be considered that both the first bit information field and the second bit information field included in the DCI in the first DCI format is the PDSCH-to-HARQ_feedback timing indicator field, but different bits included in the PDSCH-to-HARQ_feedback timing indicator field are used to implement different functions. Alternatively, it may be considered that the first bit information field in the DCI in the first DCI format is used as an independent bit information field. In this case, it is considered, based on a configuration or a predefinition, that the second bit information field in the DCI in the first DCI format is scaled down when compared with the second bit information field in the DCI in the second DCI format. It may be understood that the first bit information field no longer belongs to the PDSCH-to-HARQ_feedback timing indicator field.

For example, a unit of a bit information field is a slot. When a URLLC service is being transmitted, due to a latency requirement, usually, a relatively long slot is not instructed to feed back HARQ response information. In this case, even if the HARQ response information is fed back, the HARQ response information may expire. Therefore, in the DCI in the first DCI format, the PDSCH-to-HARQ_feedback timing indicator field may be properly scaled down, or a bit information field used to implement the original function of the PDSCH-to-HARQ_feedback timing indicator field is properly scaled down. After the PDSCH-to-HARQ_feedback timing indicator field is scaled down, remaining bits originally belonging to the PDSCH-to-HARQ_feedback timing indicator field may be used to carry the first information. Alternatively, after the PDSCH-to-HARQ_feedback timing indicator field is scaled down, a quantity of saved bits may be used to indicate the first information.

It may be understood that, in this embodiment, a total quantity of bits of the DCI in the first DCI format and a total quantity of bits of the DCI in the second DCI format may be set to be the same. In this way, a quantity of blind detection times can be reduced, and power of the terminal device is saved.

In the implementation 2, the second bit information field is used to indicate the time domain resource occupied by the second information. If the DCI in the first DCI format is used to schedule downlink data, the second bit information field may belong to a time-domain PDSCH resource field in the DCI. If the DCI in the first DCI format is used to schedule uplink data or uplink control information, the second bit information field may belong to a time-domain PUSCH resource field in the DCI.

Currently, in the DCI in the second DCI format, a maximum size of the time-domain PDSCH resource field or the time-domain PUSCH resource field is X2 bits, for example, X2=4. In the DCI in the first DCI format, the second bit information field in the time-domain PDSCH resource field or the time-domain PUSCH resource field in the DCI may be still used to implement a function of the time-domain PDSCH resource field or the time-domain PUSCH resource field, that is, indicate the time domain resource occupied by the second information, and the first bit information field in the time-domain PDSCH resource field or the time-domain PUSCH resource field in the DCI is used to carry the first information. In the DCI in the first DCI format, the size of the time-domain PDSCH resource field or the time-domain PUSCH resource field may be greater than or equal to the sum of the size of the first bit information field and the size of the second bit information field. For example, in the DCI in the first DCI format, the size of the time-domain PDSCH resource field or the time-domain PUSCH resource field is equal to the sum of the size of the first bit information field and the size of the second bit information field. The size of the second bit information field is less than or equal to X2−1 bits, and the size of the first bit information field is greater than or equal to 1 bit.

It may be considered that the DCI in the second DCI format does not include the first bit information field, but includes the second bit information field, where both the first bit information field and the second bit information field belong to the time-domain PDSCH resource field or the time-domain PUSCH resource field. In the implementation 2, it may be considered that both the first bit information field and the second bit information field in the DCI in the first DCI format also belong to the time-domain PDSCH resource field or the time-domain PUSCH resource field, but different bits included in the time-domain PDSCH resource field or the time-domain PUSCH resource field are used to implement different functions. Alternatively, it may be considered that the first bit information field in the DCI in the first DCI format is used as an independent bit information field. In this case, it is considered, based on a configuration or a predefinition, that the second bit information field in the DCI in the first DCI format is scaled down when compared with the second bit information field in the DCI in the second DCI format. It may be understood that the first bit information field no longer belongs to the time-domain PDSCH resource field or the time-domain PUSCH resource field.

The time-domain PDSCH resource field is used to indicate a length of a time domain resource occupied by a PDSCH, and the time-domain PUSCH resource field is used to indicate a length of a time domain resource occupied by a PUSCH. Therefore, when a URLLC service is being transmitted, due to a latency requirement, usually, a channel that occupies a very large quantity of time domain resources is not instructed to transmit data. In this case, even if a channel is received at a receive end, service expiration is prone to occur after a decoding time ends. Therefore, in the DCI in the first DCI format, the time-domain PDSCH resource field or the time-domain PUSCH resource field may be properly scaled down, or a bit information field used to implement the original function of the time-domain PDSCH resource field or the time-domain PUSCH resource field is properly scaled down. After the time-domain PDSCH resource field or the time-domain PUSCH resource field is scaled down, remaining bits originally belonging to the time-domain PDSCH resource field or the time-domain PUSCH resource field may be used to carry the first information. Alternatively, after the time-domain PDSCH resource field or the time-domain PUSCH resource field is scaled down, a quantity of saved bits may be used to indicate the first information.

In the implementation 3, the second bit information field is used to indicate the redundancy version, and the second bit information field may belong to an RV field in the DCI.

Currently, in the DCI in the second DCI format, a size of the RV field is equal to X3 bits, for example, X3=2. In the DCI in the first DCI format, the second bit information field in the RV field in the DCI may be still used to implement a function of the RV field, that is, indicate the redundancy version, and the first bit information field in the RV field in the DCI is used to carry the first information. In the DCI in the first DCI format, the size of the RV field may be greater than or equal to the sum of the size of the first bit information field and the size of the second bit information field. For example, in the DCI in the first DCI format, the size of the RV field is equal to the sum of the size of the first bit information field and the size of the second bit information field. The size of the second bit information field is equal to X3−1 bits, and the size of the first bit information field is equal to 1 bit.

It may be considered that the DCI in the second DCI format does not include the first bit information field, but includes the second bit information field, where both the first bit information field and the second bit information field belong to the RV field. In the implementation 3, it may be considered that both the first bit information field and the second bit information field in the DCI in the first DCI format also belong to the RV field, but different bits included in the RV field are used to implement different functions. Alternatively, it may be considered that the first bit information field in the DCI in the first DCI format is used as an independent bit information field. In this case, it is considered, based on a configuration or a predefinition, that the second bit information field in the first DCI is scaled down when compared with the second bit information field in the second DCI. It may be understood that the first bit information field no longer belongs to the RV field.

In a 5G NR system, generally, if the RV version is 0 or 3, a receive end can implement self-decoding after one transmission succeeds, without subsequent transmission. However, if the RV version is 1 or 2, only a part of information can be transmitted at one time, and remaining information further needs to be transmitted next time. However, if a URLLC service has a strict time requirement for service transmission completion, for example, 1 ms, it is likely that there is no chance of retransmission. Therefore, in this embodiment of this application, the RV version 0 or 3 is more proper for the URLLC service. In view of this, the second bit information field may be used to indicate that the RV version is 0 or 3, and remaining one bit in the RV field may be used to carry the first information. Alternatively, after the RV field is scaled down, a quantity of saved bits may be used to indicate the first information. However, a specific indication result of the second bit information field is not limited in this embodiment of this application. For example, the second bit information field may indicate that the RV version is 0 or 1, or indicate that the RV version is 1 or 2.

In the implementation 4, the second bit information field is used to indicate the transmit power command word of the terminal device, and the second bit information field may belong to a transmit power control PC) field in the DCI. If the DCI in the first DCI format is used to schedule downlink data, the second bit information field may belong to a transmit power control command for a PUCCH (TPC command for scheduled PUCCH) in the DCI. If the DCI in the first DCI format is used to schedule uplink data or uplink control information, the second bit information field may belong to a transmit power control command for a PUSCH (TPC command for scheduled PUSCH) in the DCI.

Currently, in the DCI in the second DCI format, a size of the TPC field is equal to X4 bits. In the DCI in the first DCI format, the second bit information field in the TPC field in the DCI may be still used to implement a function of the TPC field, that is, indicate the transmit power command word, and the first bit information field in the TPC field in the DCI is used to carry the first information. In the DCI in the first DCI format, the size of the TPC field may be greater than or equal to the sum of the size of the first bit information field and the size of the second bit information field. For example, in the DCI in the first DCI format, the size of the TPC field is equal to the sum of the size of the first bit information field and the size of the second bit information field. The size of the second bit information field is equal to X4−1 bits, and the size of the first bit information field is equal to 1 bit.

It may be considered that the DCI in the second DCI format does not include the first bit information field, but includes the second bit information field, where both the first bit information field and the second bit information field belong to the TPC field. In the implementation 4, it may be considered that both the first bit information field and the second bit information field in the DCI in the first DCI format also belong to the TPC field, but different bits included in the TPC field are used to implement different functions. Alternatively, it may be considered that the first bit information field in the DCI in the first DCI format is used as an independent bit information field. In this case, it is considered, based on a configuration or a predefinition, that the second bit information field in the first DCI is scaled down when compared with the second bit information field in the second DCI. It may be understood that the first bit information field no longer belongs to the TPC field.

Therefore, specific indication manners of the second bit information field in the DCI in the first DCI format include but are not limited to the following several possibilities:

Possibility 1: The second bit information field is 1 bit, and is used to indicate 0 or indicate +3/+4.

Possibility 2: The second bit information field is 1 bit, and is used to indicate +1 or indicate +3/+4.

Possibility 3: The second bit information field is 1 bit, and is used to indicate 0 or indicate +1.

If the second bit information field indicates 0, it indicates that transmit power is not adjusted, and if the second bit information field indicates +3, it indicates that the transmit power is scaled up by 3, and so on.

In a 5G NR system, a URLLC service is relatively important. Therefore, in the foregoing possibilities, a scale-down power adjustment factor is removed from the TPC command word, that is, the power is scaled up or is not adjusted to ensure reliability of the URLLC service. However, this is not limited thereto in practice. For example, the second bit information field may also indicate the scale-down power adjustment factor. For example, the second bit information field is 1, and is used to indicate +1 or indicate −3/−4/−1, where if the second bit information field indicates −3, it indicates that the transmit power is scaled down by 3, and so on. Specifically, content indicated by the second bit information field is not limited in this embodiment of this application.

In the implementation 5, the second bit information field is used to indicate the modulation and coding scheme index, and the second bit information field may belong to an MCS field in the DCI. This information field is used to indicate the MCS index.

Currently, in the DCI in the second DCI format, a size of the MCS field is equal to X5 bits, for example, X5=5. In the DCI in the first DCI format, the second bit information field in the MCS field in the DCI may be still used to implement a function of the MCS field, that is, indicate the modulation and coding scheme index, and the first bit information field in the MCS field in the DCI is used to carry the first information. In the DCI in the first DCI format, the size of the MCS field may be greater than or equal to the sum of the size of the first bit information field and the size of the second bit information field. For example, in the DCI in the first DCI format, the size of the MCS field is equal to the sum of the size of the first bit information field and the size of the second bit information field. The size of the second bit information field is equal to X5−1 bits, and the size of the first bit information field is equal to 1 bit.

It may be considered that the DCI in the second DCI format does not include the first bit information field, but includes the second bit information field, where both the first bit information field and the second bit information field belong to the MCS field. In the implementation 5, it may be considered that both the first bit information field and the second bit information field in the DCI in the first DCI format also belong to the MCS field, but different bit information included in the MCS field is used to implement different functions. Alternatively, it may be considered that the first bit information field in the DCI in the first DCI format is used as an independent bit information field. In this case, it is considered, based on a configuration or a predefinition, that the second bit information field in the first DCI is scaled down when compared with the second bit information field in the second DCI. It may be understood that the first bit information field no longer belongs to the MCS field.

Generally, a CQI table is indicated by using 4 bits, and a CQI table and an MCS table corresponding to a same BLER are corresponding to each other, that is, the MCS table may also be indicated by using 4 bits. Therefore, remaining one bit in the MCS field may be used to carry the first information, or a quantity of saved bits may be used to indicate the first information after scale-down, to make better use of DCI resources.

X1, X2, X3, X4, and X5 described above are positive integers greater than or equal to 1. It may be understood that when X1−1=0, information corresponding to the corresponding second bit information field indicates a meaning configured by using higher layer signaling or a predefined meaning, and this is similarly applied to X2, X3, X4, and X5. Details are not described herein again.

A8. The first information includes the A-CSI indicated by the DCI.

A premise of this embodiment is that the DCI carries an information field used to trigger the terminal device to report the A-CSI, and the DCI may instruct, by using the information field, the terminal device to report the A-CSI.

It may be understood that in this embodiment of this application, the method may be alternatively described as follows: The terminal device determines the MCS index, and determines, based on the A-CSI indicated by the DCI, the MCS information corresponding to the MCS index.

Alternatively, the method may be described as follows: The terminal device determines the MCS index, and determines, based on the received DCI, the A-CSI indicated by the DCI, to determine, based on the A-CSI indicated by the DCI, the MCS information corresponding to the MCS index.

In an example, the A-CSI indicated by the DCI is at least one of a plurality of pieces of A-CSI, and the plurality of pieces of A-CSI include first CSI and second CSI. If the A-CSI indicated by the DCI includes the first CSI, the terminal device determines that the MCS information corresponding to the MCS index is first MCS information; or if the A-CSI indicated by the DCI includes the second CSI, the terminal device determines that the MCS information corresponding to the MCS index is second MCS information. Alternatively, if the A-CSI indicated by the DCI includes the first CSI, the MCS information corresponding to the MCS index is first MCS information; or if the A-CSI indicated by the DCI includes the second CSI, the MCS information corresponding to the MCS index is second MCS information.

For example, the network device or a protocol may predefine a correspondence between A-CSI and a BLER. The terminal device may learn of the correspondence between A-CSI and a BLER by using the protocol, or the correspondence may be notified to the terminal device by using higher layer signaling or dynamic signaling. The first CSI corresponds to a first BLER, and the second CSI corresponds to a second BLER. If the DCI instructs the terminal device to report the first CSI, it indicates that the terminal device needs to report the CSI of the first BLER; or if the DCI instructs the terminal device to report the second CSI, it indicates that the terminal device needs to report the CSI of the second BLER. Both the first CSI and the second CSI are A-CSI. There is a correspondence between A-CSI and a BLER, and there is a correspondence between a BLER and an MCS table. Therefore, it may be considered that there is a correspondence between A-CSI, a BLER, and an MCS table. For example, if the first CSI corresponds to the first BLER, and the first BLER corresponds to a first MCS table, it may be considered that the first CSI also corresponds to the first MCS table; or if the second CSI corresponds to the second BLER, and the second BLER corresponds to a second MCS table, it may be considered that the second CSI also corresponds to the second MCS table. If the DCI instructs the terminal device to report the first CSI, the terminal device may determine to select the first MCS table, and the terminal device may determine first MCS information in the first MCS table based on the MCS index; or if the DCI instructs the terminal device to report the second CSI, the terminal device may determine to select the second MCS table, and the terminal device may determine second MCS information in the second MCS table based on the MCS index. Specifically, the first CSI and the second CSI herein may be CSI reports, or may be information entries included in specific CSI.

Alternatively, the A-CSI indicated by the DCI is at least one of a plurality of pieces of A-CSI, and the plurality of pieces of A-CSI includes first CSI and second CSI. In this case, from the perspective of describing A-CSI, the solution in the implementation A8 may be alternatively described as follows: MCS information that is corresponding to the MCS index and corresponding to the first CSI is first MCS information, and MCS information that is corresponding to the MCS index and corresponding to the second CSI is second MCS information, where the first MCS information is different from the second MCS information.

That the MCS information that is corresponding to the MCS index and corresponding to the first CSI is the first MCS information described herein should be understood as that when the A-CSI indicated by the DCI is the first CSI, the MCS information corresponding to the MCS index is the first MCS information. Regardless of whether the A-CSI indicated by the DCI is the first CSI or the second CSI, the MCS index keeps unchanged. Therefore, a correspondence between A-CSI and MCS information should be emphasized herein, instead of a correspondence between A-CSI and the MCS index. Understanding of the case in which the MCS information that is corresponding to the MCS index and corresponding to the second CSI is the second MCS information is the same.

For example, CSI includes one or more pieces of CSI content, and the CSI content includes a CQI, an RI, a PMI, and the like. If the A-CSI indicated by the DCI includes slowly changing information, such as an RI and/or RSRP, it indicates that the CSI may be a less urgent service, and an MCS table with a relatively high BLER is required. If the A-CSI indicated by the DCI includes rapidly changing information, such as a CQI and/or a PMI, it indicates that the CSI may be a relatively urgent service, and an MCS table with a relatively low BLER is required. For another example, if the A-CSI indicated by the DCI includes a CSI part 2, it indicates that the CSI may be a less urgent service, and an MCS table with a relatively high BLER is required. If CSI included in the A-CSI indicated by the DCI includes only a CSI part 1, it indicates that the CSI may be a relatively urgent service, and an MCS table with a relatively low BLER is required. It should be noted that a correspondence between an MCS table and a BLER is not limited herein, that is, the correspondence between an MCS table and a BLER may be predefined or may be configured by using higher layer signaling.

It may be understood that the terminal device determines the MCS index, and determines, based on CSI content included in the CSI, the MCS information corresponding to the MCS index.

For example, CSI includes one or more bit information quantities of the CSI, and CSI content includes bit information such as a CQI, an RI, and a PMI. If a bit information quantity included in the A-CSI indicated by the DCI is greater than or equal to a first bit quantity, it indicates that CSI may be a less urgent service, and an MCS table with a relatively high BLER is required. If a bit information quantity included in the A-CSI indicated by the DCI is less than a second bit quantity, it indicates that CSI may be a relatively urgent service, and an MCS table with a relatively low BLER is required.

It may be understood that the terminal device determines the MCS index, and determines, based on a bit information quantity of CSI included in the CSI, the MCS information corresponding to the MCS index.

In another example, CSI included in the A-CSI indicated by the DCI corresponds to a plurality of BLERs, and the plurality of BLERs include a highest BLER and a lowest BLER, where the highest BLER is a BLER with a largest value, and the lowest BLER is a BLER with a smallest value. In this case, the terminal device determines that the MCS information corresponding to the MCS index is MCS information corresponding to a specific BLER. Alternatively, CSI included in the A-CSI indicated by the DCI corresponds to a plurality of BLERs, and the MCS information corresponding to the MCS index is MCS information corresponding to a specific BLER. The specific BLER is, for example, a highest BLER, that is, a BLER with a largest value, for example, MCS information corresponding to the highest BLER is first MCS information; or the specific BLER is, for example, a lowest BLER, that is, a BLER with a smallest value, for example, MCS information corresponding to the lowest BLER is second MCS information; or the specific BLER may be a BLER other than the highest BLER and the lowest BLER.

For example, the CSI includes one or more CSI reports (report), and different CSI reports may correspond to different BLERs. In this case, CSI included in the A-CSI indicated by the DCI may correspond to a plurality of BLERs. For example, one MCS table corresponds to one BLER. The terminal device may select one MCS table from a plurality of MCS tables, such as an MCS table corresponding to a highest BLER or an MCS table corresponding to a lowest BLER, and then may determine the MCS information based on the MCS index. That the terminal device selects which MCS table corresponding to which BLER may be predefined by the protocol, or may be notified by using higher layer signaling or dynamic signaling.

The two examples in the implementation A8 may be separately used, or may be combined.

In addition, CSI included in the A-CSI indicated by the DCI corresponds to a plurality of BLERs, and the plurality of BLERs includes a highest BLER and a lowest BLER. In this case, from the perspective of describing a BLER, the solution in the implementation A8 may be alternatively described as follows: MCS information that is corresponding to the MCS index and corresponding to the highest BLER is first MCS information, and MCS information that is corresponding to the MCS index and corresponding to the lowest BLER is second MCS information; or MCS information that is corresponding to the MCS index and corresponding to the lowest BLER is first MCS information, and MCS information that is corresponding to the MCS index and corresponding to the highest BLER is second MCS information, where the first MCS information is different from the second MCS information.

That the MCS information that is corresponding to the MCS index and corresponding to the highest BLER is the first MCS information described herein should be understood as that when the A-CSI indicated by the DCI is CSI corresponding to the highest BLER, the MCS information corresponding to the MCS index is the first MCS information. Regardless of whether the A-CSI indicated by the DCI corresponds to the highest BLER or the lowest BLER, the MCS index keeps unchanged. Therefore, a correspondence between A-CSI and MCS information or a correspondence between a BLER corresponding to A-CSI and MCS information should be emphasized herein, instead of a correspondence between A-CSI (or a BLER corresponding to A-CSI) and the MCS index. Understanding of the case in which the MCS information that is corresponding to the MCS index and corresponding to the lowest BLER is the second MCS information, or the MCS information that is corresponding to the MCS index and corresponding to the lowest BLER is the first MCS information, or the MCS information that is corresponding to the MCS index and corresponding to the highest BLER is the second MCS information, or the like is the same.

In this embodiment, there is also a division case of "being equal to". Similar to the implementation A5, in this embodiment, for example, a case in which the bit information quantity included in the A-CSI indicated by the DCI is equal to the first bit quantity is consistent with a case in which the bit information quantity included in the A-CSI indicated by the DCI is greater than the first bit quantity. This is not limited thereto in practice. For specific description of the case of "being equal to", refer to the implementation A5. Details are not described again.

A9. The first information includes the CCE aggregation level of the DCI.

It may be understood that in this embodiment of this application, the method may be alternatively described as follows: The terminal device determines the MCS index, and determines, based on the CCE aggregation level of the DCI, the MCS information corresponding to the MCS index.

Alternatively, the method may be described as follows: The terminal device determines the MCS index, and determines the CCE aggregation level of the DCI based on the received DCI, to determine, based on the CCE aggregation level of the DCI, the MCS information corresponding to the MCS index.

For example, the CCE aggregation level of the DCI belongs to at least one of a plurality of aggregation level sets, and the plurality of aggregation level sets include a first aggregation level set and a second aggregation level set.

Specifically, if the CCE aggregation level of the DCI belongs to the first aggregation level set, the terminal device determines that the MCS information corresponding to the MCS index is first MCS information; or if the CCE aggregation level of the DCI belongs to the second aggregation level set, the terminal device determines that the MCS information corresponding to the MCS index is second MCS information. Alternatively, if the CCE aggregation level of the DCI belongs to the first aggregation level set, the MCS information corresponding to the MCS index is first MCS information; or if the CCE aggregation level of the DCI belongs to the second aggregation level set, the MCS information corresponding to the MCS index is second MCS information.

That the CCE aggregation level of the DCI belongs to the first aggregation level set may be understood as that the aggregation level of the DCI is less than a first aggregation level, and that the aggregation level of the DCI belongs to the second aggregation level set may be understood as that the aggregation level of the DCI is greater than or equal to a second aggregation level. The first aggregation level and the second aggregation level are used as two thresholds, and may be specified in a protocol, or may be preset by the network device and notified to the terminal device by using higher layer signaling or dynamic signaling. The first aggregation level may be equal to or may not be equal to the second aggregation level. For example, the first aggregation level is less than the second aggregation level.

It may be understood that if an aggregation level is high, a probability that the terminal device can receive the DCI is higher. In this case, it is likely that a reliability requirement of the terminal device is relatively high, and an MCS table with a relatively low BLER may be used to ensure reliability. On the contrary, if an aggregation level is low, the terminal device may probably not receive the DCI. Therefore, in this case, a reliability requirement of the terminal device is not very high, and an MCS table with a relatively high BLER may be used.

For example, there are two MCS tables: a first MCS table and a second MCS table, a BLER corresponding to the first MCS table is 10e−3, and a BLER corresponding to the second MCS table is 10e−5. For example, if the CCE aggregation level of the DCI is 4 and belongs to the first aggregation level set, the terminal device determines to select the first MCS table, and the MCS information corresponding to the MCS index is first MCS information in the first MCS table; or if the CCE aggregation level of the DCI is 8 or 16 and belongs to the second aggregation level set, the terminal device determines to select the second MCS table, and the MCS information corresponding to the MCS index is second MCS information in the second MCS table.

Alternatively, the CCE aggregation level of the DCI belongs to at least one of a plurality of aggregation level sets, and the plurality of aggregation level sets include a first aggregation level set and a second aggregation level set. In this case, from the perspective of describing an aggregation level set, the solution in the implementation A9 may be alternatively described as follows: MCS information that is corresponding to the MCS index and corresponding to the first aggregation level set is first MCS information, and MCS information that is corresponding to the MCS index and corresponding to the second aggregation level set is second MCS information, where the first MCS information is different from the second MCS information.

That the MCS information that is corresponding to the MCS index and corresponding to the first aggregation level set is the first MCS information described herein should be understood as that when the CCE aggregation level of the DCI belongs to the first aggregation level set, the MCS information corresponding to the MCS index is the first MCS information. Regardless of whether the CCE aggregation level of the DCI belongs to the first aggregation level set or the second aggregation level set, the MCS index keeps unchanged. Therefore, a correspondence between an aggregation level set and MCS information or a correspondence between the CCE aggregation level of the DCI and MCS information should be emphasized herein, instead of a correspondence between an aggregation level set (or the CCE aggregation level of the DCI) and the MCS index. Understanding of the case in which the MCS information that is corresponding to the MCS index and corresponding to the second aggregation level set is the second MCS information is the same.

In this embodiment, there is also a division case of "being equal to". Similar to the implementation A5, in this embodiment, for example, a case in which the aggregation level of the DCI is equal to the second aggregation level is consistent with a case in which the aggregation level of the DCI is greater than the second aggregation level. This is not limited thereto in practice. For specific description of the case of "being equal to", refer to the implementation A5. Details are not described again.

A10. The first information includes the CORSET in which the DCI is located.

It may be understood that in this embodiment of this application, the method may be alternatively described as follows: The terminal device determines the MCS index, and determines, based on the CORSET in which the DCI is located, the MCS information corresponding to the MCS index.

Alternatively, the method may be described as follows. The terminal device determines the MCS index, and determines, based on the received DCI, the CORSET in which the DCI is located, to determine, based on the CORSET in which the DCI is located, the MCS information corresponding to the MCS index.

For example, the CORSET in which the DCI is located belongs to at least one of a plurality of CORSET sets, and the plurality of CORSET sets include a first CORSET set and a second CORSET set.

Specifically, if the CORSET in which the DCI is located belongs to the first CORSET set, the terminal device determines that the MCS information corresponding to the MCS index is first MCS information; or if the CORSET in which the DCI is located belongs to the second CORSET set, the terminal device determines that the MCS information corresponding to the MCS index is second MCS information. Alternatively, if the CORSET in which the DCI is located belongs to the first CORSET set, the MCS information corresponding to the MCS index is first MCS information; or if the CORSET in which the DCI is located belongs to the second CORSET set, the MCS information corresponding to the MCS index is second MCS information.

In an example, a corresponding resource element group (REG) bundle size in the first CORSET set belongs to a first REG bundle size set and/or a corresponding REG bundle size in the second CORSET set belongs to a second REG bundle size set.

In this case, if the CORSET in which the DCI is located belongs to the first CORSET set, the MCS information corresponding to the MCS index is the first MCS information; or if the CORSET in which the DCI is located belongs to the second CORSET set, the MCS information corresponding to the MCS index is the second MCS information. Alternatively, if a REG bundle size of the DCI belongs to the first REG bundle size set, the MCS information corresponding to the MCS index is the first MCS information; or if a REG bundle size of the DCI belongs to the second REG bundle size set, the MCS information corresponding to the MCS index is the second MCS information.

That the REG bundle size belongs to the first REG bundle size set may be understood as that the REG bundle size is less than a first REG bundle size, and that the REG bundle size belongs to the second REG bundle size set may be understood as that the REG bundle size is greater than or equal to a second REG bundle size. The first REG bundle size and the second REG bundle size are used as two thresholds, and may be specified in a protocol, or may be preset by the network device and notified to the terminal device by using higher layer signaling or dynamic signaling. The first REG bundle size may be equal to or may not be equal to the second REG bundle size. For example, the first REG bundle size is less than the second REG bundle size.

If a REG bundle size is large, a probability that the terminal device can receive the DCI is higher. In this case, it is likely that a reliability requirement of the terminal device is relatively high, and an MCS table with a relatively low BLER may be used to ensure reliability. On the contrary, if a REG bundle size is small, the terminal device may probably not receive the DCI. Therefore, in this case, a reliability requirement of the terminal device is not very high, and an MCS table with a relatively high BLER may be used.

For example, there are two MCS tables: a first MCS table and a second MCS table, a BLER corresponding to the first MCS table is 10e−3, and a BLER corresponding to the second MCS table is 10e−5. For example, if the REG bundle size of the DCI is 2 and belongs to the first REG bundle size set, the terminal device determines to select the first MCS table, and the MCS information corresponding to the MCS index is first MCS information in the first MCS table; or if the REG bundle size of the DCI is 6 and belongs to the second REG bundle size set, the terminal device determines to select the second MCS table, and the MCS information corresponding to the MCS index is second MCS information in the second MCS table.

Alternatively, the CORSET in which the DCI is located belongs to at least one of a plurality of CORSET sets, and the plurality of CORSET sets include a first CORSET set and a second CORSET set. In this case, from the perspective of describing a CORSET set, the solution in the implementation A10 may be alternatively described as follows: MCS information that is corresponding to the MCS index and corresponding to the first CORSET set is first MCS information, and MCS information that is corresponding to the MCS index and corresponding to the second CORSET set is second MCS information, where the first MCS information is different from the second MCS information.

That the MCS information that is corresponding to the MCS index and corresponding to the first CORSET set is the first MCS information described herein should be understood as that when the CORSET in which the DCI is located belongs to the first CORSET set, the MCS information corresponding to the MCS index is the first MCS information. Regardless of whether the CORSET in which the DCI is located belongs to the first CORSET set or the second CORSET set, the MCS index keeps unchanged. Therefore, a correspondence between a CORSET set and MCS information or a correspondence between the CORSET in which the DCI is located and MCS information should be emphasized herein, instead of a correspondence between a CORSET set (or the CORSET in which the DCI is located) and the MCS index. Understanding of the case in which the MCS information that is corresponding to the MCS index and corresponding to the second CORSET set is the second MCS information is the same.

In this embodiment, there is also a division case of "being equal to". Similar to the implementation A5, in this embodiment, for example, a case in which the REG bundle size of the DCI is equal to the second REG bundle size is consistent with a case in which the REG bundle size of the DCI is greater than the second REG bundle size. This is not limited thereto in practice. For specific description of the case of "being equal to", refer to the implementation A5. Details are not described again.

In this embodiment of this application, the method may be alternatively described as follows: The terminal device determines the MCS index, and determines, based on the subcarrier spacing of the DCI, the MCS information corresponding to the MCS index. This embodiment is similar to a subcarrier spacing of a resource corresponding to the second information described below, and details are not described herein.

The first information determined based on the DCI described above may be understood as information directly determined based on the DCI. The following describes several types of first information determined based on the DCI. The first information determined based on the DCI described below may be understood as information indirectly determined based on the DCI.

In a second example in the manner A, the DCI is used to instruct to transmit the second information. In this case, the determining the first information may include: determining the first information based on a resource corresponding to the second information that is transmitted according to the instruction of the DCI, where the first information includes at least one of the following: a carrier on which the resource corresponding to the second information is located; a cell in which the resource corresponding to the second information is located; a BWP in which the resource corresponding to the second information is located; a TAG in which the resource corresponding to the second information is located; a PUCCH group in which the resource corresponding to the second information is located; a PUCCH format corresponding to the resource corresponding to the second information; a subcarrier spacing of the resource corresponding to the second information; a waveform of the resource corresponding to the second information; and a time domain length of the resource corresponding to the second information.

Because the second information is determined based on the DCI, and then the first information is determined based on the resource corresponding to the second information, it may be understood that the first information is indirectly determined based on the DCI. In the second example in the manner A, a manner in which the terminal device determines the first information is the same as a manner in which the network device determines the first information, and the determined first information is also the same.

In the following description process, the first information, the determining, based on the first information, the MCS information corresponding to the MCS index, and the like are mainly described from the perspective of the terminal device. For the network device, a process of determining the first information, or content of the determined first information is also similar.

The resource corresponding to the second information may be understood as a resource used to carry the second information. Because the second information has not been sent when the first information is determined, the resource used to carry the second information is described as the resource corresponding to the second information. The terminal device may determine the resource corresponding to the second information by using the DCI. For example, the DCI may indicate the resource corresponding to the second information. Alternatively, the resource corresponding to the second information may be specified in a protocol, or may be determined by using higher layer signaling or other dynamic signaling.

The foregoing several types of first information are separately described below.

A11. The first information includes the carrier on which the resource corresponding to the second information is located.

It may be understood that in this embodiment of this application, the method may be alternatively described as follows: The terminal device determines the MCS index, and determines, based on the carrier on which the resource corresponding to the second information is located, the MCS information corresponding to the MCS index.

Alternatively, the method may be described as follows: The terminal device determines the MCS index, and determines the carrier on which the resource corresponding to the second information that is transmitted according to the instruction of the received DCI is located, to determine, based on the carrier on which the resource corresponding to the second information is located, the MCS information corresponding to the MCS index.

For example, the carrier on which the resource corresponding to the second information is located is at least one of a plurality of carriers, and the plurality of carriers include a first carrier and a second carrier.

Specifically, if the carrier on which the resource corresponding to the second information is located is the first carrier, the terminal device determines that the MCS information corresponding to the MCS index is first MCS information; or if the carrier on which the resource corresponding to the second information is located is the second carrier, the terminal device determines that the MCS information corresponding to the MCS index is second MCS information. Alternatively, if the carrier on which the resource corresponding to the second information is located is the first carrier, the MCS information corresponding to the MCS index is first MCS information; or if the carrier on which the resource corresponding to the second information is located is the second carrier, the MCS information corresponding to the MCS index is second MCS information.

For example, in a system, a URLLC service may be carried on a specific carrier for transmission, and another service may be carried on another carrier for transmission. If the second information is transmitted by using the carrier that carries the URLLC service, it indicates that the second information belongs to the URLLC service, the URLLC service requires relatively high reliability, and an MCS table with a relatively low BLER may be selected. If the second information is transmitted by using the carrier that carries the another service, it indicates that the second information belongs to a service other than the URLLC service, a reliability requirement of the another service is not as high as that of the URLLC service, and an MCS table with a relatively high BLER may be selected.

Specifically, if the carrier on which the resource corresponding to the second information is located is a primary component carrier, the MCS information corresponding to the MCS index is the first MCS information. If the carrier on which the resource corresponding to the second information is located is a secondary component carrier, the MCS information corresponding to the MCS index is the second MCS information.

For example, the first carrier is a carrier that carries a service other than the URLLC service. As described above, the system supports a plurality of MCS tables, for example, supports two MCS tables. The terminal device may determine, based on the first carrier, to select an MCS table with a high BLER, for example, select a first MCS table, and then the terminal device may determine, based on the MCS index, to select which piece of MCS information in the first MCS table, for example, select the first MCS information. Likewise, for example, the second carrier is a carrier that carries the URLLC service, and the example in which the system supports two MCS tables is still used. The terminal device may determine, based on the second carrier, to select an MCS table with a low BLER, for example, select a second MCS table, and then the terminal device may determine, based on the MCS index, to select which piece of MCS information in the second MCS table, for example, select the second MCS information. Specifically, an MCS table corresponding to the primary component carrier is the first MCS table, and therefore the first MCS information is determined. An MCS table corresponding to the secondary component carrier is the second MCS table, and therefore the second MCS information is determined.

It should be noted that a correspondence between a carrier and MCS information may be predefined in the system or notified by using higher layer signaling or physical layer signaling.

Alternatively, the carrier on which the resource corresponding to the second information is located is at least one of a plurality of carriers, and the plurality of carriers include a first carrier and a second carrier. In this case, from the perspective of describing a carrier, the solution in the implementation A11 may be alternatively described as follows: MCS information that is corresponding to the MCS index and corresponding to the first carrier is first MCS information, and MCS information that is corresponding to the MCS index and corresponding to the second carrier is second MCS information, where the first MCS information is different from the second MCS information.

That the MCS information that is corresponding to the MCS index and corresponding to the first carrier is the first MCS information described herein should be understood as that when the carrier on which the resource corresponding to the second information is located is the first carrier, the MCS information corresponding to the MCS index is the first MCS information. Regardless of whether the carrier on which the resource corresponding to the second information is located is the first carrier or the second carrier, the MCS index keeps unchanged. Therefore, a correspondence between a carrier and MCS information should be emphasized herein, instead of a correspondence between a carrier and the MCS index. Understanding of the case in which the MCS information that is corresponding to the MCS index and corresponding to the second carrier is the second MCS information is the same.

In addition, the first information may further include at least one of the cell in which the resource corresponding to the second information is located, the BWP in which the resource corresponding to the second information is located, the TAG in which the resource corresponding to the second information is located, the PUCCH group in which the resource corresponding to the second information is located, the subcarrier spacing of the resource corresponding to the second information, the PUCCH format corresponding to the resource corresponding to the second information, and the waveform of the resource corresponding to the second information. These cases are similar to the case in which the first information includes the carrier on which the resource corresponding to the second information is located, and therefore are described together in the implementation A1.

For example, the first information includes the cell in which the resource corresponding to the second information is located. For example, a system or a protocol may specify in advance that or higher layer signaling or physical layer signaling is used to notify that some cells correspond to an MCS table with a high block error rate, and some cells correspond to an MCS table with a low block error rate. For example, it is specified that a first cell corresponds to an MCS table with a high block error rate, and a second cell corresponds to an MCS table with a low block error rate. If the cell in which the resource corresponding to the second information is located is the first cell, the terminal device determines that the MCS information corresponding to the MCS index is first MCS information; or if the cell in which the resource corresponding to the second information is located is the second cell, the terminal device determines that the MCS information corresponding to the MCS index is second MCS information. Alternatively, if the cell in which the resource corresponding to the second information is located is the first cell, the MCS information corresponding to the MCS index is first MCS information; or if the cell in which the resource corresponding to the second information is located is the second cell, the MCS information corresponding to the MCS index is second MCS information. For example, the first cell is a macro cell, and the second cell is a micro cell; or the second cell is a macro cell, and the first cell is a micro cell.

That the first information includes the content such as the BWP in which the resource corresponding to the second information is located, the TAG in which the resource corresponding to the second information is located, the PUCCH group in which the resource corresponding to the second information is located, the subcarrier spacing of the resource corresponding to the second information, the PUCCH format corresponding to the resource corresponding to the second information, or the waveform of the resource corresponding to the second information is similar to the case in which the first information includes the cell in which the resource corresponding to the second information is located or the carrier on which the resource corresponding to the second information is located, and is similar to A4. Details are not described again.

A12. The first information includes the time domain length of the resource corresponding to the second information.

It may be understood that in this embodiment of this application, the method may be alternatively described as follows: The terminal device determines the MCS index, and determines, based on the time domain length of the resource corresponding to the second information, the MCS information corresponding to the MCS index.

Alternatively, the method may be described as follows: The terminal device determines the MCS index, and determines the time domain length of the resource corresponding to the second information that is transmitted according to the instruction of the received DCI, to determine, based on the time domain length of the resource corresponding to the second information, the MCS information corresponding to the MCS index.

For example, the time domain length of the resource corresponding to the second information belongs to at least one of a plurality of time domain length sets, and the plurality of time domain length sets include a first time domain length set and a second time domain length set.

Specifically, if the time domain length of the resource corresponding to the second information belongs to the first time domain length set, the terminal device determines that the MCS information corresponding to the MCS index is first MCS information; or if the time domain length of the resource corresponding to the second information belongs to the second time domain length set, the terminal device determines that the MCS information corresponding to the MCS index is second MCS information. Alternatively, if the time domain length of the resource corresponding to the second information belongs to the first time domain length set, the MCS information corresponding to the MCS index is first MCS information; or if the time domain length of the resource corresponding to the second information belongs to the second time domain length set, the MCS information corresponding to the MCS scheme index is second MCS information.

The resource corresponding to the second information may be a PDSCH, a PUSCH, or a PUCCH, and the determined time domain length of the resource corresponding to the second information may be a time domain length of the PDSCH, the PUSCH, or the PUCCH that carries the second information. A time domain length unit herein may be a symbol, a slot, a mini-slot, or the like, and this is not specifically limited.

That the time domain length of the resource corresponding to the second information belongs to the first time domain length set may be understood as that the time domain length of the resource corresponding to the second information is greater than or equal to a first time domain length, and that the time domain length of the resource corresponding to the second information belongs to the second time domain length set may be understood as that the time domain length of the resource corresponding to the second information is less than a second time domain length. The first time domain length and the second time domain length are used as two thresholds, and may be specified in a protocol, or may be preset by the network device and notified to the terminal device by using higher layer signaling or dynamic signaling. The first time domain length may be equal to or may not be equal to the second time domain length. For example, the first time domain length is less than the second time domain length.

If the time domain length of the resource corresponding to the second information is relatively short, it indicates that the second information may be a relatively urgent service, or a transmission time left for the second information is relatively short, and an MCS table with a relatively low BLER is required, to ensure that the second information can be successfully transmitted in a relatively short time. If the time domain length of the resource corresponding to the second information is relatively long, it indicates that the second information may be a less urgent service, or a transmission time left for the second information is relatively long, and an MCS table with a relatively high BLER may be used.

For example, there are two MCS tables: a first MCS table and a second MCS table, a BLER corresponding to the first MCS table is 10e−3, and a BLER corresponding to the second MCS table is 10e−5. For example, if the time domain length of the resource corresponding to the second information is greater than or equal to the first time domain length and belongs to the first time domain length set, the terminal device determines to select the first MCS table, and the MCS information corresponding to the MCS index is first MCS information in the first MCS table; or if the time domain length of the resource corresponding to the second information is less than the second time domain length and belongs to the second time domain length set, the terminal device determines to select the second MCS table, and the MCS information corresponding to the MCS index is second MCS information in the second MCS table.

Alternatively, the time domain length of the resource corresponding to the second information belongs to at least one of a plurality of time domain length sets, and the plurality of time domain length sets include a first time domain length set and a second time domain length set. In this case, from the perspective of describing a time domain length set, the solution in the implementation A12 may be alternatively described as follows: MCS information that is corresponding to the MCS index and corresponding to the first time domain length set is first MCS information, and MCS information that is corresponding to the MCS index and corresponding to the second time domain length set is second MCS information, where the first MCS information is different from the second MCS information.

That the MCS information that is corresponding to the MCS index and corresponding to the first time domain length set is the first MCS information described herein should be understood as that when the time domain length of the resource corresponding to the second information belongs to the first time domain length set, the MCS information corresponding to the MCS index is the first MCS information. Regardless of whether the time domain length of the resource corresponding to the second information belongs to the first time domain length set or the second time domain length set, the MCS index keeps unchanged. Therefore, a correspondence between a time domain length set and MCS information or a correspondence between the time domain length of the resource corresponding to the second information and MCS information should be emphasized herein, instead of a correspondence between a time domain length set (or the time domain length of the resource corresponding to the second information) and the MCS index. Understanding of the case in which the MCS information that is corresponding to the MCS index and corresponding to the second time domain length set is the second MCS information is the same.

In this embodiment, there is also a division case of "being equal to". Similar to the implementation A5, in this embodiment, for example, a case in which the time domain length of the resource corresponding to the second information is equal to the first time domain length is consistent with a case in which the time domain length of the resource corresponding to the second information is greater than the first time domain length. This is not limited thereto in practice. For specific description of the case of "being equal to", refer to the implementation A5. Details are not described again.

The implementations in the manner A may be separately applied, or any several implementations may be combined. One type of content of the first information may be considered as one implementation.

The manner in which the first information is determined based on the DCI is described above, and another manner of determining the first information is described below.

B. Determine the first information based on the quantity of times of receiving the first HARQ response information and/or the quantity of times of not receiving the first HARQ response information in the first time window, where the first HARQ response information is the first acknowledgement information or the first negative acknowledgement information.

In the manner B, there may also be one or more types of determined first information. For example, the first information includes at least one of the following: a quantity of times of receiving first negative acknowledgement information and/or the quantity of times of not receiving the first HARQ response information in the first time window; a quantity of times of receiving first acknowledgement information in the first time window; a ratio of the quantity of times of receiving the first negative acknowledgement information and/or the quantity of times of not receiving the first HARQ response information in the first time window to a total quantity of required times of receiving the first HARQ response information in the first time window; and a ratio of the quantity of times of receiving the first acknowledgement information in the first time window to the total quantity of required times of receiving the first HARQ response information in the first time window.

The determining manners described in the manner A are manners of determining the first information by the terminal device. Correspondingly, in the manner B, that the network device determines the first information may include: determining the first information based on a quantity of times of sending the first HARQ response information in the first time window, where the first HARQ response information is the first acknowledgement information or the first negative acknowledgement information.

In the manner B, there may also be one or more types of first information determined by the network device. For example, the first information includes at least one of the following: a quantity of times of sending the first negative acknowledgement information in the first time window; a quantity of times of sending the first acknowledgement information in the first time window; a ratio of the quantity of times of sending the first negative acknowledgement information in the first time window to a total quantity of required times of sending the first HARQ response information in the first time window; and a ratio of the quantity of times of sending the first acknowledgement information in the first time window to the total quantity of required times of sending the first HARQ response information in the first time window.

For the terminal device, a reason why the first negative acknowledgement information is not received may be a packet loss caused by a network fault or the like. For the network device, the first HARQ response information should be sent for data transmitted each time. Therefore, the network device may not consider a quantity of times of not sending the first negative acknowledgement information in the first time window.

The first information determined by the terminal device and the first information determined by the network device should be the same. For example, both the terminal device and the network device determine that the first information includes the carrier on which the DCI is located.

In the following description process, the first information, the determining, based on the first information, the MCS information corresponding to the MCS index, and the like are mainly described from the perspective of the terminal device. For the network device, a process of determining the first information, or content of the determined first information is also similar.

In this embodiment of this application, the first time window may be specified in a protocol, or may be configured by the network device and is notified to the terminal device by using higher layer signaling or dynamic signaling.

The first time window is, for example, a unit time that uses a moment at which the DCI carrying the MCS information is received as an end moment or a unit time that uses a moment at which the MCS information is determined as an end moment. Alternatively, the first time window uses a moment at which the first acknowledgement information is received as a start moment and a moment at which the first piece of first negative acknowledgement information is received after the first acknowledgement information is received as an end moment, or uses a moment at which the first acknowledgement information is received as a start moment and a moment at which the first HARQ response information is not received for the first time after the first acknowledgement information is received as an end moment, or uses a moment at which the first acknowledgement information is received as a start moment and an end moment of preset duration after the first acknowledgement information is received as an end moment. The first acknowledgement information herein may be any first acknowledgement information in a transmission process. Alternatively, the first time window corresponds to a start moment and an end moment at which one time unit is located.

The moment at which the MCS information is determined may be understood as a start moment or an end moment of a symbol on which the moment at which the MCS information is determined is located, or may be understood as a start moment or an end moment of a slot in which the moment at which the MCS information is determined is located. The moment at which the DCI carrying the MCS information is received may be understood as a start moment or an end moment or an index of a symbol on which the moment at which the DCI carrying the MCS information is received is located, or may be understood as a start moment or an end moment or an index of a slot in which the moment at which the DCI carrying the MCS information is received is located.

The moment at which the first acknowledgement information is received may be understood as a start moment or an end moment or an index of a symbol on which the moment at which the first acknowledgement information is received is located, or may be understood as a start moment or an end moment or an index of a slot in which the moment at which the first acknowledgement information is received is located.

The moment at which the first negative acknowledgement information is received may be understood as a start moment or an end moment or an index of a symbol on which the moment at which the first negative acknowledgement information is received is located, or may be understood as a start moment or an end moment or an index of a slot in which the moment at which the first negative acknowledgement information is received is located.

The moment at which the first HARQ response information is not received may be understood as a start moment or an end moment of a symbol on which the moment at which the first HARQ response information is not received is located, or may be understood as a start moment or an end moment of a slot in which the moment at which the first HARQ response information is not received is located.

The end moment of the preset duration after the first acknowledgement information is received may be understood as a start moment or an end moment or an index of a symbol on which the end moment of the preset duration after the first acknowledgement information is received is located, or may be understood as a start moment or an end moment or an index of a slot in which the end moment of the preset duration after the first acknowledgement information is received is located.

In addition, a unit time may be understood as a symbol, a slot, a mini-slot, or the like. If the first time window is a unit time that uses the moment at which the MCS information is determined as an end moment, it may be understood that for the first time window, Z1 unit times are pushed forward by using the moment at which the MCS information is determined as an end moment, where Z1 is a positive integer. If the first time window is a unit time that uses the moment at which the DCI carrying the MCS information is received as an end moment, it may be understood that for the first time window, Z2 unit times are pushed forward by using the moment at which the DCI carrying the MCS information is received as an end moment, where Z2 is a positive integer. For example, the first time window is defined as 1 ms.

A start moment and an end moment corresponding to one time unit may be understood as a quantity of times of receiving the first HARQ response information and/or a quantity of times of not receiving the first HARQ response information in one time unit, where one time unit may be Y1 slots or Y2 symbols. The time unit may be predefined or may be notified by using higher layer signaling or dynamic signaling, and Y1 and Y2 are positive integers.

If the first time window uses the moment at which the first acknowledgement information is received as a start moment and the end moment of the preset duration after the first acknowledgement information is received as an end moment, when one piece of first acknowledgement information is received, it may be determined to enter one first time window, and a timer is started. Timing duration of the timer is the preset duration. When the timer expires, it is determined that the first time window ends, and the timer is refreshed. When another piece of first acknowledgement information is received next time, the timer is started again to enter a next first time window.

Alternatively, the moment at which the first acknowledgement information is received is used as a start moment, and the moment at which the first HARQ response information is not received for the first time after the first acknowledgement information is received is used as an end moment.

The following separately describes the first information in the manner B.

B1. The first information includes the quantity of times of receiving the first negative acknowledgement information and/or the quantity of times of not receiving the first HARQ response information in the first time window.

It may be understood that in this embodiment of this application, the method may be alternatively described as follows: The terminal device determines the MCS index, and determines, based on the quantity of times of receiving the first negative acknowledgement information and/or the quantity of times of not receiving the first HARQ response information in the first time window, the MCS information corresponding to the MCS index.

Alternatively, the method may be described as follows: The terminal device determines the MCS index, and determines the quantity of times of receiving the first negative acknowledgement information and/or the quantity of times of not receiving the first HARQ response information in the first time window, to determine, based on the quantity of times of receiving the first negative acknowledgement information and/or the quantity of times of not receiving the first HARQ response information in the first time window, the modulation and coding scheme information corresponding to the MCS index.

For example, the quantity of times of receiving the first negative acknowledgement information and/or the quantity of times of not receiving the first HARQ response information in the first time window belongs to at least one of a plurality of sets of quantities of times, and the plurality of sets of quantities of times include a first set of quantities of times and a second set of quantities of times.

Specifically, if the quantity of times of receiving the first negative acknowledgement information and/or the quantity of times of not receiving the first HARQ acknowledgement information in the first time window belongs to the first set of quantities of times, the terminal device determines that the MCS information corresponding to the MCS index is first MCS information; or if the quantity of times of receiving the first negative acknowledgement information and/or the quantity of times of not receiving the first HARQ acknowledgement information in the first time window belongs to the second set of quantities of times, the terminal device determines that the MCS information corresponding to the MCS index is second MCS information. Alternatively, if the quantity of times of receiving the first negative acknowledgement information and/or the quantity of times of not receiving the first HARQ response information in the first time window belongs to the first set of quantities of times, the MCS information corresponding to the MCS index is first MCS information; or if the quantity of times of receiving the first negative acknowledgement information and/or the quantity of times of not receiving the first HARQ response information in the first time window belongs to the second set of quantities of times, the MCS information corresponding to the MCS index is second MCS information.

That the quantity of times of receiving the first negative acknowledgement information and/or the quantity of times of not receiving the first HARQ response information in the first time window belongs to the first set of quantities of times may be understood as that the quantity of times of receiving the first negative acknowledgement information and/or the quantity of times of not receiving the first HARQ response information in the first time window is less than a first quantity of times, and that the quantity of times of receiving the first negative acknowledgement information and/or the quantity of times of not receiving the first HARQ response information in the first time window belongs to the second set of quantities of times may be understood as that the quantity of times of receiving the first negative acknowledgement information and/or the quantity of times of not receiving the first HARQ response information in the first time window is greater than or equal to a second quantity of times. The first quantity of times and the second quantity of times are used as two thresholds, and may be specified in a protocol, or may be preset by the network device and notified to the terminal device by using higher layer signaling or dynamic signaling. The first quantity of times may be equal to or may not be equal to the second quantity of times. For example, the first quantity of times is less than the second quantity of times.

If the first negative acknowledgement information is received, it indicates that receiving by the network device is incorrect, or it indicates that uplink data transmission by the terminal device is incorrect. If the first negative acknowledgement information is not received, it may also indicate that receiving by the network device is incorrect, or it may indicate that uplink data transmission by the terminal device is incorrect. If the quantity of times of receiving the first negative acknowledgement information and/or the quantity of times of not receiving the first HARQ response information is relatively large, it indicates that receiving by the network device is always incorrect, and an MCS table corresponding to a low BLER is selected because a service transmission end time is closer.

For example, there are two MCS tables: a first MCS table and a second MCS table, a BLER corresponding to the first MCS table is 10e−3, and a BLER corresponding to the second MCS table is 10e−5. For example, if the quantity of times of receiving the first negative acknowledgement information and/or the quantity of times of not receiving the first HARQ response information in the first time window belongs to the first set of quantities of times, the terminal device determines to select the first MCS table, and the MCS information corresponding to the MCS index is first MCS information in the first MCS table; or if the quantity of times of receiving the first negative acknowledgement information and/or the quantity of times of not receiving the first HARQ response information in the first time window belongs to the second set of quantities of times, the terminal device determines to select the second MCS table, and the MCS information corresponding to the MCS index is second MCS information in the second MCS table.

Alternatively, the quantity of times of receiving the first negative acknowledgement information and/or the quantity of times of not receiving the first HARQ response information in the first time window belongs to at least one of a plurality of sets of quantities of times, and the plurality of sets of quantities of times include a first set of quantities of times and a second set of quantities of times. In this case, from the perspective of describing a set of quantities of times, the solution in the implementation B1 may be alternatively described as follows: MCS information that is corresponding to the MCS index and corresponding to the quantity of times of receiving the first negative acknowledgement information and/or the quantity of times of not receiving the first HARQ response information in the first time window included in the first set of quantities of times is first MCS information, and MCS information that is corresponding to the MCS index and corresponding to the quantity of times of receiving the first negative acknowledgement information and/or the quantity of times of not receiving the first HARQ response information in the first time window included in the second set of quantities of times is second MCS information, where the first MCS information is different from the second MCS information.

That the MCS information that is corresponding to the MCS index and corresponding to the quantity of times of receiving the first negative acknowledgement information and/or the quantity of times of not receiving the first HARQ response information in the first time window included in the first set of quantities of times is the first MCS information described herein should be understood as that when the quantity of times of receiving the first negative acknowledgement information and/or the quantity of times of not receiving the first HARQ response information in the first time window belongs to the first set of quantities of times, the MCS information corresponding to the MCS index is the first MCS information. Regardless of whether the quantity of times of receiving the first negative acknowledgement information and/or the quantity of times of not receiving the first HARQ response information in the first time window belongs to the first set of quantities of times or the second set of quantities of times, the MCS index keeps unchanged. Therefore, a correspondence between a set of quantities of times and MCS information or a correspondence between the quantity of times of receiving the first negative acknowledgement information and/or the quantity of times of not receiving the first HARQ response information in the first time window and MCS information should be emphasized herein, instead of a correspondence between a set of quantities of times (or the quantity of times of receiving the first negative acknowledgement information and/or the quantity of times of not receiving the first HARQ response information in the first time window) and the MCS index. Understanding of the case in which the MCS information that is corresponding to the MCS index and corresponding to the second set of quantities of times is the second MCS information is the same.

In this embodiment, there is also a division case of "being equal to". Similar to the implementation A5, in this embodiment, for example, a case in which the quantity of times of receiving the first negative acknowledgement information and/or the quantity of times of not receiving the first HARQ response information in the first time window is equal to the second quantity of times is consistent with a case in which the quantity of times of receiving the first negative acknowledgement information and/or the quantity of times of not receiving the first HARQ response information in the first time window is greater than the second quantity of times. This is not limited thereto in practice. For specific description of the case of "being equal to", refer to the implementation A5. Details are not described again.

B2. The first information includes the quantity of times of receiving the first acknowledgement information in the first time window.

It may be understood that in this embodiment of this application, the method may be alternatively described as follows: The terminal device determines the MCS index, and determines, based on the quantity of times of receiving the first acknowledgement information in the first time window, the MCS information corresponding to the MCS index.

Alternatively, the method may be described as follows: The terminal device determines the MCS index, and determines the quantity of times of receiving the first acknowledgement information in the first time window, to determine, based on the quantity of times of receiving the first acknowledgement information in the first time window, the modulation and coding scheme information corresponding to the MCS index.

For example, the quantity of times of receiving the first acknowledgement information in the first time window belongs to at least one of a plurality of sets of quantities of times, and the plurality of sets of quantities of times include a third set of quantities of times and a fourth set of quantities of times.

Specifically, if the quantity of times of receiving the first acknowledgement information in the first time window belongs to the third set of quantities of times, the terminal device determines that the MCS information corresponding to the MCS index is first MCS information; or if the quantity of times of receiving the first acknowledgement information in the first time window belongs to the fourth set of quantities of times, the terminal device determines that the MCS information corresponding to the MCS index is second MCS information. Alternatively, if the quantity of times of receiving the first acknowledgement information in the first time window belongs to the third set of quantities of times, the MCS information corresponding to the MCS index is first MCS information; or if the quantity of times of receiving the first acknowledgement information in the first time window belongs to the fourth set of quantities of times, the MCS information corresponding to the MCS index is second MCS information.

That the quantity of times of receiving the first acknowledgement information in the first time window belongs to the third set of quantities of times may be understood as that the quantity of times of receiving the first acknowledgement information in the first time window is greater than or equal to a third quantity of times, and the quantity of times of receiving the first acknowledgement information in the first time window belongs to the fourth set of quantities of times may be understood as that the quantity of times of receiving the first acknowledgement information in the first time window is less than a fourth quantity of times. The third quantity of times and the fourth quantity of times are used as two thresholds, and may be specified in a protocol, or may be preset by the network device and notified to the terminal device by using higher layer signaling or dynamic signaling. The third quantity of times may be equal to or may not be equal to the fourth quantity of times. For example, the third quantity of times is greater than the fourth quantity of times.

If the first acknowledgement information is received, it indicates that receiving by the network device is correct, or it indicates that uplink data transmission by the terminal device is correct. If the quantity of times of receiving the first acknowledgement information is relatively small, it indicates that receiving by the network device is always incorrect, and an MCS table corresponding to a low BLER needs to be selected because a service transmission end time is closer. If the quantity of times of receiving the first acknowledgement information is relatively large, it indicates that receiving by the network device is correct, and an MCS table corresponding to a high BLER may be selected.

For example, there are two MCS tables: a first MCS table and a second MCS table, a BLER corresponding to the first MCS table is 10e−3, and a BLER corresponding to the second MCS table is 10e−5. For example, if the quantity of times of receiving the first acknowledgement information in the first time window belongs to the third set of quantities of times, the terminal device determines to select the first MCS table, and the MCS information corresponding to the MCS index is first MCS information in the first MCS table; or if the quantity of times of receiving the first acknowledgement information in the first time window belongs to the fourth set of quantities of times, the terminal device determines to select the second MCS table, and the MCS information corresponding to the MCS index is second MCS information in the second MCS table.

Alternatively, the quantity of times of receiving the first acknowledgement information in the first time window belongs to at least one of a plurality of sets of quantities of times, and the plurality of sets of quantities of times include a third set of quantities of times and a fourth set of quantities of times. In this case, from the perspective of describing a set of quantities of times, the solution in the implementation B2 may be alternatively described as follows: MCS information that is corresponding to the MCS index and corresponding to the quantity of times of receiving the first acknowledgement information in the first time window included in the third set of quantities of times is first MCS information, and MCS information that is corresponding to the MCS index and corresponding to the quantity of times of receiving the first acknowledgement information in the first time window included in the fourth set of quantities of times is second MCS information, where the first MCS information is different from the second MCS information.

That the MCS information that is corresponding to the MCS index and corresponding to the quantity of times of receiving the first acknowledgement information in the first time window included in the third set of quantities of times is the first MCS information described herein should be understood as that when the quantity of times of receiving the first acknowledgement information in the first time window belongs to the third set of quantities of times, the MCS information corresponding to the MCS index is the first MCS information. Regardless of whether the quantity of times of receiving the first acknowledgement information in the first time window belongs to the third set of quantities of times or the fourth set of quantities of times, the MCS index keeps unchanged. Therefore, a correspondence between a set of quantities of times and MCS information or a correspondence between the quantity of times of receiving the first acknowledgement information in the first time window and MCS information should be emphasized herein, instead of a correspondence between a set of quantities of times (or the quantity of times of receiving the first acknowledgement information in the first time window) and the MCS index. Understanding of the case in which the MCS information that is corresponding to the MCS index and corresponding to the fourth set of quantities of times is the second MCS information is the same.

In this embodiment, there is also a division case of "being equal to". Similar to the implementation A5, in this embodiment, for example, a case in which the quantity of times of receiving the first acknowledgement information in the first time window is equal to the third quantity of times is consistent with a case in which the quantity of times of receiving the first acknowledgement information in the first time window is greater than the third quantity of times. This is not limited thereto in practice. For specific description of the case of "being equal to", refer to the implementation A5. Details are not described again.

B3. The first information includes the ratio of the quantity of times of receiving the first negative acknowledgement information and/or the quantity of times of not receiving the first HARQ response information in the first time window to the total quantity of required times of receiving the first HARQ response information in the first time window.

The total quantity of required times of receiving the first HARQ response information in the first time window may be determined based on uplink data sent by the terminal device. Theoretically, each time the terminal device sends one piece of uplink data, the first HARQ response information is received once.

It may be understood that in this embodiment of this application, the method may be alternatively described as follows: The terminal device determines the MCS index, and determines, based on the ratio of the quantity of times of receiving the first negative acknowledgement information and/or the quantity of times of not receiving the first HARQ response information in the first time window to the total quantity of required times of receiving the first HARQ response information in the first time window, the MCS information corresponding to the MCS index.

Alternatively, the method may be described as follows: The terminal device determines the MCS index and the ratio of the quantity of times of receiving the first negative acknowledgement information and/or the quantity of times of not receiving the first HARQ response information in the first time window to the total quantity of required times of receiving the first HARQ response information in the first time window, to determine, based on the ratio of the quantity of times of receiving the first negative acknowledgement information and/or the quantity of times of not receiving the first HARQ response information in the first time window to the total quantity of required times of receiving the first HARQ response information in the first time window, the modulation and coding scheme information corresponding to the MCS index.

For example, the ratio of the quantity of times of receiving the first negative acknowledgement information and/or the quantity of times of not receiving the first HARQ response information in the first time window to the total quantity of required times of receiving the first HARQ response information in the first time window belongs to at least one of a plurality of ratio sets, and the plurality of ratio sets include a first ratio set and a second ratio set.

Specifically, if the ratio of the quantity of times of receiving the first negative acknowledgement information and/or the quantity of times of not receiving the first HARQ response information in the first time window to the total quantity of required times of receiving the first HARQ response information in the first time window belongs to the first ratio set, the terminal device determines that the MCS information corresponding to the MCS index is first MCS information; or if the ratio of the quantity of times of receiving the first negative acknowledgement information and/or the quantity of times of not receiving the first HARQ response information in the first time window to the total quantity of required times of receiving the first HARQ response information in the first time window belongs to the second ratio set, the terminal device determines that the MCS information corresponding to the MCS index is second MCS information. Alternatively, if the ratio of the quantity of times of receiving the first negative acknowledgement information and/or the quantity of times of not receiving the first HARQ response information in the first time window to the total quantity of required times of receiving the first HARQ response information in the first time window belongs to the first ratio set, the MCS information corresponding to the MCS index is first MCS information; or if the ratio of the quantity of times of receiving the first negative acknowledgement information and/or the quantity of times of not receiving the first HARQ response information in the first time window to the total quantity of required times of receiving the first HARQ response information in the first time window belongs to the second ratio set, the MCS information corresponding to the MCS index is second MCS information.

That the ratio of the quantity of times of receiving the first negative acknowledgement information and/or the quantity of times of not receiving the first HARQ response information in the first time window to the total quantity of required times of receiving the first HARQ response information in the first time window belongs to the first ratio set may be understood as that the ratio of the quantity of times of receiving the first negative acknowledgement information and/or the quantity of times of not receiving the first HARQ response information in the first time window to the total quantity of required times of receiving the first HARQ response information in the first time window is less than a first ratio, and that the ratio of the quantity of times of receiving the first negative acknowledgement information and/or the quantity of times of not receiving the first HARQ response information in the first time window to the total quantity of required times of receiving the first HARQ response information in the first time window belongs to the second ratio set may be understood as that the ratio of the quantity of times of receiving the first negative acknowledgement information and/or the quantity of times of not receiving the first HARQ response information in the first time window to the total quantity of required times of receiving the first HARQ response information in the first time window is greater than or equal to a second ratio. The first ratio and the second ratio are used as two thresholds, and may be specified in a protocol, or may be preset by the network device and notified to the terminal device by using higher layer signaling or dynamic signaling. The first ratio may be equal to or may not be equal to the second ratio. For example, the first ratio is less than the second ratio.

If the first negative acknowledgement information is received, it indicates that receiving by the network device is incorrect, or it may indicate that uplink data transmission by the terminal device is incorrect. If the ratio of the quantity of times of receiving the first negative acknowledgement information to the quantity of required times of receiving the first HARQ response information is relatively large, it indicates that the quantity of times of receiving the first negative acknowledgement information is relatively large, receiving by the network device is always incorrect, and an MCS table corresponding to a low BLER needs to be selected because a service transmission end time is closer. If the ratio of the quantity of times of receiving the first negative acknowledgement information to the quantity of required times of receiving the first HARQ response information is relatively small, it indicates that the quantity of times of receiving the first negative acknowledgement information is relatively small, receiving by the network device is correct, and an MCS table corresponding to a high BLER may be selected.

For example, there are two MCS tables: a first MCS table and a second MCS table, a BLER corresponding to the first MCS table is 10e−3, and a BLER corresponding to the second MCS table is 10e−5. For example, if the ratio of the quantity of times of receiving the first negative acknowledgement information and/or the quantity of times of not receiving the first HARQ response information in the first time window to the total quantity of required times of receiving the first HARQ response information in the first time window belongs to the first ratio set, the terminal device determines to select the first MCS table, and the MCS information corresponding to the MCS index is first MCS information in the first MCS table; or if the ratio of the quantity of times of receiving the first negative acknowledgement information and/or the quantity of times of not receiving the first HARQ response information in the first time window to the total quantity of required times of receiving the first HARQ response information in the first time window belongs to the second ratio set, the terminal device determines to select the second MCS table, and the MCS information corresponding to the MCS index is second MCS information in the second MCS table.

Alternatively, the ratio of the quantity of times of receiving the first negative acknowledgement information and/or the quantity of times of not receiving the first HARQ response information in the first time window to the total quantity of required times of receiving the first HARQ response information in the first time window belongs to at least one of a plurality of ratio sets, and the plurality of ratio sets include a first ratio set and a second ratio set. In this case, from the perspective of describing a ratio set, the solution in the implementation B3 may be alternatively described as follows: MCS information that is corresponding to the MCS index and corresponding to the ratio of the quantity of times of receiving the first negative acknowledgement information and/or the quantity of times of not receiving the first HARQ response information in the first time window to the total quantity of required times of receiving the first HARQ response information in the first time window included in the first ratio set is first MCS information, and MCS information that is corresponding to the MCS index and corresponding to the ratio of the quantity of times of receiving the first negative acknowledgement information and/or the quantity of times of not receiving the first HARQ response information in the first time window to the total quantity of required times of receiving the first HARQ response information in the first time window included in the second ratio set is second MCS information, where the first MCS information is different from the second MCS information.

That the MCS information that is corresponding to the MCS index and corresponding to the ratio of the quantity of times of receiving the first negative acknowledgement information and/or the quantity of times of not receiving the first HARQ response information in the first time window to the total quantity of required times of receiving the first HARQ response information in the first time window included in the first ratio set is the first MCS information described herein should be understood as that when the ratio of the quantity of times of receiving the first negative acknowledgement information and/or the quantity of times of not receiving the first HARQ response information in the first time window to the total quantity of required times of receiving the first HARQ response information in the first time window belongs to the first ratio set, the MCS information corresponding to the MCS index is the first MCS information. Regardless of whether the ratio of the quantity of times of receiving the first negative acknowledgement information and/or the quantity of times of not receiving the first HARQ response information in the first time window to the total quantity of required times of receiving the first HARQ response information in the first time window belongs to the first ratio set or the second ratio set, the MCS index keeps unchanged. Therefore, a correspondence between a ratio set and MCS information or a correspondence between the ratio of the quantity of times of receiving the first negative acknowledgement information and/or the quantity of times of not receiving the first HARQ response information in the first time window to the total quantity of required times of receiving the first HARQ response information in the first time window and MCS information should be emphasized herein, instead of a correspondence between a ratio set (or the ratio of the quantity of times of receiving the first negative acknowledgement information and/or the quantity of times of not receiving the first HARQ response information in the first time window to the total quantity of required times of receiving the first HARQ response information in the first time window) and the MCS index. Understanding of the case in which the MCS information that is corresponding to the MCS index and corresponding to the second ratio set is the second MCS information is the same.

In this embodiment, there is also a division case of "being equal to". Similar to the implementation A5, in this embodiment, for example, a case in which the ratio of the quantity of times of receiving the first negative acknowledgement information and/or the quantity of times of not receiving the first HARQ response information in the first time window to the total quantity of required times of receiving the first HARQ response information in the first time window is equal to the second ratio is consistent with a case in which the ratio of the quantity of times of receiving the first negative acknowledgement information and/or the quantity of times of not receiving the first HARQ response information in the first time window to the total quantity of required times of receiving the first HARQ response information in the first time window is greater than the second ratio. This is not limited thereto in practice. For specific description of the case of "being equal to", refer to the implementation A5. Details are not described again.

B4. The first information includes the ratio of the quantity of times of receiving the first acknowledgement information in the first time window to the total quantity of required times of receiving the first HARQ response information in the first time window.

It may be understood that in this embodiment of this application, the method may be alternatively described as follows: The terminal device determines the MCS index, and determines, based on the ratio of the quantity of times of receiving the first acknowledgement information in the first time window to the total quantity of required times of receiving the first HARQ response information in the first time window, the MCS information corresponding to the MCS index.

Alternatively, the method may be described as follows: The terminal device determines the MCS index and the ratio of the quantity of times of receiving the first acknowledgement information in the first time window to the total quantity of required times of receiving the first HARQ response information in the first time window, to determine, based on the ratio of the quantity of times of receiving the first acknowledgement information in the first time window to the total quantity of required times of receiving the first HARQ response information in the first time window, the modulation and coding scheme information corresponding to the MCS index.

For example, the ratio of the quantity of times of receiving the first acknowledgement information in the first time window to the total quantity of required times of receiving the first HARQ response information in the first time window included in the first information belongs to at least one of a plurality of ratio sets, and the plurality of ratio sets include a third ratio set and a fourth ratio set.

Specifically, if the ratio of the quantity of times of receiving the first acknowledgement information in the first time window to the total quantity of required times of receiving the first HARQ response information in the first time window belongs to the third ratio set, the terminal device determines that the MCS information corresponding to the MCS index is first MCS information; or if the ratio of the quantity of times of receiving the first acknowledgement information in the first time window to the total quantity of required times of receiving the first HARQ response information in the first time window belongs to the fourth ratio set, the terminal device determines that the MCS information corresponding to the MCS index is second MCS information. Alternatively, if the ratio of the quantity of times of receiving the first acknowledgement information in the first time window to the total quantity of required times of receiving the first HARQ response information in the first time window belongs to the third ratio set, the MCS information corresponding to the MCS index is first MCS information; or if the ratio of the quantity of times of receiving the first acknowledgement information in the first time window to the total quantity of required times of receiving the first HARQ response information in the first time window belongs to the fourth ratio set, the MCS information corresponding to the MCS index is second MCS information.

That the ratio of the quantity of times of receiving the first acknowledgement information in the first time window to the total quantity of required times of receiving the first HARQ response information in the first time window belongs to the third ratio set may be understood as that the ratio of the quantity of times of receiving the first acknowledgement information in the first time window to the total quantity of required times of receiving the first HARQ response information in the first time window is greater than or equal to a third ratio, and that the ratio of the quantity of times of receiving the first acknowledgement information in the first time window to the total quantity of required times of receiving the first HARQ response information in the first time window belongs to the fourth ratio set may be understood as that the ratio of the quantity of times of receiving the first acknowledgement information in the first time window to the total quantity of required times of receiving the first HARQ response information in the first time window is less than a fourth ratio. The third ratio and the fourth ratio are used as two thresholds, and may be specified in a protocol, or may be preset by the network device and notified to the terminal device by using higher layer signaling or dynamic signaling. The third ratio may be equal to or may not be equal to the fourth ratio. For example, the third ratio is greater than the fourth ratio.

If the first acknowledgement information is received, it indicates that receiving by the network device is correct, or it may indicate that uplink data transmission by the terminal device is correct. If the ratio of the quantity of times of receiving the first acknowledgement information to the quantity of required times of receiving the first HARQ response information is relatively small, it indicates that less times of the first acknowledgement information is received by the network device is always incorrect, and an MCS table corresponding to a low BLER needs to be selected because a service transmission end time is closer. If the ratio of the quantity of times of receiving the first acknowledgement information to the quantity of required times of receiving the first HARQ response information is relatively large, it indicates that more first acknowledgement information is received, receiving by the network device is correct, and an MCS table corresponding to a high BLER may be selected.

For example, there are two MCS tables: a first MCS table and a second MCS table, a BLER corresponding to the first MCS table is 10e-3, and a BLER corresponding to the second MCS table is 10e-5. For example, if the ratio of the quantity of times of receiving the first acknowledgement information in the first time window to the total quantity of required times of receiving the first HARQ response information in the first time window belongs to the third ratio set, the terminal device determines to select the first MCS table, and the MCS information corresponding to the MCS index is first MCS information in the first MCS table; or if the ratio of the quantity of times of receiving the first acknowledgement information in the first time window to the total quantity of required times of receiving the first HARQ response information in the first time window belongs to the fourth ratio set, the terminal device determines to select the second MCS table, and the MCS information corresponding to the MCS index is second MCS information in the second MCS table.

Alternatively, the ratio of the quantity of times of receiving the first acknowledgement information in the first time window to the total quantity of required times of receiving the first HARQ response information in the first time window included in the first information belongs to at least one of a plurality of ratio sets, and the plurality of ratio sets include a third ratio set and a fourth ratio set. In this case, from the perspective of describing a ratio set, the solution in the implementation B4 may be alternatively described as follows: MCS information that is corresponding to the MCS index and corresponding to the ratio of the quantity of times of receiving the first acknowledgement information in the first time window to the total quantity of required times of receiving the first HARQ response information in the first time window included in the third ratio set is first MCS information, and MCS information that is corresponding to the MCS index and corresponding to the ratio of the quantity of times of receiving the first acknowledgement information in the first time window to the total quantity of required times of receiving the first HARQ response information in the first time window included in the fourth ratio set is second MCS information, where the first MCS information is different from the second MCS information.

That the MCS information that is corresponding to the MCS index and corresponding to the ratio of the quantity of times of receiving the first acknowledgement information in the first time window to the total quantity of required times of receiving the first HARQ response information in the first time window included in the third ratio set is the first MCS information described herein should be understood as that when the ratio of the quantity of times of receiving the first acknowledgement information in the first time window to the total quantity of required times of receiving the first HARQ response information in the first time window belongs to the third ratio set, the MCS information corresponding to the MCS index is the first MCS information. Regardless of whether the ratio of the quantity of times of receiving the first acknowledgement information in the first time window to the total quantity of required times of receiving the first HARQ response information in the first time window belongs to the third ratio set or the fourth ratio set, the MCS index keeps unchanged. Therefore, a correspondence between a ratio set and MCS information or a correspondence between the ratio of the quantity of times of receiving the first acknowledgement information in the first time window to the total quantity of required times of receiving the first HARQ response information in the first time window and MCS information should be emphasized herein, instead of a correspondence between a ratio set (or the ratio of the quantity of times of receiving the first acknowledgement information in the first time window to the total quantity of required times of receiving the first HARQ response information in the first time window) and the MCS index. Understanding of the case in which the MCS information that is corresponding to the MCS index and corresponding to the fourth ratio set is the second MCS information is the same.

In this embodiment, there is also a division case of "being equal to". Similar to the implementation A5, in this embodiment, for example, a case in which the ratio of the quantity of times of receiving the first acknowledgement information in the first time window to the total quantity of required times of receiving the first HARQ response information in the first time window is equal to the third ratio is consistent with a case in which the ratio of the quantity of times of receiving the first acknowledgement information in the first time window to the total quantity of required times of receiving the first HARQ response information in the first time window is greater than the third ratio. This is not limited thereto in practice. For specific description of the case of "being equal to", refer to the implementation A5. Details are not described again.

In the foregoing description of the manner A and the manner B, the example in which the first MCS information is different from the second MCS information is used. In application, the first MCS information may be alternatively the same as the second MCS information.

The implementations in the manner B may be separately applied, or any several implementations may be combined. One type of content of the first information may be considered as one implementation.

In addition, any several implementations in the manner A and the manner B may be combined. The following describes an example in which an implementation in the manner A is combined with an implementation in the manner B. For example, the implementation A1 is combined with the implementation B1.

As described above, the implementation A1 is that the first information includes the modulation and coding scheme table indicated by the DCI, and the implementation B1 is that the first information includes the quantity of times of receiving the first negative acknowledgement information and/or the quantity of times of not receiving the first HARQ response information in the first time window.

Further, in this embodiment of this application, the method may be alternatively described as follows: The terminal device determines the MCS index, and determines, based on the modulation and coding scheme table indicated by the DCI and the quantity of times of receiving the first negative acknowledgement information and/or the quantity of times of not receiving the first HARQ response information in the first time window included in the first information, the MCS information corresponding to the MCS index.

It may be understood that the first information includes the modulation and coding scheme table indicated by the DCI, and the modulation and coding scheme table indicated by the DCI is at least one of a plurality of modulation and coding scheme tables. Optionally, the plurality of modulation and coding scheme tables include a first modulation and coding scheme table and a second modulation and coding scheme table.

It may be understood that the first information includes the quantity of times of receiving the first negative acknowledgement information and/or the quantity of times of not receiving the first HARQ response information in the first time window, and the quantity of times of receiving the first negative acknowledgement information and/or the quantity of times of not receiving the first HARQ response information in the first time window belongs to at least one of a plurality of sets of quantities of times. The plurality of sets of quantities of times include a first set of quantities of times and a second set of quantities of times, the first set of quantities of times includes the quantity of times of receiving the first negative acknowledgement information and/or the quantity of times of not receiving the first HARQ response information in the first time window, or the second set of quantities of times includes the quantity of times of receiving the first negative acknowledgement information and/or the quantity of times of not receiving the first HARQ response information in the first time window.

Further, when the modulation and coding scheme table indicated by the DCI is the first table and the quantity of times of receiving the first negative acknowledgement information and/or the quantity of times of not receiving the first HARQ response information in the first time window belongs to the first set of quantities of times, the modulation and coding scheme information corresponding to the modulation and coding scheme index is first modulation and coding scheme information; or when the modulation and coding scheme table indicated by the DCI is the second table or the quantity of times of receiving the first negative acknowledgement information and/or the quantity of times of not receiving the first HARQ response information in the first time window belongs to the first set of quantities of times, the modulation and coding scheme information corresponding to the modulation and coding scheme index is second modulation and coding scheme information.

If any other several implementations in the manner A and the manner B are combined, a combination manner is also similar, and details are not described again in this specification.

In the foregoing description process, that the terminal device determines the MCS information is used as an example. In actual application, the network device determines the MCS information in the same manner as the terminal device, and details are not described again.

The "set" described in this specification may also be understood as a "range". For example, the "first ratio set" may also be understood as a "first ratio range", or the "first set of quantities of times" may also be understood as a "first range of quantities of times". Elements included in the "set" may be consecutive values, or may be at least one discrete value. This is not specifically limited.

In the embodiment shown in FIG. 2, an existing MCS table may be still used, without modifying the MCS table. Therefore, this method better adapts to an existing protocol.

Figure 4:
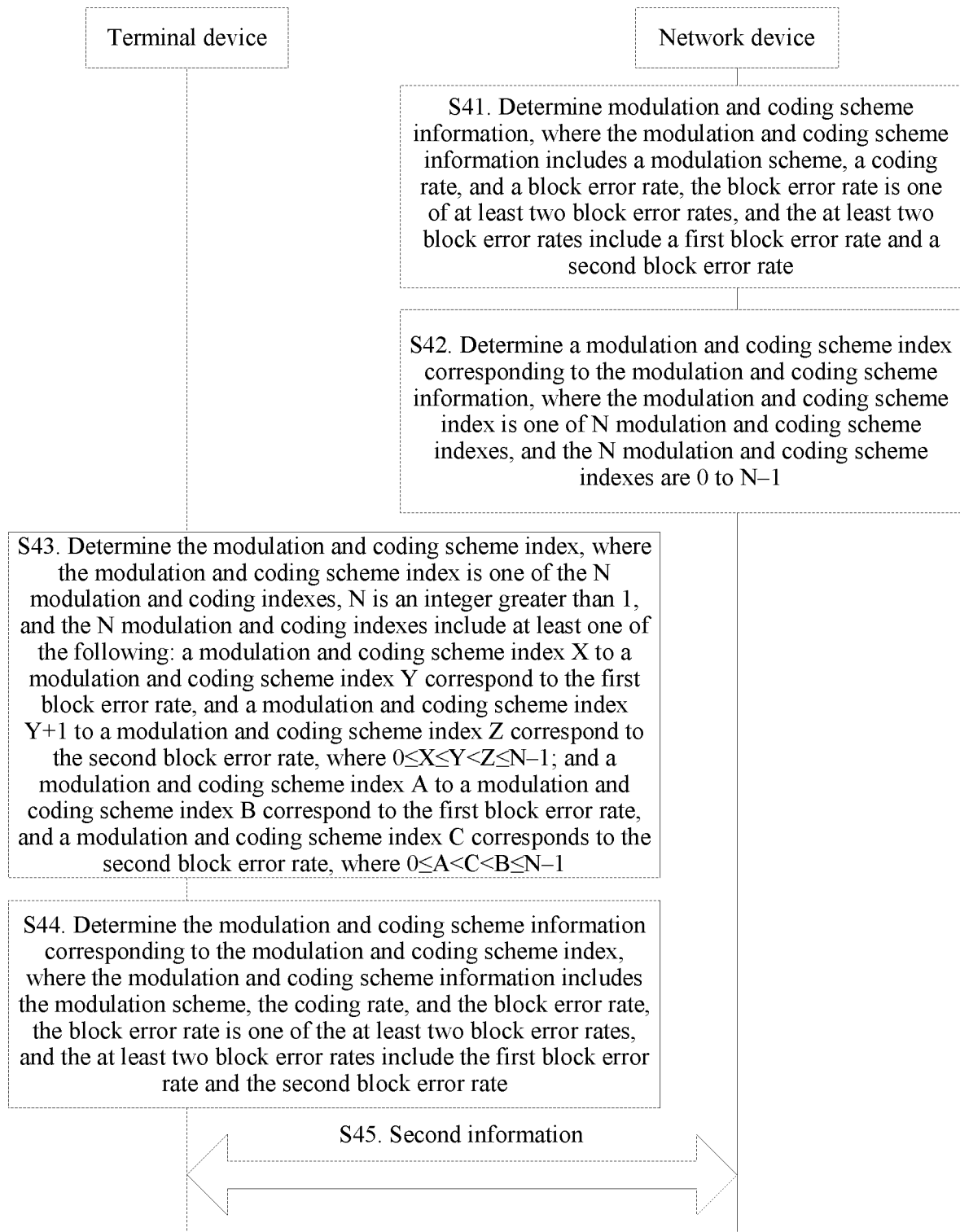
FIG. 4 is a flowchart of a second communication method according to an embodiment of this application.

In addition, referring to FIG. 4, an embodiment of this application provides a second communication method. In this communication method, a current MCS table may be directly modified, so that a terminal device can directly determine MCS information after obtaining an MCS index. The following gives detailed description. In the following description process, an example in which the method is applied to the application scenario shown in FIG. 1 is still used. A procedure of the method is described as follows:

S41. A network device determines modulation and coding scheme information, where the modulation and coding scheme information includes a modulation scheme, a coding rate, and a block error rate, the block error rate is one of at least two block error rates, and the at least two block error rates include a first block error rate and a second block error rate.

S42. The network device determines a modulation and coding scheme index corresponding to the modulation and coding scheme information, where the modulation and coding scheme index is one of N modulation and coding scheme indexes, the N modulation and coding scheme indexes are 0 to N−1, and the N modulation and coding scheme indexes meet at least one of the following: a modulation and coding scheme index X to a modulation and coding scheme index Y correspond to the first block error rate, and a modulation and coding scheme index Y+1 to a modulation and coding scheme index Z correspond to the second block error rate, where $0 \leq X \leq Y < Z \leq N-1$, and N is an integer greater than 1; and a modulation and coding scheme index A to a modulation and coding scheme index B correspond to the first block error rate, and a modulation and coding scheme index C corresponds to the second block error rate, where $0 \leq A < C < B \leq N-1$, and N is an integer greater than 1.

S43. A terminal device determines the modulation and coding scheme index.

S44. The terminal device determines the modulation and coding scheme information corresponding to the modulation and coding scheme index.

S45. The terminal device transmits second information based on the determined modulation and coding scheme information.

The second information includes data and/or control information, and the control information includes, for example, CSI, and may further include other information. The second information may be carried on a PUSCH or a PDSCH. For example, the second information may be uplink data and/or uplink control information carried on the PUSCH, or the second information may be downlink data and/or downlink control information carried on the PDSCH.

S45 is an optional step, because the terminal device does not necessarily transmit the second information. In FIG. 4, an arrow indicating an optional step is drawn as a dashed line to distinguish the optional step from other steps. In addition, the second information may be uplink information or downlink information. Therefore, in FIG. 4, a double-headed arrow is used to indicate the second information, that is, the double-headed arrow does not indicate that both the terminal device and the network device send the second information, but only indicates that the second information may be sent by the terminal device or may be sent by the network device.

The network device may indicate the MCS index to the terminal device by using DCI, and the terminal device may determine the MCS index based on the received DCI. Specifically, the DCI includes an MCS field, and the MCS field may indicate the MCS index. Alternatively, the MCS index may be preconfigured in a protocol, and may be directly determined by the terminal device and the network device, or the MCS index may be configured by the network device for the terminal device by using other signaling such as higher layer signaling.

If the MCS index is preconfigured in the protocol, the network device may determine the MCS information in the same manner as the terminal device, that is, determine the MCS index specified in the protocol, to determine the MCS information corresponding to the MCS index. If the MCS index is configured for the terminal device by using the DCI, the higher layer signaling, or the like, the network device may first select the MCS information, determine the MCS index corresponding to the MCS information, and then configure the MCS index for the terminal device by using the DCI, the higher layer signaling, or the like.

In this embodiment of this application, at least one new MCS table may be provided, and one of the at least one MCS table is used as an example, for example, the MCS table is referred to as a first MCS table. For example, the N MCS indexes are MCS indexes included in the first MCS table.

In the embodiment shown in FIG. 2, an applicable MCS table may correspond to one BLER. In the embodiment shown in FIG. 4, the newly provided first MCS table may correspond to at least two BLERs. For example, the first MCS table corresponds to at least the first BLER and the second BLER.

MCS information in the first MCS table may be randomly arranged, or because a BLER is considered, MCS information in the first MCS table may be arranged based on BLERs. Specifically, the MCS information is arranged based on the BLERs, and an arrangement manner includes but is not limited to at least one of the following possibilities.

Possibility 1: The MCS information is arranged in ascending order of BLERs, and is arranged in a comb shape.

For example, the first MCS table corresponds to two BLERs: the first BLER and the second BLER, where the first BLER is 10e−5, and the second BLER is 10e−3. Referring to Table 2, an arrangement order is, for example, the first BLER→the second BLER→the first BLER→the second BLER. This is one of the cases described above, that is, the MCS index A to the MCS index B correspond to the first block error rate, and the MCS index C corresponds to the second block error rate, where $0 \leq A < C < B \leq N-1$. In this case, MCS indexes corresponding to a same BLER are nonconsecutive, and an MCS index corresponding to another BLER is inserted into the MCS indexes.

TABLE 2

| MCS index | Modulation | Coding rate × 1024 | BLER |
|---|---|---|---|
| 0 | 1 | | 10e−3 |
| 1 | 1 | | 10e−5 |
| 2 | 1 | | 10e−5 |
| 3 | 2 | | 10e−3 |
| 4 | 2 | | 10e−5 |
| 5 | 2 | | 10e−3 |
| 6 | 2 | | 10e−5 |
| 7 | 2 | | 10e−3 |
| 8 | 2 | | 10e−5 |
| 9 | 2 | | 10e−3 |
| 10 | 2 | | 10e−5 |
| 11 | 2 | | 10e−3 |
| 12 | 2 | | 10e−5 |
| 13 | 4 | | 10e−3 |
| 14 | 4 | | 10e−5 |
| 15 | 4 | | 10e−3 |
| 16 | 4 | | 10e−5 |
| 17 | 4 | | 10e−3 |
| 18 | 4 | | 10e−5 |
| 19 | 4 | | 10e−3 |
| 20 | 6 | | 10e−5 |
| 21 | 6 | | 10e−3 |
| 22 | 6 | | 10e−5 |
| 23 | 6 | | 10e−3 |
| 24 | 6 | | 10e−5 |
| 25 | 6 | | 10e−3 |
| 26 | 6 | | 10e−5 |
| 27 | 6 | | 10e−3 |
| 28 | 6 | | 10e−5 |
| 29 | 8 | | 10e−3 |
| 30 | 8 | | 10e−5 |
| 31 | 8 | | 10e−3 |
| ... | ... | | ... |

In Table 2, Pi/2 binary phase shift keying (BPSK)=modulation 1, quadrature phase shift keying (QPSK)=modulation 2, 16 quadrature amplitude modulation (QAM)=modulation 4, and 64QAM=modulation 6. That is, if a value of modulation is 2, it indicates that a modulation scheme is QPSK, and so on. Certainly, the several correspondences described herein are merely examples, and a correspondence between a value of modulation and a specific modulation scheme is not limited thereto.

One row in Table 2 may be understood as one piece of MCS information. It can be learned that one piece of MCS information corresponds to one MCS index and a series of parameters. In addition to the several types of parameters shown in Table 2, the MCS table may include other parameters, but the other parameters are not significantly associated with the solution in this application, and therefore are not listed one by one. In addition, a value of a coding rate is not significantly associated with the solution in this application either, and therefore is not written in Table 2. It should be noted that the first MCS table provided in this embodiment of this application may include at least one entry shown in Table 2, and may further include another possible entry that is not shown in Table 2. For example, an MCS index may be alternatively less than or greater than 32. Alternatively, the first MCS table may correspond to more BLERs, and the more BLERs are included in the protection scope of this embodiment of this application provided that the arrangement manner provided in the possibility 1 is met. One entry in Table 2 indicates one piece of MCS information in Table 2. It may be understood that one or more entries in Table 2 may form a new Table 2, and the new Table 2 is also within the protection scope of this embodiment of this application.

In the arrangement manner shown in Table 2, efficiency values in the entire table are also arranged in ascending order. A physical meaning represented by an efficiency value in a system is spectrum efficiency. Generally, a larger efficiency value is better, but an efficiency value is also limited by a received signal-to-noise ratio (SNR). Therefore, MCS information needs to be selected based on a plurality of factors. If the MCS index is configured for the terminal device by using the DCI, the higher layer signaling, or the like, the network device needs to first select the MCS information. For example, the network device selects the MCS information from at least one entry included in Table 2. When selecting the MCS information, the network device may select the MCS information based on an efficiency value. In comparison with a random arrangement, the network device can sequentially search for the MCS information in this arrangement manner, thereby reducing a search time.

Possibility 2: The MCS information is arranged in descending order of BLERs.

For example, the first MCS table corresponds to three BLERs: the first BLER, the second BLER, and a third BLER, where the first BLER is 10e−1, the second BLER is 10e−2, and the third BLER is 10e−5. Referring to Table 3, an arrangement order is, for example, the first BLER→the second BLER→the third BLER. This is the other case described above, that is, the modulation and coding scheme index X to the modulation and coding scheme index Y correspond to the first block error rate, and the index Y+1 to the index Z correspond to the second block error rate, where $0 \leq X \leq Y < Z \leq N-1$. In this case, MCS indexes corresponding to a same BLER are consecutive. MCS indexes corresponding to a same BLER are arranged before MCS indexes corresponding to another BLER, and the MCS indexes corresponding to the another BLER are not inserted into the MCS indexes corresponding to the same BLER.

TABLE 3

| MCS index | Modulation | Coding rate × 1024 | BLER |
|---|---|---|---|
| 0 | 1 | | 10e−1 |
| 1 | 1 | | |
| 2 | 1 | | |
| 3 | 2 | | |
| 4 | 2 | | |
| 5 | 2 | | |
| 6 | 2 | | |
| 7 | 4 | | |
| 8 | 4 | | |
| 9 | 4 | | |
| 10 | 6 | | |
| 11 | 6 | | |
| 12 | 6 | | |
| 13 | 1 | | 10e−2 |
| 14 | 1 | | |
| 15 | 2 | | |
| 16 | 2 | | |
| 17 | 2 | | |
| 18 | 4 | | |
| 19 | 4 | | |
| 20 | 6 | | |
| 21 | 6 | | |
| 22 | 1 | | 10e−5 |
| 23 | 1 | | |
| 24 | 2 | | |
| 25 | 2 | | |
| 26 | 2 | | |
| 27 | 2 | | |
| 28 | 2 | | |
| 29 | 4 | | |
| 30 | 4 | | |
| 31 | 6 | | |
| ... | ... | | |

For a correspondence between a value of modulation and a specific modulation scheme in Table 3, refer to the description of Table 2. Certainly, this is merely an example, and the correspondence between a value of modulation and a specific modulation scheme is not limited thereto.

One row in Table 3 may be understood as one piece of MCS information. It can be learned that one piece of MCS information corresponds to one MCS index and a series of parameters. Likewise, in addition to the several types of parameters shown in Table 3, the MCS table may include other parameters, but the other parameters are not significantly associated with the solution in this application, and therefore are not listed one by one. In addition, a value of a coding rate is not significantly associated with the solution in this application either, and therefore is not written in Table 3. It should be noted that the first MCS table provided in this embodiment of this application may include at least one entry shown in Table 3, and may further include another possible entry that is not shown in Table 3. For example, an MCS index may be alternatively greater than 32. Alternatively, the first MCS table may correspond to more BLERs, and the more BLERs are included in the protection scope of this embodiment of this application provided that the arrangement manner provided in the possibility 2 is met. One entry in Table 3 indicates one piece of MCS information in Table 3. It may be understood that one or more entries in Table 3 may form a new Table 3, and the new Table 3 is also within the protection scope of this embodiment of this application.

To sum up, the first MCS table provided in this embodiment of this application may include at least one entry shown in Table 2 and/or Table 3, and may further include other possible entries that are not shown in Table 2 and Table 3.

A value of MCS index=0 usually corresponds to a value of a lowest signal to interference plus noise ratio (SINR). For different BLERs, values of lowest SINRs are different. Obviously, a lowest SINR of a high BLER is greater than a lowest SINR of a low BLER. For example, a lowest SINR of 10e−1 is higher than a lowest SINR of 10e−5. Therefore, when one MCS table includes MCS information corresponding to a plurality of BLERs, optionally, MCS index=0 needs to correspond to MCS information of a highest BLER. For example, the MCS table includes MCS information of a BLER of 10e−3 and MCS information of a BLER of 10e−5. In this case, MCS=0 needs to correspond to the BLER of 10e−3.

In the arrangement manner in Table 3, if the MCS index is configured for the terminal device by using the DCI, the higher layer signaling, or the like, the network device needs to first select the MCS information. For example, the network device selects the MCS information from at least one entry included in Table 3. When selecting the MCS information, the network device may select the MCS information based on an SINR. In comparison with a random arrangement, the network device can sequentially search for the MCS information in this arrangement manner, thereby reducing a search time.

It should be noted that, in the description of Table 2 and Table 3, values of the first BLER, the second BLER, and the like are merely examples. In this embodiment of this application, magnitude and/or a priority between at least two BLERs corresponding to the provided MCS table are/is not limited. For example, in this embodiment of this application, a magnitude relationship between the first BLER and the second BLER is not limited, and/or a priority between the first BLER and the second BLER is not limited.

In this embodiment of this application, an MCS table is re-provided, and the terminal device can directly determine MCS information after determining the MCS index. This manner is relatively simple.

It may be understood that, both the technical solution provided in the embodiment shown in FIG. 2 and the technical solution provided in the embodiment shown in FIG. 4 may be applied to a scenario in which a URLLC service or another similar service is transmitted. Using a terminal device as an example, the terminal device may perform uplink transmission or downlink transmission. In this case, the technical solution provided in the embodiment shown in FIG. 2 or the technical solution provided in the embodiment shown in FIG. 4 may be applied to a transmission direction of the terminal device that transmits the URLLC service or the another similar service. For example, if the terminal device transmits the URLLC service during the uplink transmission, the technical solution provided in the embodiment shown in FIG. 2 or the technical solution provided in the embodiment shown in FIG. 4 may be applied to the uplink transmission of the terminal device; and if the terminal device transmits a service other than the URLLC service during the downlink transmission, the technical solution provided in the embodiment shown in FIG. 2 or the technical solution provided in the embodiment shown in FIG. 4 may be applied to the downlink transmission of the terminal device. Alternatively, the technical solutions provided in the embodiments of this application may not be used. For example, the technical solution in the prior art may be still used, and this is not limited in the embodiments of this application.

Devices provided in the embodiments of this application are described below with reference to the accompanying drawings.

Figure 5:
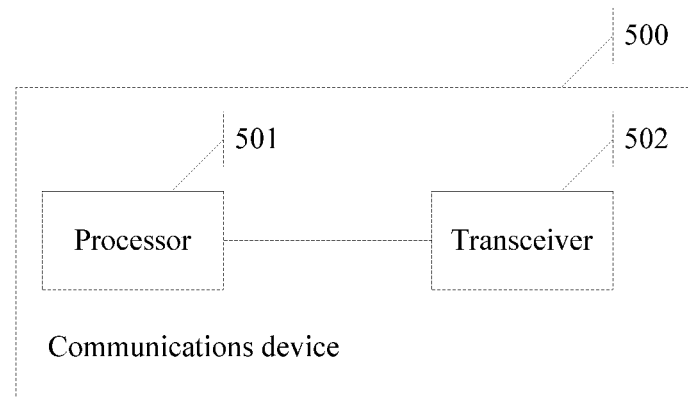
FIG. 5 is a schematic structural diagram of a terminal device according to an embodiment of this application.

FIG. 5 shows a communications device 500. The communications device 500 is, for example, a terminal device. The communications device 500 can implement functions of the terminal device described above. The communications device 500 may be the terminal device described above, or may be a chip disposed in the terminal device described above. The communications device 500 may include a processor 501 and a transceiver 502. The processor 501 may be configured to perform S24, S25, and S26 in the embodiment shown in FIG. 2, and/or support another process of the technology described in this specification. The transceiver 502 may be configured to perform S21, S23, and S27 in the embodiment shown in FIG. 2, and/or support another process of the technology described in this specification.

For example, the processor 501 is configured to determine a modulation and coding scheme index.

The processor 501 is further configured to: determine first information, where the determining first information includes: determining the first information based on DCI received by the transceiver 502; and/or determining the first information based on a quantity of times of receiving first HARQ response information and/or a quantity of times of not receiving the first HARQ response information by the transceiver 502 in a first time window, where the first HARQ response information is first acknowledgement information or first negative acknowledgement information; and determine, based on the first information, modulation and coding scheme information corresponding to the modulation and coding scheme index.

All related content of the steps in the foregoing method embodiment can be cited in function description of corresponding function modules, and details are not described herein again.

Figure 6:
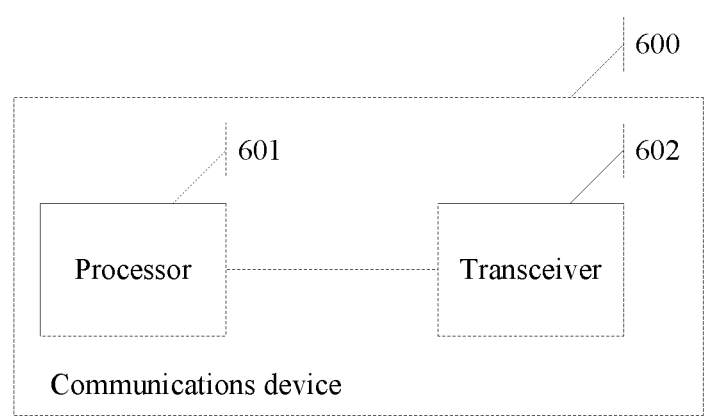
FIG. 6 is a schematic structural diagram of a network device according to an embodiment of this application.

FIG. 6 is a schematic structural diagram of a communications device 600. The communications device 600 is, for example, a network device. The communications device 600 can implement functions of the network device described above. The communications device 600 may be the network device described above, or may be a chip disposed in the network device described above. The communications device 600 may include a processor 601 and a transceiver 602. The processor 601 may be configured to perform S22 in the embodiment shown in FIG. 2, and/or support another process of the technology described in this specification. The transceiver 602 may be configured to perform S21, S23, and S27 in the embodiment shown in FIG. 2, and/or support another process of the technology described in this specification.

For example, the processor 601 is configured to determine modulation and coding scheme information.

The processor 601 is further configured to determine first information and a modulation and coding scheme index, where the first information and the modulation and coding scheme index are used to indicate the modulation and coding scheme information.

The transceiver 602 is configured to send the first information by using DCI.

All related content of the steps in the foregoing method embodiment can be cited in function description of corresponding function modules, and details are not described herein again.

Figure 7:
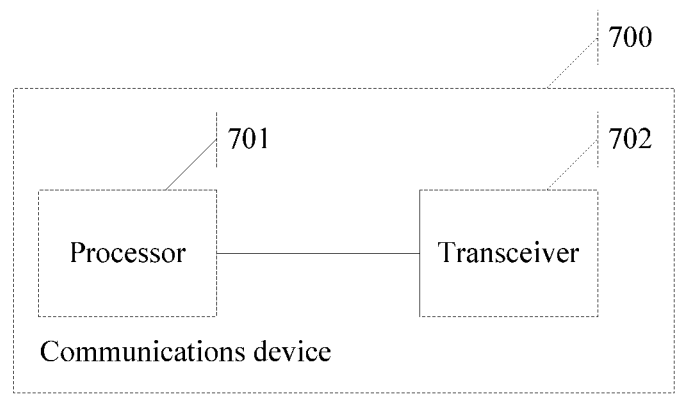
FIG. 7 is a schematic structural diagram of a terminal device according to an embodiment of this application.

FIG. 7 is a schematic structural diagram of a communications device 700. The communications device is, for example, a terminal device. The communications device 700 can implement functions of the terminal device described above. The communications device 700 may be the terminal device described above, or may be a chip disposed in the terminal device described above. The communications device 700 may include a processor 701, and optionally, may further include a transceiver 702. The processor 701 may be configured to perform S43 and S44 in the embodiment shown in FIG. 4, and/or support another process of the technology described in this specification. The transceiver 702 may be configured to perform S45 in the embodiment shown in FIG. 4, and/or support another process of the technology described in this specification.

For example, the processor 701 is configured to determine a modulation and coding scheme index, where the modulation and coding scheme index is one of N modulation and coding scheme indexes, and the N modulation and coding scheme indexes include at least one of the following: a modulation and coding scheme index X to a modulation and coding scheme index Y correspond to a first block error rate, and a modulation and coding scheme index Y+1 to a modulation and coding scheme index Z correspond to a second block error rate, where $0 \leq X \leq Y < Z \leq N-1$, and N is an integer greater than 1; and a modulation and coding scheme index A to a modulation and coding scheme index B correspond to the first block error rate, and a modulation and coding scheme index C corresponds to the second block error rate, where $0 \leq A < C < B \leq N-1$, and N is an integer greater than 2.

The processor 701 is further configured to determine modulation and coding scheme information corresponding to the modulation and coding scheme index, where the modulation and coding scheme information includes a modulation scheme, a coding rate, and a block error rate, the block error rate is one of at least two block error rates, and the at least two block error rates include the first block error rate and the second block error rate.

All related content of the steps in the foregoing method embodiment can be cited in function description of corresponding function modules, and details are not described herein again.

Figure 8:
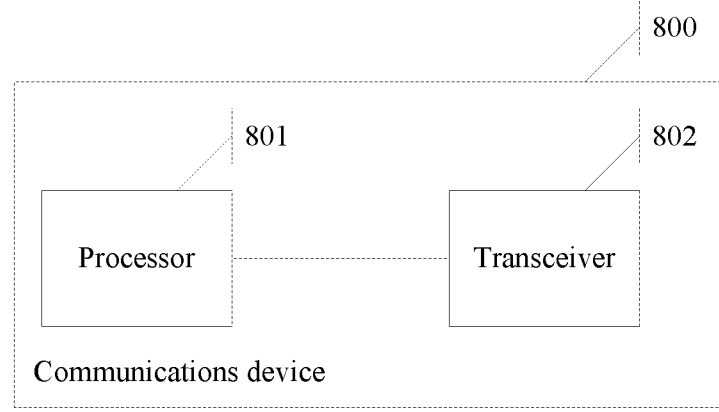
FIG. 8 is a schematic structural diagram of a network device according to an embodiment of this application.

FIG. 8 is a schematic structural diagram of a communications device 800. The communications device is, for example, a network device. The communications device 800 can implement functions of the network device described above. The communications device 800 may be the network device described above, or may be a chip disposed in the network device described above. The communications device 800 may include a processor 801 and a transceiver 802. The processor 801 may be configured to perform S41 and S42 in the embodiment shown in FIG. 4, and/or support another process of the technology described in this specification. The transceiver 802 may be configured to perform S45 in the embodiment shown in FIG. 4, and/or support another process of the technology described in this specification.

For example, the processor 801 is configured to determine modulation and coding scheme information, where the modulation and coding scheme information includes a modulation scheme, a coding rate, and a block error rate, the block error rate is one of at least two block error rates, and the at least two block error rates include a first block error rate and a second block error rate.

The processor 801 is further configured to determine a modulation and coding scheme index corresponding to the modulation and coding scheme information, where the modulation and coding scheme index is one of N modulation and coding scheme indexes, and the N modulation and coding scheme indexes include at least one of the following: a modulation and coding scheme index X to a modulation and coding scheme index Y correspond to the first block error rate, and a modulation and coding scheme index Y+1 to a modulation and coding scheme index Z correspond to the second block error rate, where $0 \leq X \leq Y < Z \leq N-1$, and N is an integer greater than 1; and a modulation and coding scheme index A to a modulation and coding scheme index B correspond to the first block error rate, and a modulation and coding scheme index C corresponds to the second block error rate, where $0 \leq A < C < B \leq N-1$, and N is an integer greater than 2.

All related content of the steps in the foregoing method embodiment can be cited in function description of corresponding function modules, and details are not described herein again.

Figure 9A:
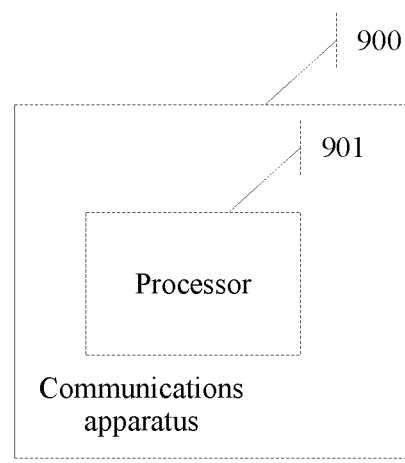
FIG. 9A and FIG. 9B are two schematic structural diagrams of a communications apparatus according to an embodiment of this application.

In a simple embodiment, a person skilled in the art may figure out that the communications device 500, the communications device 600, the communications device 700, or the communications device 800 may be alternatively implemented by using a structure of a communications apparatus 900 shown in FIG. 9A. The communications apparatus 900 can implement functions of the network device or the terminal device described above. The communications apparatus goo may include a processor 901. When the communications apparatus goo is configured to implement functions of the terminal device in the embodiment shown in FIG. 2, the processor 901 may be configured to perform S24, S25, and S26 in the embodiment shown in FIG. 2, and/or support another process of the technology described in this specification. When the communications apparatus goo is configured to implement functions of the network device in the embodiment shown in FIG. 2, the processor 901 may be configured to perform S22 in the embodiment shown in FIG. 2, and/or support another process of the technology described in this specification. When the communications apparatus goo is configured to implement functions of the terminal device in the embodiment shown in FIG. 4, the processor 901 may be configured to perform S43 and S44 in the embodiment shown in FIG. 4, and/or support another process of the technology described in this specification. When the communications apparatus go is configured to implement functions of the network device in the embodiment shown in FIG. 4, the processor 901 may be configured to perform S41 and S42 in the embodiment shown in FIG. 4, and/or support another process of the technology described in this specification.

The communications apparatus 900 may be implemented by a field-programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip. The communications apparatus 900 may be disposed in the network device or the communications device in the embodiments of this application, so that the network device or the communications device implements the method provided in the embodiments of this application.

In an optional implementation, the communications apparatus 900 may include a transceiver component, configured to communicate with a network device. For example, when the communications apparatus goo is configured to implement functions of the network device or the terminal device in the embodiment shown in FIG. 2, the transceiver component may be configured to perform S21, S23, and S27 in the embodiment shown in FIG. 2, and/or support another process of the technology described in this specification. When the communications apparatus 900 is configured to implement functions of the network device or the terminal device in the embodiment shown in FIG. 4, the transceiver component may be configured to perform S45 in the embodiment shown in FIG. 4, and/or support another process of the technology described in this specification.

Figure 9B:
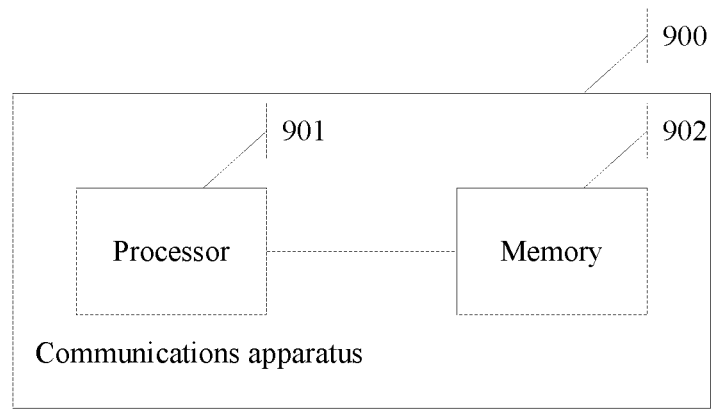

In an optional implementation, the communications apparatus 900 may further include a memory 902. Referring to FIG. 9B, the memory 902 is configured to store computer programs or instructions, and the processor 901 is configured to decode and execute these computer programs or instructions. It should be understood that these computer programs or instructions may include function programs of the foregoing network device or the foregoing terminal device. When the function programs of the network device are decoded and executed by the processor 901, the network device may be enabled to implement functions of the network device in the communication method provided in the embodiment shown in FIG. 2 or the embodiment shown in FIG. 4 in the embodiments of this application. When the function programs of the terminal device are decoded and executed by the processor 901, the terminal device may be enabled to implement functions of the terminal device in the communication method provided in the embodiment shown in FIG. 2 or the embodiment shown in FIG. 4 in the embodiments of this application.

In another optional implementation, the function programs of the network device or the terminal device are stored in a memory outside the communications apparatus goo. When the function programs of the network device are decoded and executed by the processor 901, the memory 902 temporarily stores some or all content of the function programs of the network device. When the function programs of the terminal device are decoded and executed by the processor 901, the memory 902 temporarily stores some or all content of the function programs of the terminal device.

In another optional implementation, the function programs of the network device or the terminal device are set to be stored in the memory 902 in the communications apparatus goo. When the function programs of the network device are stored in the memory 902 in the communications apparatus goo, the communications apparatus 900 may be disposed in the network device in the embodiments of this application. When the function programs of the terminal device are stored in the memory 902 in the communications apparatus goo, the communications apparatus 900 may be disposed in the terminal device in the embodiments of this application.

In still another optional implementation, some content of the function programs of the network device is stored in a memory outside the communications apparatus goo, and other content of the function programs of the network device is stored in the memory 902 in the communications apparatus 900. Alternatively, some content of the function programs of the terminal device is stored in a memory outside the communications apparatus goo, and other content of the function programs of the terminal device is stored in the memory 902 in the communications apparatus 900.

In the embodiments of this application, the communications device 500, the communications device 600, the communications device 700, the communications device 800, and the communications apparatus 900 may be presented in a form in which function modules are divided based on corresponding functions, or may be presented in a form in which function modules are divided in an integrated manner. The "module" herein may be an ASIC, a processor and a memory that execute one or more software or firmware programs, an integrated logic circuit, and/or another component that can provide the foregoing functions.

In addition, the communications device 500 provided in the embodiment shown in FIG. 5 may be alternatively implemented in another form. For example, the communications device includes a processing module and a transceiver module. For example, the processing module may be implemented by the processor 501, and the transceiver module may be implemented by the transceiver 502. The processing module may be configured to perform S24, S25, and S26 in the embodiment shown in FIG. 2, and/or support another process of the technology described in this specification. The transceiver module may be configured to perform S21, S23, and S27 in the embodiment shown in FIG. 2, and/or support another process of the technology described in this specification.

For example, the processing module is configured to determine a modulation and coding scheme index.

The processing module is further configured to: determine first information, where the determining first information includes: determining the first information based on DCI received by the transceiver module; and/or determining the first information based on a quantity of times of receiving first HARQ response information and/or a quantity of times of not receiving the first HARQ response information by the transceiver module in a first time window, where the first HARQ response information is first acknowledgement information or first negative acknowledgement information; and determine, based on the first information, modulation and coding scheme information corresponding to the modulation and coding scheme index.

All related content of the steps in the foregoing method embodiment can be cited in function description of corresponding function modules, and details are not described herein again.

The communications device 600 provided in the embodiment shown in FIG. 6 may be alternatively implemented in another form. For example, the communications device includes a processing module and a transceiver module. For example, the processing module may be implemented by the processor 601, and the transceiver module may be implemented by the transceiver 602. The processing module may be configured to perform S22 in the embodiment shown in FIG. 2, and/or support another process of the technology described in this specification. The transceiver module may be configured to perform S21, S23, and S27 in the embodiment shown in FIG. 2, and/or support another process of the technology described in this specification.

For example, the processing module is configured to determine modulation and coding scheme information.

The processing module is further configured to determine first information and a modulation and coding scheme index, where the first information and the modulation and coding scheme index are used to indicate the modulation and coding scheme information.

The transceiver module is configured to send the first information by using DCI.

All related content of the steps in the foregoing method embodiment can be cited in function description of corresponding function modules, and details are not described herein again.

The communications device 700 provided in the embodiment shown in FIG. 7 may be alternatively implemented in another form. For example, the communications device includes a processing module, and optionally, may further include a transceiver module. For example, the processing module may be implemented by the processor 701, and the transceiver module may be implemented by the transceiver 702. The processing module may be configured to perform S43 and S44 in the embodiment shown in FIG. 4, and/or support another process of the technology described in this specification. The transceiver module may be configured to perform S45 in the embodiment shown in FIG. 4, and/or support another process of the technology described in this specification.

For example, the processing module is configured to determine a modulation and coding scheme index, where the modulation and coding scheme index is one of N modulation and coding scheme indexes, and the N modulation and coding scheme indexes include at least one of the following: a modulation and coding scheme index X to a modulation and coding scheme index Y correspond to a first block error rate, and a modulation and coding scheme index Y+1 to a modulation and coding scheme index Z correspond to a second block error rate, where $0 \leq X \leq Y < Z \leq N-1$, and N is an integer greater than 1; and a modulation and coding scheme index A to a modulation and coding scheme index B correspond to the first block error rate, and a modulation and coding scheme index C corresponds to the second block error rate, where $0 \leq A < C < B \leq N-1$, and N is an integer greater than 2.

The processing module is further configured to determine modulation and coding scheme information corresponding to the modulation and coding scheme index, where the modulation and coding scheme information includes a modulation scheme, a coding rate, and a block error rate, the block error rate is one of at least two block error rates, and the at least two block error rates include the first block error rate and the second block error rate.

All related content of the steps in the foregoing method embodiment can be cited in function description of corresponding function modules, and details are not described herein again.

In addition, the communications device 800 provided in the embodiment shown in FIG. 8 may be alternatively implemented in another form. For example, the communications device includes a processing module and a transceiver module. For example, the processing module may be implemented by the processor 801, and the transceiver module may be implemented by the transceiver 802. The processing module may be configured to perform S41 and S42 in the embodiment shown in FIG. 4, and/or support another process of the technology described in this specification. The transceiver module may be configured to perform S45 in the embodiment shown in FIG. 4, and/or support another process of the technology described in this specification.

For example, the processing module is configured to determine modulation and coding scheme information, where the modulation and coding scheme information includes a modulation scheme, a coding rate, and a block error rate, the block error rate is one of at least two block error rates, and the at least two block error rates include a first block error rate and a second block error rate.

The processing module is further configured to determine a modulation and coding scheme index corresponding to the modulation and coding scheme information, where the modulation and coding scheme index is one of N modulation and coding scheme indexes, and the N modulation and coding scheme indexes include at least one of the following: a modulation and coding scheme index X to a modulation and coding scheme index Y correspond to the first block error rate, and a modulation and coding scheme index Y+1 to a modulation and coding scheme index Z correspond to the second block error rate, where $0 \leq X \leq Y < Z \leq N-1$, and N is an integer greater than 1; and a modulation and coding scheme index A to a modulation and coding scheme index B correspond to the first block error rate, and a modulation and coding scheme index C corresponds to the second block error rate, where $0 \leq A < C < B \leq N-1$, and N is an integer greater than 2.

All related content of the steps in the foregoing method embodiment can be cited in function description of corresponding function modules, and details are not described herein again.

The communications device 500, the communications device 600, the communications device 700, the communications device 800, and the communications apparatus goo provided in the embodiments of this application may be configured to perform the communication method provided in the embodiment shown in FIG. 2 or the embodiment shown in FIG. 4. Therefore, for technical effects that can be obtained by the devices, refer to the foregoing method embodiments. Details are not described herein again.

The embodiments of this application are described with reference to the flowcharts and/or block diagrams of the method, the device, and the computer program product in the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more procedures in the flowcharts and/or in one or more blocks in the block diagrams.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions in the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

Obviously, a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A method, comprising:
   determining a modulation and coding scheme index, wherein a value of the modulation and coding scheme index is associated with a plurality of modulation and coding schemes;
   determining first information based on received downlink control information (DCI), wherein the first information indicates a search space in which the DCI is received, wherein the search space in which the DCI is received is a common search space or a user equipment (UE)-specific search space, wherein a first modulation coding scheme of the plurality of modulation and coding schemes is associated with the value of the modulation and coding scheme index and the search space being the common search space, and wherein a second modulation coding scheme of the plurality of modulation and coding schemes is associated with the value of the modulation and coding scheme index and is further associated with the search space being the UE-specific search space; and
   determining, based on the first information, modulation and coding scheme information corresponding to the modulation and coding scheme index and the search space.

2. The method according to claim 1, wherein the modulation and coding scheme information corresponding to the modulation and coding scheme index when the search space in which the DCI is received is the common search space is first modulation and coding scheme information, and the modulation and coding scheme information corresponding to the modulation and coding scheme index when the search space in which the DCI is received is the UE-specific search space is second modulation and coding scheme information.

3. The method according to claim 2, wherein the first modulation and coding scheme information is comprised in a first modulation and coding scheme table, and the second modulation and coding scheme information is comprised in a second modulation and coding scheme table.

4. The method according to claim 2, wherein the first modulation and coding scheme information is different than the second modulation and coding scheme information.

5. The method according to claim 2, wherein:
   a block error rate corresponding to the second modulation and coding scheme information is less than a block error rate corresponding to the first modulation and coding scheme information; or
   a priority of a block error rate corresponding to the second modulation and coding scheme information is higher than a priority of a block error rate corresponding to the first modulation and coding scheme information.

6. The method according to claim 2, wherein the first information comprises aperiodic channel state information (A-CSI) indicated by the DCI; and
   wherein:
   the A-CSI indicated by the DCI is at least a piece of A-CSI of a plurality of pieces of A-CSI, and the plurality of pieces of A-CSI comprise first CSI and second CSI, wherein modulation and coding scheme information that corresponds to the modulation and coding scheme index and corresponds to the first CSI is the first modulation and coding scheme information, and modulation and coding scheme information that corresponds to the modulation and coding scheme index and corresponds to the second CSI is the second modulation and coding scheme information; or
   CSI comprised in the A-CSI indicated by the DCI corresponds to a plurality of block error rates, and the plurality of block error rates comprises a highest block error rate and a lowest block error rate, wherein modulation and coding scheme information that corresponds to the modulation and coding scheme index and corresponds to the highest block error rate is the first modulation and coding scheme information, and modulation and coding scheme information that corresponds to the modulation and coding scheme index and corresponds to the lowest block error rate is the second modulation and coding scheme information, or modulation and coding scheme information that corresponds to the modulation and coding scheme index and corresponds to the lowest block error rate is the first modulation and coding scheme information, and modulation and coding scheme information that corresponds to the modulation and coding scheme index and corresponds to the highest block error rate is the second modulation and coding scheme information.

7. The method according to claim 1, wherein the first information is determined based on the received DCI, and the first information comprises:
   a modulation and coding scheme table indicated by the DCI;
   a modulation and coding scheme index offset value indicated by the DCI;
   a feedback time interval indicated by the DCI; or
   aperiodic channel state information (A-CSI) indicated by the DCI.

8. The method according to claim 7, wherein:
   the first information comprises the modulation and coding scheme table indicated by the DCI or the modulation and coding scheme index offset value indicated by the DCI;
   the first information further indicates a format of the DCI;
   the format of the DCI is a first DCI format, and the DCI comprises a first bit information field and a second bit information field; and
   determining the first information comprises:
   determining, based on the first bit information field, the modulation and coding scheme table indicated by the DCI or the modulation and coding scheme index offset value indicated by the DCI, wherein a quantity of bits in the first bit information field is greater than or equal to 1, and the second bit information field satisfies the following:
   a quantity of bits in the second bit information field is less than or equal to 2, and the second bit information field indicates a feedback time for feeding back HARQ response information corresponding to second information;
   the quantity of bits in the second bit information field is less than or equal to 3, and the second bit information field indicates a time domain resource occupied by the second information;
   the quantity of bits in the second bit information field is equal to 1, the second bit information field indicates a redundancy version, and the redundancy version is 0 or 3;
   the quantity of bits in the second bit information field is equal to 1, the second bit information field indicates a transmit power command word of a terminal device, and the transmit power command word is 0 or 3; or the quantity of bits in the second bit information field is equal to 4, and the second bit information field indicates the modulation and coding scheme index.

9. An apparatus, comprising:
a processor; and
an interface; and
wherein the processor is coupled to a non-transitory memory, and the processor executes instructions stored in the non-transitory memory, the instructions including instructions for:
  determining a modulation and coding scheme index, wherein a value of the modulation and coding scheme index is associated with a plurality of modulation and coding schemes;
  determining first information based on received downlink control information (DCI), wherein the first information indicates a search space in which the DCI is received, wherein the search space in which the DCI is received is a common search space or a user equipment (UE) specific search space, wherein a first modulation coding scheme of the plurality of modulation and coding schemes is associated with the value of the modulation and coding scheme index and the search space being the common search space, and wherein a second modulation coding scheme of the plurality of modulation and coding schemes is associated with the value of the modulation and coding scheme index and is further associated with the search space being the UE-specific search space; and
  determining, based on the first information, modulation and coding scheme information corresponding to the modulation and coding scheme index and the search space.

10. The apparatus according to claim 9, wherein the modulation and coding scheme information that corresponds to the modulation and coding scheme index when the search space in which the DCI is received is the common search space is first modulation and coding scheme information, and the modulation and coding scheme information that corresponds to the modulation and coding scheme index when the search space in which the DCI is received is the UE-specific search space is second modulation and coding scheme information.

11. The apparatus according to claim 10, wherein the first modulation and coding scheme information is comprised in a first modulation and coding scheme table, and the second modulation and coding scheme information is comprised in a second modulation and coding scheme table.

12. The apparatus according to claim 10, wherein the first modulation and coding scheme information is different from the second modulation and coding scheme information.

13. The apparatus according to claim 10, wherein the first information comprises aperiodic channel state information (A-CSI) indicated by the DCI; and
  wherein:
    the A-CSI indicated by the DCI is at least a piece of a plurality of pieces of A-CSI, and the plurality of pieces of A-CSI comprise first CSI and second CSI, wherein modulation and coding scheme information that corresponds to the modulation and coding scheme index and corresponds to the first CSI is the first modulation and coding scheme information, and modulation and coding scheme information that corresponds to the modulation and coding scheme index and corresponds to the second CSI is the second modulation and coding scheme information; or
    CSI comprised in the A-CSI indicated by the DCI corresponds to a plurality of block error rates, and the plurality of block error rates comprise a highest block error rate and a lowest block error rate, wherein modulation and coding scheme information that corresponds to the modulation and coding scheme index and corresponds to the highest block error rate is the first modulation and coding scheme information, and modulation and coding scheme information that corresponds to the modulation and coding scheme index and corresponds to the lowest block error rate is the second modulation and coding scheme information, or modulation and coding scheme information that corresponds to the modulation and coding scheme index and corresponds to the lowest block error rate is the first modulation and coding scheme information, and modulation and coding scheme information that corresponds to the modulation and coding scheme index and corresponds to the highest block error rate is the second modulation and coding scheme information.

14. The apparatus according to claim 10, wherein:
a block error rate corresponding to the second modulation and coding scheme information is less than a block error rate corresponding to the first modulation and coding scheme information; or
a priority of a block error rate corresponding to the second modulation and coding scheme information is higher than a priority of a block error rate corresponding to the first modulation and coding scheme information.

15. The apparatus according to claim 9, wherein the first information comprises:
  a modulation and coding scheme table indicated by the DCI;
  a modulation and coding scheme index offset value indicated by the DCI;
  a feedback time interval indicated by the DCI; or
  aperiodic channel state information (A-CSI) indicated by the DCI.

16. The apparatus according to claim 15, wherein:
the first information comprises the modulation and coding scheme table indicated by the DCI or the modulation and coding scheme index offset value indicated by the DCI;
the first information further indicates a format of the DCI;
the format of the DCI is a first DCI format, and the DCI comprises a first bit information field and a second bit information field; and
determining the first information comprises:
  determining, based on the first bit information field, the modulation and coding scheme table indicated by the DCI or the modulation and coding scheme index offset value indicated by the DCI, wherein a quantity of bits in the first bit information field is greater than or equal to 1, and the second bit information field comprises satisfies the following:
    a quantity of bits in the second bit information field is less than or equal to 2, and the second bit information field indicates a feedback time for feeding back HARQ response information corresponding to second information;
    the quantity of bits in the second bit information field is less than or equal to 3, and the second bit information field indicates a time domain resource occupied by the second information;

the quantity of bits in the second bit information field is equal to 1, the second bit information field indicates a redundancy version, and the redundancy version is 0 or 3;

the quantity of bits in the second bit information field is equal to 1, the second bit information field indicates a transmit power command word of a terminal device, and the transmit power command word is 0 or 3; and the quantity of bits in the second bit information field is equal to 4, and the second bit information field indicates the modulation and coding scheme index.

17. A non-transitory computer readable storage medium, wherein a computer program is stored in the computer readable storage medium, and when the computer program is executed by a communications device, the communications device is caused to:

determine a modulation and coding scheme index, wherein the value of modulation and coding scheme index is associated with a plurality of modulation and coding schemes;

determine first information based on received downlink control information (DCI), wherein the first information comprises a search space in which the DCI is received, wherein the search space in which the DCI is received is a common search space or a user equipment (UE)-specific search space, wherein a first modulation coding scheme of the plurality of modulation and coding schemes is associated with the value of the modulation and coding scheme index and the search space being the common search space, and wherein a second modulation coding scheme of the plurality of modulation and coding schemes is associated with the value of the modulation and coding scheme index and is further associated with the search space being the UE-specific search space; and determine, based on the first information, modulation and coding scheme information corresponding to the modulation and coding scheme index and the search space.

18. The medium according to claim 17, wherein:

the modulation and coding scheme information that corresponds to the modulation and coding scheme index when the search space in which the DCI is received is the common search space is first modulation and coding scheme information, and the modulation and coding scheme information that corresponds to the modulation and coding scheme index when the search space in which the DCI is received is the UE-specific search space is second modulation and coding scheme information.

19. The medium according to claim 18, wherein the first modulation and coding scheme information is comprised in a first modulation and coding scheme table, and the second modulation and coding scheme information is comprised in a second modulation and coding scheme table.

20. The medium according to claim 18, wherein the first modulation and coding scheme information is different from the second modulation and coding scheme information.

* * * * *